United States Patent
Zhang et al.

(10) Patent No.: US 10,574,993 B2
(45) Date of Patent: Feb. 25, 2020

(54) CODING DATA USING AN ENHANCED CONTEXT-ADAPTIVE BINARY ARITHMETIC CODING (CABAC) DESIGN

(71) Applicant: QUALCOMM Incorporated, San Diego, CA (US)

(72) Inventors: Li Zhang, San Diego, CA (US); Marta Karczewicz, San Diego, CA (US); Jianle Chen, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 15/166,153

(22) Filed: May 26, 2016

(65) Prior Publication Data

US 2016/0353113 A1 Dec. 1, 2016

Related U.S. Application Data

(60) Provisional application No. 62/168,571, filed on May 29, 2015.

(51) Int. Cl.
*H04N 19/13* (2014.01)
*H04N 19/174* (2014.01)
(Continued)

(52) U.S. Cl.
CPC .......... *H04N 19/13* (2014.11); *H04N 19/122* (2014.11); *H04N 19/124* (2014.11);
(Continued)

(58) Field of Classification Search
CPC ...... H04N 19/13; H04N 19/17; H04N 19/436; H04N 19/91; H04N 19/126; H04N 19/625;
(Continued)

(56) References Cited

U.S. PATENT DOCUMENTS 8,494,865 B2    7/2013   Fuchs et al.
9,654,772 B2    5/2017   Guo et al.
(Continued)

FOREIGN PATENT DOCUMENTS

CN    102231830 A    11/2011
CN    103141098 A    6/2013
(Continued)

OTHER PUBLICATIONS

Response to Written Opinion dated Nov. 3, 2016, from International Application No. PCT/US2016/034828, filed on Mar. 27, 2017, 26 pp.

(Continued)

*Primary Examiner* — Richard A Hansell, Jr.
(74) *Attorney, Agent, or Firm* — Shumaker & Sieffert, P.A.

(57) ABSTRACT

A video coding device includes processor(s) configured to determine, for each of a plurality of bins of a value for a syntax element of a current transform coefficient, contexts using respective corresponding bins of values for the syntax element of previously coded transform coefficients. The processor(s) are configured to determine a context for an $i^{th}$ bin of the value for the syntax element of the current transform coefficient using a corresponding $i^{th}$ bin of a value for the syntax element of a previously coded transform coefficient. To use the corresponding $i^{th}$ bin of the value for the syntax element of the previously coded transform coefficient, the processor(s) are configured to use only the $i^{th}$ bin, and no other bins, of the value for the syntax element of the previously coded transform coefficient. 'i' represents a non-negative integer.

35 Claims, 17 Drawing Sheets

(51) Int. Cl.

| | | |
|---|---|---|
| *H04N 19/124* | (2014.01) | |
| *H04N 19/136* | (2014.01) | |
| *H04N 19/122* | (2014.01) | |
| *H04N 19/176* | (2014.01) | |
| *H04N 19/625* | (2014.01) | |
| *H04N 19/126* | (2014.01) | |
| *H04N 19/159* | (2014.01) | |
| *H04N 19/577* | (2014.01) | |
| *H04N 19/91* | (2014.01) | |
| *H04N 19/17* | (2014.01) | |
| *H04N 19/436* | (2014.01) | |
| *H04N 19/172* | (2014.01) | |
| *H04N 19/157* | (2014.01) | |
| *H04N 19/184* | (2014.01) | |

(52) U.S. Cl.
CPC ......... *H04N 19/126* (2014.11); *H04N 19/136* (2014.11); *H04N 19/159* (2014.11); *H04N 19/17* (2014.11); *H04N 19/174* (2014.11); *H04N 19/176* (2014.11); *H04N 19/436* (2014.11); *H04N 19/577* (2014.11); *H04N 19/625* (2014.11); *H04N 19/91* (2014.11); *H04N 19/157* (2014.11); *H04N 19/172* (2014.11); *H04N 19/184* (2014.11)

(58) Field of Classification Search
CPC .. H04N 19/159; H04N 19/577; H04N 19/122; H04N 19/124; H04N 19/174; H04N 19/176; H04N 19/136; H04N 19/172; H04N 19/157; H04N 19/184
See application file for complete search history.

(56) References Cited

U.S. PATENT DOCUMENTS

| | | | |
|---|---|---|---|
| 2004/0128156 A1 | 7/2004 | Beringer et al. | |
| 2007/0183491 A1* | 8/2007 | Pearson | H03M 7/4006 375/240 |
| 2009/0083245 A1 | 3/2009 | Ayotte et al. | |
| 2009/0235284 A1 | 9/2009 | Steventon et al. | |
| 2011/0002388 A1* | 1/2011 | Karczewicz | H04N 19/51 375/240.15 |
| 2011/0285560 A1 | 11/2011 | Chang et al. | |
| 2012/0114691 A1 | 5/2012 | Minke et al. | |
| 2012/0121011 A1* | 5/2012 | Coban | H04N 19/176 375/240.03 |
| 2012/0189049 A1 | 7/2012 | Coban et al. | |
| 2012/0230417 A1 | 9/2012 | Sole Rojals et al. | |
| 2013/0003837 A1 | 1/2013 | Yu et al. | |
| 2013/0021972 A1 | 1/2013 | Lim et al. | |
| 2013/0083856 A1* | 4/2013 | Sole Rojals | H04N 19/91 375/240.18 |
| 2013/0128985 A1 | 5/2013 | He et al. | |
| 2013/0142448 A1* | 6/2013 | Park | G06K 9/36 382/233 |
| 2013/0188699 A1* | 7/2013 | Joshi | H03M 7/4006 375/240.12 |
| 2013/0230097 A1* | 9/2013 | Sole Rojals | H04N 19/13 375/240.02 |
| 2013/0235925 A1* | 9/2013 | Nguyen | H04N 19/176 375/240.2 |
| 2013/0272378 A1 | 10/2013 | Sole Rojals et al. | |
| 2013/0272384 A1* | 10/2013 | Yu | H04N 19/129 375/240.03 |
| 2014/0003533 A1 | 1/2014 | He et al. | |
| 2014/0328396 A1* | 11/2014 | Guo | H04N 19/70 375/240.03 |
| 2014/0355679 A1* | 12/2014 | Rosewarne | H04N 19/70 375/240.12 |
| 2015/0016524 A1 | 1/2015 | Henry et al. | |
| 2015/0023409 A1 | 1/2015 | Schierl et al. | |
| 2015/0120798 A1 | 4/2015 | Jeong et al. | |
| 2015/0131738 A1 | 5/2015 | Esenlik et al. | |
| 2015/0215646 A1* | 7/2015 | Piao | H04N 19/91 375/240.18 |
| 2015/0334425 A1 | 11/2015 | He et al. | |
| 2016/0043735 A1* | 2/2016 | Zhou | H03M 7/4018 341/107 |
| 2016/0094474 A1 | 3/2016 | Sahoo et al. | |
| 2016/0353111 A1 | 12/2016 | Zhang | |
| 2016/0353112 A1 | 12/2016 | Zhang | |

FOREIGN PATENT DOCUMENTS

| | | |
|---|---|---|
| CN | 103918260 A | 7/2014 |
| CN | 103931188 A | 7/2014 |
| EP | 2945383 A1 | 11/2015 |
| WO | 2012122286 A1 | 9/2012 |
| WO | 2013003798 A1 | 1/2013 |
| WO | 2013067156 A1 | 5/2013 |
| WO | 2013153226 A2 | 10/2013 |

OTHER PUBLICATIONS

Second Written Opinion from International Application No. PCT/US2016/034828, dated Jun. 6, 2017, 14 pp.

Wiegand et al., "WD1: Working Draft 1 of High-Efficiency Video Coding," JCTVC-C403, 3rd Meeting: Guangzhou, CN, Oct. 7-15, 2010 (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011 (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, CH, Nov. 21-30, 2011 (Joint Collaborative Team on Video Coding of ISO/IEC JTC1/SC29/WG11 and ITU-T SG.16); JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012 (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012 (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012 (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012 (Joint Collaborative Team on Video Coding of ISO/IEC JTC1/SC29/WG11 and ITU-T SG.16); JCTVC-K1003_v7, Nov. 2, 2012, 290 pp.

Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual service—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video,

(56) References Cited

OTHER PUBLICATIONS

Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen et al., "Further improvements to HMKTA-1.0," VCEG Meeting, Jun. 19-26, 2015, Warsaw, PO (Video Coding Experts Group of ITU-T SG.16), No. VCEG-AZ07_v2, Jun. 25, 2015, 8 pp.
Chien et al., "Template-based context modeling for coefficient coding," MPEG Meeting; Apr. 27-May 7, 2012; Geneva, CH (Motion Picture Expert Group or ISO/IEC JTC1/SC29/WG11), JCTVC-I0383, No. m24632, Apr. 25, 2012; 5 pp.
Guo et al., "Ordered Entropy Slices for Parallel CABAC," [online], ITU—Telecommunications Standardization Sector Study Group 16 Question 6, Apr. 15-18, 2009; Document: VCEG-AK25, URL : http://wftp3.itu.int/av-arch/video-site/0904_Yok/VCEG-AK25.zip, 8 pp.
Nguyen et al., "Non-CE11: Proposed Cleanup for Transform Coefficient Coding," Feb. 1-10, 2012, Document JCTVC-H0228, Joint Collaborative Team on Video Coding (JCT-VC) of ITU-T SG16 WP3 and ISO/IEC JTC1/SC29/WG11, 8th Meeting: San José, CA, USA, Feb. 27, 2012, 9 pp.
Nguyen et al., "Improved Context Modeling for Coding Quantized Transform Coefficients in Video Compression," Dec. 8, 2010, Picture Coding Symposium 2010; Dec. 8-10, 2012; pp. 378-381.
Schwarz et al., "CABAC and Slices," Joint Video Team (JVT) of ISO/IEC MPEG & ITU-T VCEG (ISO/IEC JTC1SC29/WG11 and ITU-T SG16 Q.6), No. JVT-D020r1, Jul. 22, 2002; 17 pp.
Marpe et al., "Context-Based Adaptive Binary Arithmetic Coding in the H.264/AVC Video Compression Standard," IEEE Transactions on Circuits and Systems for Video Technology, Jul. 2003, vol. 13 (7), pp. 620-636.
Sze et al., "High Throughput CABAC Entropy Coding in HEVC," IEEE Transactions on Circuits and Systems for Video Technology, IEEE Service Center, Piscataway, NJ, US, vol. 22, No. 12, XP011487151, pp. 1778-1791.
Wang et al., "High Efficiency Video Coding (HEVC) Defect Report," Joint Collaborative Team on Video Coding (JCT-VC) of ITU-T SG16 WP3 and ISO/IEC JTC1/SC29/WG11; Jul. 25-Aug. 2, 2013; 14th Meeting; Vienna, AT; Sep. 27, 2013, No. JCTVC-N1003_v1, 312 pp.
Invitation to Pay Additional Fees from International Application No. PCT/US2016/034828, dated Aug. 5, 2016, 11 pp.
Response to Invitation to Pay Additional Fees dated Aug. 5, 2016, from International Application No. PCT/US2016/034828, filed on Sep. 2, 2016, 1 pp.
International Search Report and Written Opinion from International Application No. PCT/US2016/034828, dated Nov. 3, 2016, 22 pp.
Sole, et al., "Transform Coefficient Coding in HEVC," IEEE Transactions on Circuits and Systems for Video Technology, vol. 22, No. 12, Dec. 2012, pp. 1765-1777.
Guo, et al., "CE6 Subset d: Intra Prediction with Secondary Boundary," JCT-VC Meeting; Joint Collaborative Team on Video Coding (JCT-VC) of ITU-T SG16 WP3 and ISO/IEC JTC1/SC29/WG11; Nov. 21-30, 2011; document No. JCTVC-G280, Nov. 22, 2011; 7 pp.
Alshin, et al., "CE1 (subset B): Multi-parameter probability up-date for CABAC," JCT-VC Meeting; Joint Collaborative Team on Video Coding (JCT-VC) of ITU-T SG16 WP3 and ISO/IEC JTC1/SC29/WG11; Nov. 21-30, 2011; document No. JCTVC-G764, Nov. 18, 2011; 4 pp.
Bossen, et al., "Common test conditions and software reference configurations," JCT-VC Meeting; Joint Collaborative Team on Video Coding (JCT-VC) of ITU-T SG16 WP3 and ISO/IEC JTC1/SC29/WG11; Jan. 14-23, 2013; document No. JCTVC-L1100, Apr. 9, 2013; 4 pp.
Liu et al., "Local Illumination Compensation", 52nd Meeting, Jun. 19 through 26, 2015, Warsaw, Poland; ITU-Telecommunications Standarization Sector Study Group 16 Question 6 Video Coding Experts Group (VCEG), VCEG-AZ06_r1, Jun. 25, 2015, 4 pp.
Chien et al., "Extension of Advanced Temporal Motion Vector Predictor (ATMVP)", 52nd Meeting, Jun. 19 through 26, 2015, Warsaw, Poland; ITU-Telecommunications Standarization Sector Study Group 16 Question 6 Video Coding Experts Group (VCEG),VCEG-AZ10, Jun. 18, 2015, 4 pp.
Chiu, et al., "Decoder-side Motion Estimation and Wiener filter for HEVC", 2013 Visual Communications and Image Processing (VCIP), IEEE, Nov. 17, 2013; XP032543658, DOI: 10.1109/VCIP.2013.6706446 [retrieved an Jan. 8, 2014], 6 pp.
Qualcomm Incorporated, "Coding tools investigation for next generation video coding", ITU, Telecommunication Standardization Sector, COM 16-C 806-E, Jan. 2015, 7 pp.
International Preliminary Report on Patentability from International Application No. PCT/US2016/034828, dated Aug. 29, 2017, 14 pp.

* cited by examiner

CODING DATA USING AN ENHANCED CONTEXT-ADAPTIVE BINARY ARITHMETIC CODING (CABAC) DESIGN

This application claims the benefit of U.S. Provisional Application No. 62/168,571, filed May 29, 2015, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes example techniques related to to an entropy coding module in block-based hybrid video coding. These techniques may be applied to any existing video codecs, such as HEVC (High Efficiency Video Coding) or these techniques may be an efficient coding tool in any future video coding standards or other proprietary or non-proprietary coding techniques. Various aspects are directed to context modeling and context initialization enhancements for binary arithmetic coding (BAC) based coding devices. Several techniques are described herein, and in accordance with this disclosure, video coding devices may implement the techniques separately or in various combinations.

In one example, this disclosure is directed to a method for decoding video data, the method including determining, for each of a plurality of bins of a value for a syntax element of a current transform coefficient, contexts using respective corresponding bins of values for the syntax element of one or more previously-decoded transform coefficients, where determining the contexts comprises determining a context for an $i^{th}$ bin of the value for the syntax element of the current transform coefficient using a corresponding $i^{th}$ bin of a value for the syntax element of a previously-decoded transform coefficient, where i comprises a non-negative integer, and where using the corresponding $i^{th}$ bin of the value for the syntax element of the previously-decoded transform coefficient comprises using only the $i^{th}$ bin of the value for the syntax element of the previously-decoded transform coefficient and no other bins of the value for the syntax element of the previously-decoded transform coefficient. The method may further include context adaptive binary arithmetic coding (CABAC) decoding the $i^{th}$ bin of the value for the syntax element of the current transform coefficient using the determined context.

In another example, this disclosure is directed to a method for decoding video data, the method including determining, for each of a plurality of bins of a value for a syntax element of a current transform coefficient, contexts using respective corresponding bins of values for the syntax element of one or more previously-encoded transform coefficients, where determining the contexts comprises determining a context for an $i^{th}$ bin of the value for the syntax element of the current transform coefficient using a corresponding $i^{th}$ bin of a value for the syntax element of a previously-encoded transform coefficient, where i comprises a non-negative integer, and where using the corresponding $i^{th}$ bin of the value for the syntax element of the previously-encoded transform coefficient comprises using only the $i^{th}$ bin of the value for the syntax element of the previously-encoded transform coefficient and no other bins of the value for the syntax element of the previously-encoded transform coefficient. The method may further include CABAC encoding the $i^{th}$ bin of the value for the syntax element of the current transform coefficient using the determined context.

In another example, this disclosure is directed to a device for coding video data, the device including a memory configured to store video data, and one or more processors. The one or more processors may be configured to determine, for each of a plurality of bins of a value for a syntax element of a current transform coefficient, contexts using respective corresponding bins of values for the syntax element of one or more previously-coded transform coefficients, where to determine the contexts, the one or more processors are configured to determine a context for an $i^{th}$ bin of the value for the syntax element of the current transform coefficient using a corresponding $i^{th}$ bin of a value for the syntax element of a previously-coded transform coefficient, where i comprises a non-negative integer, and where to use the corresponding $i^{th}$ bin of the value for the syntax element of the previously-coded transform coefficient, the one or more processors are configured to use only the $i^{th}$ bin of the value for the syntax element of the previously-coded transform coefficient and no other bins of the value for the syntax element of the previously-coded transform coefficient. The processor(s) may be further configured to CABAC code the $i^{th}$ bin of the value for the syntax element of the current transform coefficient using the determined context.

In another example, this disclosure is directed to a video coding apparatus. The video coding apparatus may include means for determining, for each of a plurality of bins of a value for a syntax element of a current transform coefficient, contexts using respective corresponding bins of values for the syntax element of one or more previously-coded transform coefficients, where the means for determining the contexts comprises means for determining a context for an $i^{th}$ bin of the value for the syntax element of the current transform coefficient using a corresponding $i^{th}$ bin of a value for the syntax element of a previously-coded transform coefficient, where i comprises a non-negative integer, and where the means for using the corresponding $i^{th}$ bin of the value for the syntax element of the previously-coded transform coefficient comprises means for using only the $i^{th}$ bin of the value for the syntax element of the previously-coded transform coefficient and no other bins of the value for the syntax element of the previously-coded transform coefficient. The video coding apparatus may further include means for CABAC coding the $i^{th}$ bin of the value for the syntax element of the current transform coefficient using the determined context.

In another example, this disclosure is directed to a non-transitory computer-readable storage medium encoded with instructions. The instructions, when executed, may cause one or more processors of a video coding device to determine, for each of a plurality of bins of a value for a syntax element of a current transform coefficient, contexts using respective corresponding bins of values for the syntax element of one or more previously-coded transform coefficients, where to determine the contexts, the one or more processors are configured to determine a context for an $i^{th}$ bin of the value for the syntax element of the current transform coefficient using a corresponding $i^{th}$ bin of a value for the syntax element of a previously-coded transform coefficient, where i comprises a non-negative integer, and where to use the corresponding $i^{th}$ bin of the value for the syntax element of the previously-coded transform coefficient, the one or more processors are configured to use only the $i^{th}$ bin of the value for the syntax element of the previously-coded transform coefficient and no other bins of the value for the syntax element of the previously-coded transform coefficient. The instructions, when executed, may further cause the one or more processors of the video coding device to CABAC code the $i^{th}$ bin of the value for the syntax element of the current transform coefficient using the determined context.

In another example, this disclosure is directed to a method of decoding video data. The method may include initializing context information for a current slice of a current picture by inheriting context information of a previously-decoded block of a previously-decoded slice as initialized context information for the current slice of the current picture, and decoding data of the current slice using the initialized context information.

In another example, this disclosure is directed to a method of encoding video data. The method may include initializing context information for a current slice of a current picture by inheriting context information of a previously-encoded block of a previously-encoded slice as initialized context information for the current slice of the current picture, and encoding data of the current slice using the initialized context information.

In another example, this disclosure is directed to a device for coding video data, the device including a memory configured to store video data, and one or more processors. The one or more processors may be configured to initialize context information for a current slice of a current picture by inheriting context information after coding a previously-coded block of a previously-coded slice of the stored video data as initialized context information for the current slice of the current picture, and to code data of the current slice using the initialized context information.

In another example, this disclosure is directed to a video coding apparatus. The video coding apparatus may include means for initializing context information for a current slice of a current picture by inheriting context information after coding a previously-coded block of a previously-coded slice as initialized context information for the current slice of the current picture, and means for coding data of the current slice using the initialized context information.

In another example, this disclosure is directed to a non-transitory computer-readable storage medium encoded with instructions. The instructions, when executed, may cause one or more processors of a video coding device to initialize context information for a current slice of a current picture by inheriting context information after coding a previously-coded block of a previously-coded slice as initialized context information for the current slice of the current picture and to code data of the current slice using the initialized context information.

In another example, this disclosure is directed to a method of processing video data. The method may include identifying a coefficient group (CG) that includes a current transform coefficient, the CG representing a subset of transform coefficients within a transform unit. The method may further include determining a size of the CG based on a transform size associated with the transform unit.

In another example, this disclosure is directed to a device for coding video data, the device including a memory configured to store video data, and one or more processors. The one or more processors may be configured to identify a coefficient group (CG) that includes a current transform coefficient of the video data, the CG representing a subset of transform coefficients within a transform unit. The one or more processors may be further configured to determine a size of the CG based on a transform size associated with the transform unit.

In another example, this disclosure is directed to a non-transitory computer-readable storage medium encoded with instructions. The instructions, when executed, may cause one or more processors of a video coding device to identify a coefficient group (CG) that includes a current transform coefficient of the video data, the CG representing a subset of transform coefficients within a transform unit, and to determine a size of the CG based on a transform size associated with the transform unit.

In another example, this disclosure is directed to an apparatus for coding video data. The apparatus may include means for identifying a coefficient group (CG) that includes a current transform coefficient, the CG representing a subset of transform coefficients within a transform unit. The apparatus may further include means for determining a size of the CG based on a transform size associated with the transform unit.

In another example, this disclosure is directed to a non-transitory computer-readable storage medium storing an encoded video bitstream. The bitstream, when processed by a video decoding device, may cause one or more processors of the video decoding device to identify a coefficient group (CG) that includes a current transform coefficient of the video data, the CG representing a subset of transform coefficients within a transform unit, and to determine a size of the CG based on a transform size associated with the transform unit.

In another example, this disclosure is directed to a non-transitory computer-readable storage medium storing an encoded video bitstream. The bitstream, when processed by a video decoding device, may cause one or more processors of the video decoding device to initialize context information for a current slice of a current picture by inheriting context information after coding a previously-coded block of a previously-coded slice as initialized context information for the current slice of the current picture and to code data of the current slice using the initialized context information.

In another example, this disclosure is directed to a non-transitory computer-readable storage medium storing an encoded video bitstream. The bitstream, when processed by a video decoding device, may cause one or more processors of the video decoding device to determine, for each of a plurality of bins of a value for a syntax element of a current transform coefficient, contexts using respective corresponding bins of values for the syntax element of one or more previously-coded transform coefficients, where to determine the contexts, the one or more processors are configured to determine a context for an ith bin of the value for the syntax element of the current transform coefficient using a corresponding ith bin of a value for the syntax element of a previously-coded transform coefficient, where i comprises a non-negative integer, and where to use the corresponding ith bin of the value for the syntax element of the previously-coded transform coefficient, the one or more processors are configured to use only the ith bin of the value for the syntax element of the previously-coded transform coefficient and no other bins of the value for the syntax element of the previously-coded transform coefficient. The bitstream, when processed by a video decoding device, may cause one or more processors of the video decoding device to CABAC code the ith bin of the value for the syntax element of the current transform coefficient using the determined context.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The techniques of this disclosure are generally related to entropy coding in block-based hybrid video coding. These techniques may be applied to any existing video codecs, such as HEVC (High Efficiency Video Coding) or these techniques may be an efficient coding tool in any future video coding standards or other proprietary or non-proprietary coding techniques. For purposes of example and explanation, the techniques of this disclosure are generally described with respect to HEVC (or ITU-T H.265) and/or ITU-T H.264.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC) or ITU-T H.265, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). An HEVC draft specification, referred to as HEVC WD hereinafter, is available from phenix.int-evry.fr/jct/doc_end_user/documents/14_Vienna/wg11/JCTVC-N1003-v1.zip.

The techniques of this disclosure may overcome various problems associated with CABAC coding. In particular, these techniques include an enhanced CABAC design and a more efficient transform coefficient context modeling technique, which may be used alone or together. In entropy coding, values for syntax elements are represented in binary formation, and each bit (or "bin") is coded using a particular context. According to various aspects of this disclosure, context information for a set of bins of a value for a syntax element may be determined using respective bins of previously-coded values for the syntax element of previous transform coefficients. Additional details are discussed below.

Figure 1:
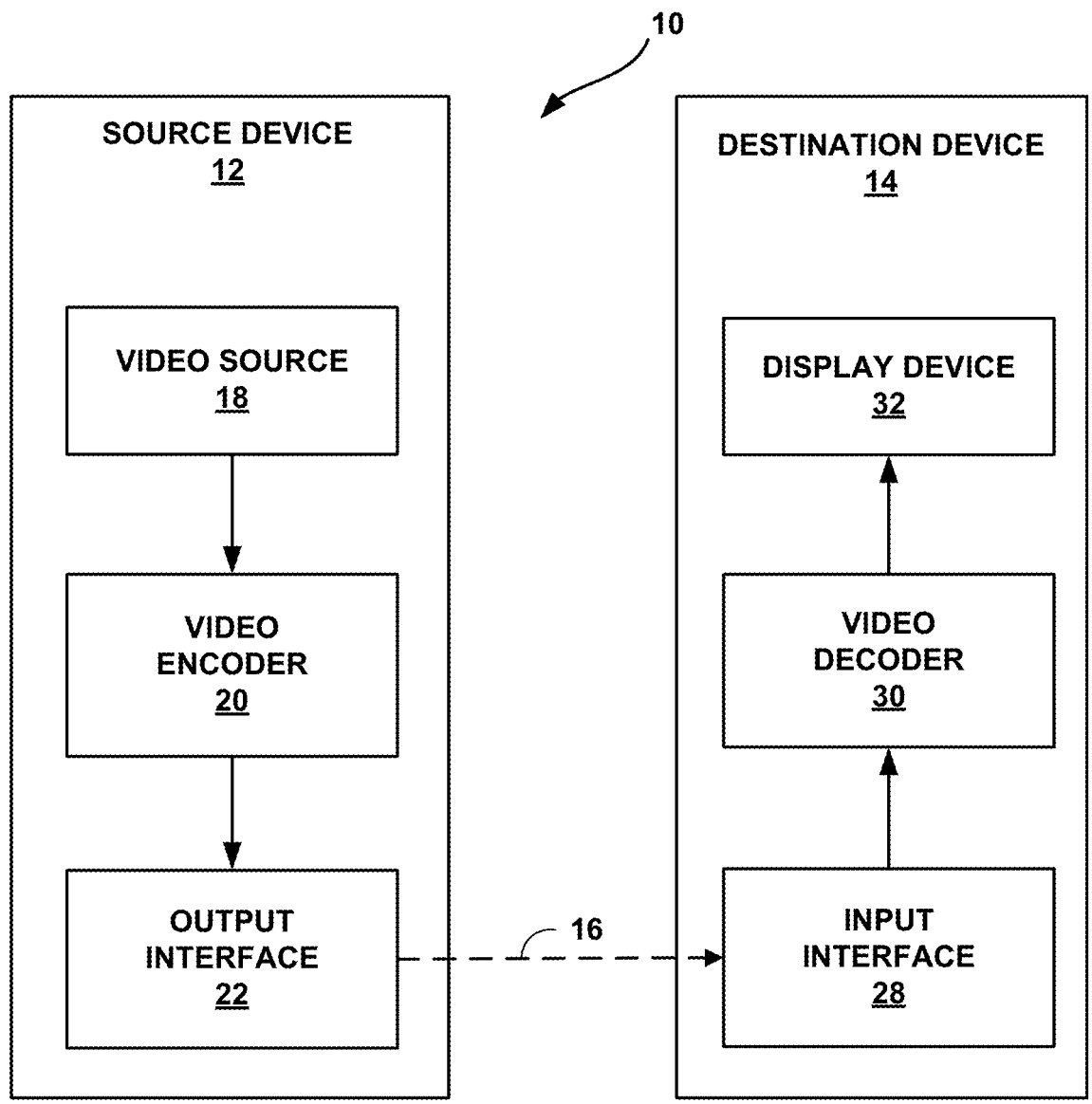
FIG. 1 is a block diagram illustrating an example video encoding and decoding system that may utilize techniques for coding data according to an enhanced context-adaptive binary arithmetic coding (CABAC) design.

FIG. 1 is a block diagram illustrating an example video encoding and decoding system 10 that may utilize techniques for coding data according to an enhanced CABAC design. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding data according to an enhanced CABAC design. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding data according to an enhanced CABAC design may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, according to ITU-T H.265, a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the treeblock with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. The RQT may also be referred to as a transform tree. In some examples, the intra-prediction mode may be signaled in the leaf-CU syntax, instead of the RQT. As another example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to the enhanced context-adaptive binary arithmetic coding (CABAC) design described in this disclosure. Video encoder 20 may also entropy encode syntax elements associated with the encoded video data for use by video decoder 30 in decoding the video data.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

In accordance with the techniques of this disclosure, video encoder 20 and video decoder 30 may be configured to code data according to an enhanced CABAC design. Certain techniques are discussed below, which may be applied individually or in any combination. This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

The following paragraphs describe BAC and CABAC techniques in more detail. BAC, in general, is a recursive interval-subdividing procedure. BAC is used to encode bins in the CABAC process in the H.264/AVC and H.265/HEVC video coding standards. The output of the BAC coder is a binary stream that represents a value or pointer to a probability within a final coded probability interval. The probability interval is specified by a range and a lower end value. Range is the extension of the probability interval. "Low" is the lower bound of the coding interval.

Application of arithmetic coding to video coding is described in D. Marpe, H. Schwarz, and T. Wiegand "Context-Based Adaptive Binary Arithmetic Coding in the H.264/AVC Video Compression Standard," IEEE Trans. Circuits and Systems for Video Technology, vol. 13, no. 7, July 2003. CABAC involves three main functions, namely, binarization, context modeling, and arithmetic coding. Binarization refers to the function of mapping syntax elements to binary symbols (or "bins"). Binary symbols may also be referred to as "bin strings." Context modeling refers to the function of estimating the probability of the various bins. Arithmetic coding refers to the subsequent function of compressing the bins to bits, based on the estimated probability. Various devices and/or modules thereof, such as a binary arithmetic coder, may perform the function of arithmetic coding.

Several different binarization processes are used in HEVC, including unary (U), truncated unary (TU), kth-order Exp-Golomb (EGk), and fixed length (FL). Details of various binarization processes are described in V. Sze and M. Budagavi, "High throughput CABAC entropy coding in HEVC," IEEE Transactions on Circuits and Systems for Video Technology (TCSVT), vol. 22, no. 12, pp. 1778-1791, December 2012.

Each context (i.e., probability model) in CABAC is represented by a state and a most probable symbol (MPS) value. Each state ($\sigma$) implicitly represents a probability ($p_\sigma$) of a particular symbol (e.g., a bin) being the Least Probable Symbol (LPS). A symbol can be an LPS or a Most Probable Symbol (MPS). Symbols are binary, and as such, the MPS and the LPS can be 0 or 1. The probability is estimated for the corresponding context and used (implicitly) to entropy code the symbol using the arithmetic coder.

The process of BAC is handled by a state machine that changes its internal values 'range' and 'low' depending on the context to code and the value of the bin being coded. Depending on the state of a context (that is, its probability), the range is divided into rangeMPS$_\sigma$ (range of the most probable symbol in state$_\sigma$) and rangeLPS$_\sigma$ (range of the least probable symbol in state$_\sigma$). In theory, the rangeLPS$_\sigma$ value of a probability state$_\sigma$ is derived by a multiplication:

rangeLPS$_\sigma$=range×$p_\sigma$, where $p_\sigma$ is the probability to select the LPS. Of course, the probability of MPS is 1−$p_\sigma$. Equivalently, the rangeMPS$_\sigma$ is equal to range minus rangeLPS$_\sigma$. BAC iteratively updates the range depending on the state of the context bin to code, the current range, and the value of the bin being coded (i.e., is the bin equal to the LPS or the MPS).

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2A:
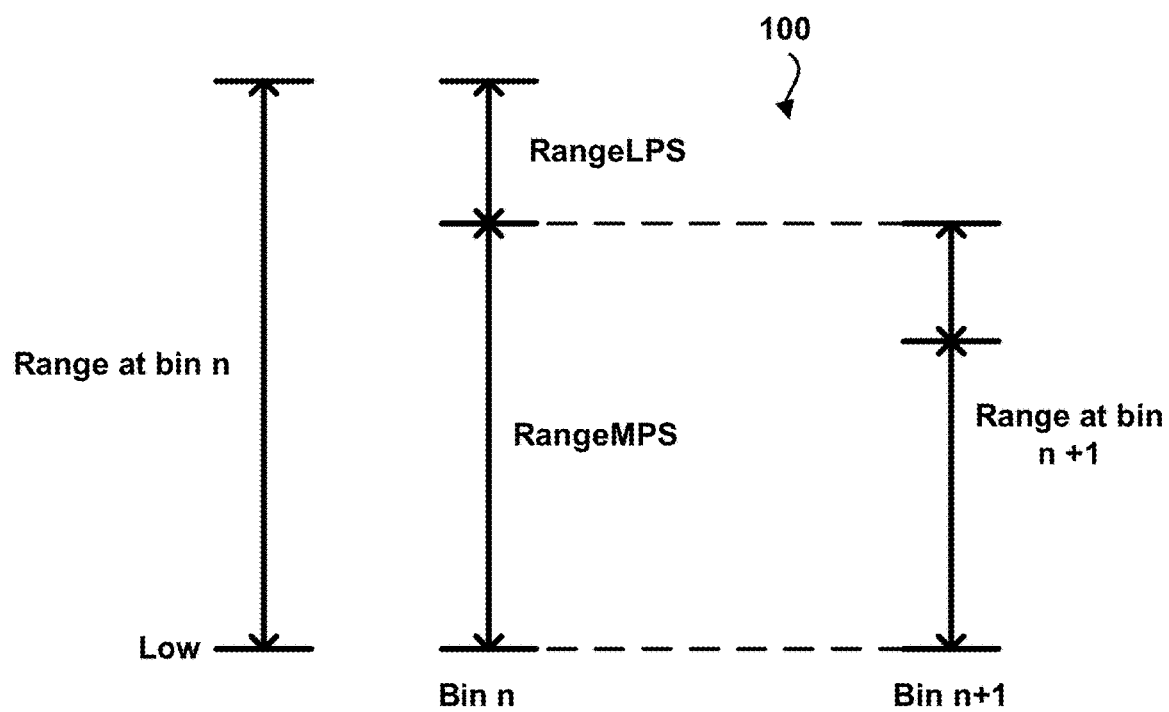
FIGS. 2A and 2B are conceptual diagrams illustrating range updating techniques according to binary arithmetic coding (BAC).
Figure 2B:
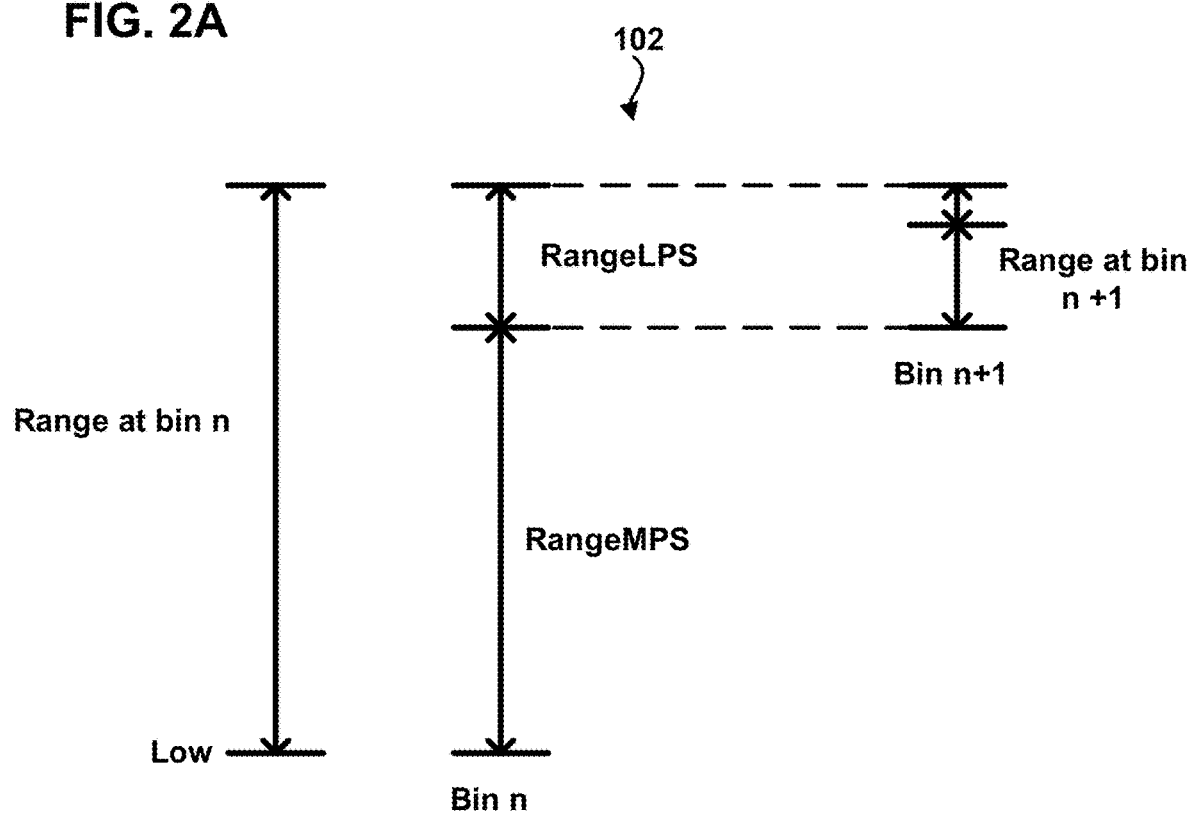

FIGS. 2A and 2B are conceptual diagrams illustrating range updating techniques according to BAC. FIGS. 2A and 2B show examples of this process at bin n. In example 100 of FIG. 2A, at bin n the range at bin2 includes the RangeMPS and RangeLPS given by the probability of the LPS ($p_\sigma$) given a certain context state ($\sigma$). Example 100 shows the update of the range at bin n+1 when the value of bin n is equal to the MPS. In this example, the low stays the same, but the value of the range at bin n+1 is reduced to the value of RangeMPS at bin n. Example 102 of FIG. 2B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

In HEVC, the range is expressed with 9 bits and the low with 10 bits. There is a renormalization process to maintain the range and low values at sufficient precision. The renormalization occurs whenever the range is less than 256. Therefore, the range is always equal or larger than 256 after renormalization. Depending on the values of range and low, the BAC outputs to the bitstream, a '0,' or a '1,' or updates an internal variable (called BO: bits-outstanding) to keep for future outputs.

Figure 3:
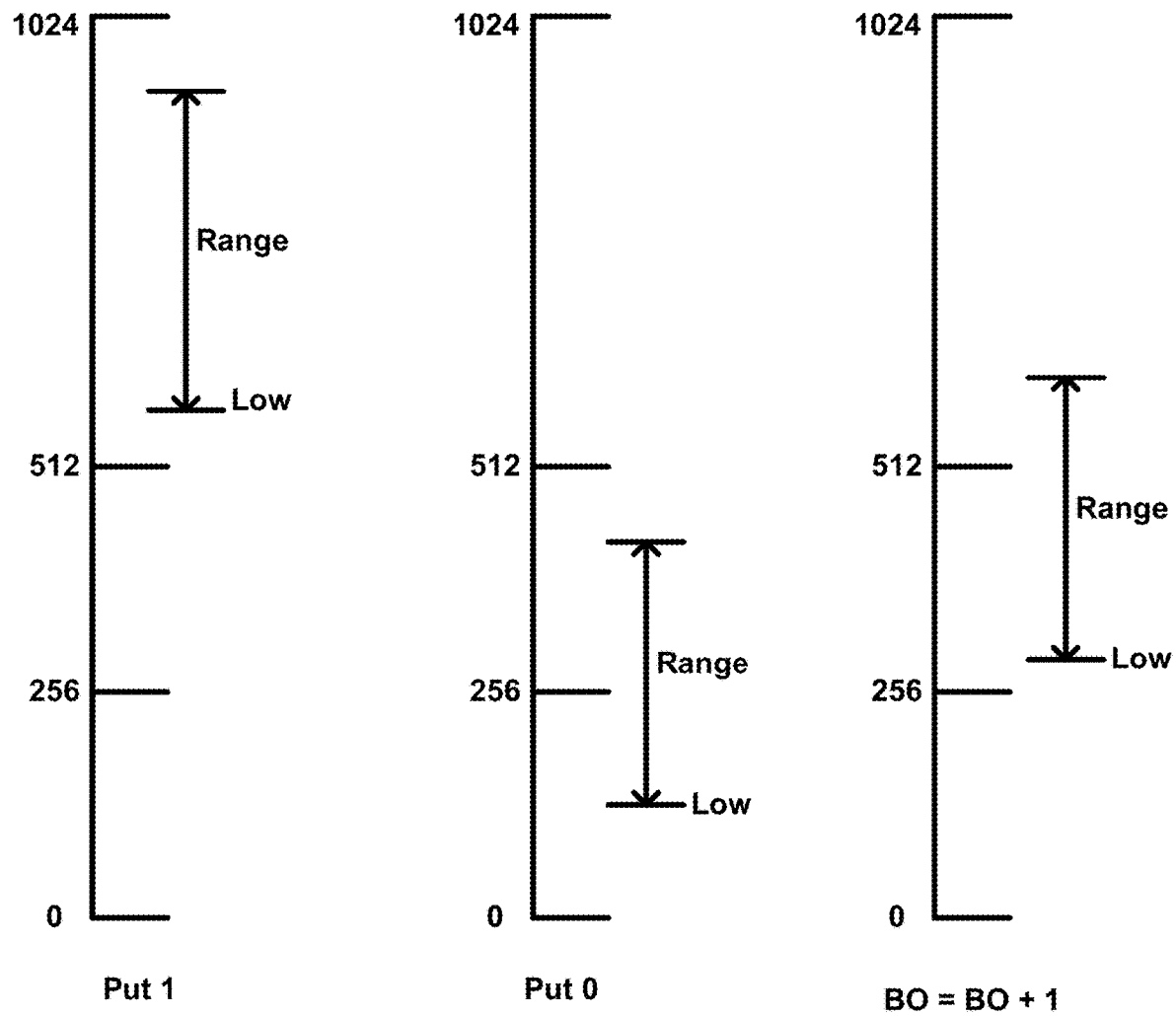
FIG. 3 is a conceptual diagram that shows examples of BAC output depending on the range.

FIG. 3 is a conceptual diagram that shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

In the CABAC context model of HEVC, there are 128 states. There are 64 possible LPS probabilities (denoted by state $\sigma$) that can be from 0 to 63. Each MPS can be zero or one. As such, the 128 states are 64 state probabilities times the 2 possible values for MPS (0 or 1). Therefore, the probability models may be stored as 7-bit entries. In each 7-bit entry, 6 bits may be allocated for representing the probability state, and 1 bit may be allocated for the most probable symbol (MPS) in the applicable context memory.

To reduce the computation of deriving LPS ranges (rangeLPS$_\sigma$), results for all cases are pre-calculated and stored as approximations in a look-up table in HEVC. Therefore, the LPS range can be obtained without any multiplication by using a simple table lookup. Avoiding multiplication can be important for some devices or applications, since this operation may cause significant latency in many hardware architectures.

A 4-column pre-calculated LPS range table may be used instead of the multiplication. The range is divided into four segments. The segment index can be derived by the question (range>>6)&3. In effect, the segment index is derived by shifting and dropping bits from the actual range. The following Table 1 shows the possible ranges and their corresponding indexes.

TABLE 1

| | Range Index | | | |
|---|---|---|---|---|
| Range | 256-319 | 320-383 | 384-447 | 448-511 |
| (range >> 6) & 3 | 0 | 1 | 2 | 3 |

The LPS range table has then 64 entries (one for each probability state) times 4 (one for each range index). Each entry is the Range LPS, that is, the value of multiplying the range times the LPS probability. An example of part of this table is shown in the following Table 2. Table 2 depicts probability states 9-12. In one proposal for HEVC, the probability states may range from 0-63

TABLE 2

| | RangeLPS | | | |
|---|---|---|---|---|
| Prob | RangeLPS | | | |
| State ($\sigma$) | Index 0 | Index 1 | Index 2 | Index 3 |
| ... | ... | ... | ... | ... |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| ... | ... | ... | ... | ... |

In each segment (i.e., range value), the LPS range of each probability state $\sigma$ is pre-defined. In other words, the LPS range of a probability state$_\sigma$ is quantized into four values (i.e., one value for each range index). The specific LPS range used at a given point depends on which segment the range belongs to. The number of possible LPS ranges used in the table is a trade-off between the number of table columns (i.e., the number of possible LPS range values) and the LPS range precision. Generally speaking, more columns results in smaller quantization errors of LPS range values, but also increases the need for more memory to store the table. Fewer columns increases quantization errors, but also reduces the memory needed to store the table.

As described above, each LPS probability state has a corresponding probability. In HEVC, 64 representative probability values $p_\sigma \in [0.01875, 0.5]$ are derived for the LPS (least probable symbol) in accordance with Equation (1), below, which is a recursive equation.

$$p_\sigma = \alpha * p_{\sigma-1} \text{ for all } \sigma = 1, \ldots, 63 \quad (1)$$

$$\text{with } \alpha = \left(\frac{0.01875}{0.5}\right)1/63$$

In the example above, both the chosen scaling factor $\alpha \approx 0.9492$ and the cardinality N=64 of the set of probabilities represent a good compromise between the accuracy of probability representation and the desire for fast adaptation. In some examples, a value of $\alpha$ closer to 1 may result in slow adaptation with higher accuracy ("steady-state behavior"), while faster adaptation can be achieved for the non-stationary case with decreasing values of $\alpha$ at the cost of reduced accuracy. The scaling factor $\alpha$ may correspond to a window size that indicates a number of previously encoded bins which have significant influence to the current up-date. The probability of the MPS (most probable symbol) is equal to 1 minus the probability of the LPS (least probable symbol). In other words, the probability of the MPS can be represented by the formula (1−LPS), where 'LPS' represents the probability of the LPS. Therefore, the probability range that can be represented by CABAC in HEVC is [0.01875, 0.98125(=1−0.01875)].

CABAC is adaptive because the probability states of a context model used to code bits (or "bins") of a value for a syntax element are updated in order to follow the signal statistics (i.e., the values of previously coded bins, e.g., for the syntax element). The update process is as follows. For a given probability state, the update depends on the state index and the value of the encoded symbol identified either as an LPS or an MPS. As a result of the updating process, a new probability state is derived, which includes a potentially modified LPS probability estimate and, if necessary, a modified MPS value.

Context switching may occur after the coding of each bin. In the event of a bin value equaling the MPS, a given state index is simply incremented by 1. This is for all states except when an MPS occurs at state index 62, where the LPS probability is already at its minimum (or equivalently, the maximum MPS probability is reached). In this case, the state index remains fixed until an LPS is seen, or the last bin value is encoded (a special end state is used for the special case of the last bin value). When an LPS occurs, the state index is changed by decrementing the state index by a certain amount, as shown in the equation below. This rule applies in general to each occurrence of a LPS with the following exception. Assuming a LPS has been encoded at the state with index σ=0, which corresponds to the equi-probable case, the state index remains fixed, but the MPS value will be toggled such that the value of the LPS and MPS will be interchanged. In all other cases, no matter which symbol has been encoded, the MPS value will not be altered. In general, a video coder may derive the new probability state in accordance with Equation (2), below, which shows a relation between a given LPS probability $p_{old}$ and its updated counterpart $p_{new}$.

$$p_{new} = \begin{cases} \max(\alpha * p_{old}, p_{62}), & \text{if a } MPS \text{ occurs} \\ \alpha * p_{old} + (1-\alpha), & \text{if a } LPS \text{ occurs} \end{cases} \quad (2)$$

To reduce the complexity, a video coder may implement CABAC such that all transition rules can be realized by at most two tables each having a number of entries. As one example, all transition rules may be realized by at most two tables that each have 128 entries of 7-bit unsigned integer values (e.g., Tables 3 and 4, below). As another example, all transition rules may be realized by at most two tables that each have 63 entries of 6-bit unsigned integer values (e.g., Table 9-41 of HEVC). Given a state index i, after updating, a video coder may define as the new state index TransIdxMPS[i] when a MPS values is coded, or TransIdxLPS[i] when a LPS values is coded.

TABLE 3

TransIdxMPS[ 128 ] =
{
2, 3, 4, 5, 6, 7, 8, 9, 10, 11, 12, 13, 14, 15, 16, 17,
18, 19, 20, 21, 22, 23, 24, 25, 26, 27, 28, 29, 30, 31, 32, 33,
34, 35, 36, 37, 38, 39, 40, 41, 42, 43, 44, 45, 46, 47, 48, 49,
50, 51, 52, 53, 54, 55, 56, 57, 58, 59, 60, 61, 62, 63, 64, 65,
66, 67, 68, 69, 70, 71, 72, 73, 74, 75, 76, 77, 78, 79, 80, 81,
82, 83, 84, 85, 86, 87, 88, 89, 90, 91, 92, 93, 94, 95, 96, 97,
98, 99, 100, 101, 102, 103, 104, 105, 106, 107, 108, 109, 110, 111, TABLE 3-continued 112, 113, 114, 115, 116, 117, 118, 119, 120, 121, 122, 123, 124,
125, 124, 125, 126, 127
};

TABLE 4

TransIdxLPS[ 128 ] =
{
1, 0, 0, 1, 2, 3, 4, 5, 4, 5, 8, 9, 8, 9, 10, 11,
12, 13, 14, 15, 16, 17, 18, 19, 18, 19, 22, 23, 22, 23, 24, 25,
26, 27, 26, 27, 30, 31, 30, 31, 32, 33, 32, 33, 36, 37, 36, 37,
38, 39, 38, 39, 42, 43, 42, 43, 44, 45, 44, 45, 46, 47, 48, 49,
48, 49, 50, 51, 52, 53, 52, 53, 54, 55, 54, 55, 56, 57, 58, 59,
58, 59, 60, 61, 60, 61, 60, 61, 62, 63, 64, 65, 64, 65, 66, 67,
66, 67, 66, 67, 68, 69, 68, 69, 70, 71, 70, 71, 70, 71, 72, 73,
72, 73, 72, 73, 74, 75, 74, 75, 74, 75, 76, 77, 76, 77, 126, 127
};

In some examples, a video coder may determine state transitions with a single table TransIdxLPS, which determines, for a given state index σ, the new updated state index TransIdxLPS [σ] in case an LPS has been observed. The MPS-driven transitions can be obtained by a simple (saturated) increment of the state index by the fixed value of 1, resulting in an updated state index min(σ+1, 62).

As discussed above, context modeling provides accurate probability estimation, which is a contributing factor for achieving higher coding efficiency. Accordingly, context modeling is an adaptive process. Different context models can be used for different bins, and the probability of the context models may be updated based on the values of previously-coded bins. Bins with similar distributions often share the same context model. The context model for each bin can be selected based on the type of syntax element, bin position in syntax element (binIdx), luma/chroma information, neighboring information, etc.

Before coding a given slice, the probability models are initialized based on one or more pre-defined values. For example, given an input quantization parameter denoted by qp and the pre-defined value denoted by initVal, the 7-bit entry of the probability model (denoted by state and MPS) could be derived in accordance with Equations (3), below.

$qp$=Clip3(0,51,$qp$);

slope=(initVal>>4)*5−45;

offset=((initVal &15)<<3)−16;

initState=min(max(1,(((slope*$qp$)>>4)+offset)),126);

MPS=(initState>=64);

state index=(($mp$State?(initState−64):(63−initState))
    <<1)+MPS; (3)

The derived state index implicitly includes the MPS information. More specifically, when the state index is an even value, the MPS value is equal to 0. Conversely, when the state index is an odd value, the MPS value is equal to 1. The value of "initVal" is in a range of [0, 255] with 8-bit precision. The pre-defined value "initVal" is slice-dependent. In other words, three sets of context initialization parameters for the probability models are used, one each in I, P, and B slices, respectively. In this way, a video encoding device configured to perform CABAC is enabled to choose for these slice types between three initialization tables such that a better fit to different coding scenarios and/or different types of video content can be achieved.

According to HEVC, another tool could be applied to allow one P (or B) slice to be initialized with B (or P) slices. For instance, the tool could be applied to allow one P slice to be initialized with the set of context initialization parameters stored for B slices. Conversely, the tool could be applied to allow one B slice to be initialized with the set of context initialization parameters stored for P slices. The related syntax elements are described in Table 5 below (which corresponds to Section 7.3.6.1 of HEVC), and the related semantics and decoding process are described below, after Table 5.

TABLE 5

|  | Descriptor |
|---|---|
| slice_segment_header( ) { | |
|    first_slice_segment_in_pic_flag | u(1) |
|    if( nal_unit_type >= BLA_W_LP && nal_unit_type <= RSV_IRAP_VCL23 ) | |
|       no_output_of_prior_pics_flag | u(1) |
|    slice_pic_parameter_set_id | ue(v) |
|    if( !first_slice_segment_in_pic_flag ) { | |
|       if( dependent_slice_segments_enabled_flag ) | |
|          dependent_slice_segment_flag | u(1) |
|       slice_segment_address | u(v) |
|    } | |
|    if( !dependent_slice_segment_flag ) { | |
|       for( i = 0; i < num_extra_slice_header_bits; i++ ) | |
|          slice_reserved_flag[ i ] | u(1) |
|       slice_type | ue(v) |
|       if( output_flag_present_flag ) | |
|          pic_output_flag | u(1) |
|       if( separate_colour_plane_flag == 1 ) | |
|          colour_plane_id | u(2) |
|       if( nal_unit_type != IDR_W_RADL && nal_unit_type != IDR_N_LP ) { | |
|          slice_pic_order_cnt_lsb | u(v) |
|          short_term_ref_pic_set_sps_flag | u(1) |
|          if( !short_term_ref_pic_set_sps_flag ) | |
|             short_term_ref_pic_set( num_short_term_ref_pic_sets ) | |
|          else if( num_short_term_ref_pic_sets > 1 ) | |
|             short_term_ref_pic_set_idx | u(v) |
|          if( long_term_ref_pics_present_flag ) { | |
| ... | |
|          } | |
|       } | |
|       if( sps_temporal_mvp_enabled_flag ) | |
|          slice_temporal_mvp_enabled_flag | u(1) |
|    } | |
|    if( sample_adaptive_offset_enabled_flag ) { | |
|       slice_sao_luma_flag | u(1) |
|       slice_sao_chroma_flag | u(1) |
|    } | |
|    if( slice_type == P || slice_type == B ) { | |
|       num_ref_idx_active_override_flag | u(1) |
|       if( num_ref_idx_active_override_flag ) { | |
|          num_ref_idx_l0_active_minus1 | ue(v) |
|          if( slice_type == B ) | |
|             num_ref_idx_l1_active_minus1 | ue(v) |
|       } | |
|       if( lists_modification_present_flag && NumPocTotalCurr > 1 ) | |
|          ref_pic_lists_modification( ) | |
|       if( slice_type == B ) | |
|          mvd_l1_zero_flag | u(1) |
|       if( cabac_init_present_flag ) | |
|          cabac_init_flag | u(1) |
|       if( slice_temporal_mvp_enabled_flag ) { | |
|          if( slice_type == B ) | |
|             collocated_from_l0_flag | u(1) |
|          if( ( collocated_from_l0_flag && num_ref_idx_l0_active_minus1 > 0 ) || ( !collocated_from_l0_flag && num_ref_idx_l1_active_minus1 > 0 ) ) | |
|             collocated_ref_idx | ue(v) |
|       } | |
|       if( ( weighted_pred_flag && slice_type == P ) || ( weighted_bipred_flag && slice_type == B ) ) | |
|          pred_weight_table( ) | |
|       five_minus_max_num_merge_cand | ue(v) |
|    } | |
|    ... | |
|    byte_alignment( ) | |
| } | |

Semantics for the syntax elements of Table 5 may be defined as follows:

cabac_init_present_flag equal to 1 specifies that cabac_init_flag is present in slice headers referring to the PPS. cabac_init_present_flag equal to 0 specifies that cabac_init_flag is not present in slice headers referring to the PPS.

cabac_init_flag specifies the method for determining the initialization table used in the initialization process for context variables, as defined in the decoding process described below. When cabac_init_flag is not present, it is inferred to be equal to 0.

Descriptors:

ae(v): context-adaptive arithmetic entropy-coded syntax element.

b(8): byte having any pattern of bit string (8 bits).

f(n): fixed-pattern bit string using n bits written (from left to right) with the left bit first.

se(v): signed integer 0-th order Exp-Golomb-coded syntax element with the left bit first.

u(n): unsigned integer using n bits. When n is "v" in the syntax table, the number of bits varies in a manner dependent on the value of other syntax elements.

ue(v): unsigned integer 0-th order Exp-Golomb-coded syntax element with the left bit first.

Table 9-4 of HEVC lists the context index (ctxIdx) for which initialization is needed for each of the three initialization types. Each ctxIdx is specified in HEVC Table 9-4 by variable corresponding initType variable. HEVC Table 9-4 also lists the table number that includes each of the values of initValue needed for the initialization. For P and B slice types, the derivation of initType depends on the value of the cabac_init_flag syntax element. A video coder may derive the variable initType using operations described by the following pseudocode:

```
if( slice_type = = I )
    initType = 0
else if( slice_type = = P )
    initType = cabac_init_flag ? 2 : 1
else
    initType = cabac_init_flag ? 1 : 2
```

A video coding device, such as an HEVC-compliant video decoder, may update the probability state for a context model at various stages. For a given probability state, the update depends on the state index and the value of the encoded symbol identified either as an LPS or an MPS. By implementing the updating process, the video coding device derives a new probability state for the corresponding context model. The new probability state may consist of a potentially-modified LPS probability estimate and, if applicable, a modified MPS value. The derivation of the transition rules for the LPS probability is based on the following relation between a given LPS probability $p_{old}$ and the LPS probability's updated counterpart $p_{new}$:

$$p_{new} = \begin{cases} \max(\alpha * p_{old}, p_{62}), & \text{if a } MPS \text{ occurs} \\ \alpha * p_{old} + (1-\alpha), & \text{if a } LPS \text{ occurs} \end{cases} \quad (4)$$

To reduce complexity, the video coding device may implement CABAC in such a way that all transition rules can be realized using, at most, two tables, with each table having 128 entries of 7-bit unsigned integer values. Given a state index "i," the video coding device may define the new state index after updating as TransIdxMPS[i] when an MPS value is coded, or TransIdxLPS[i] when an LPS value is coded. A TransIdxMPS table and a TransIdxLPS table are illustrated below.

TransIdxMPS[ 128 ] =
{
   2, 3, 4, 5, 6, 7, 8, 9, 10, 11, 12, 13, 14, 15, 16, 17,
   18, 19, 20, 21, 22, 23, 24, 25, 26, 27, 28, 29, 30, 31, 32, 33,
   34, 35, 36, 37, 38, 39, 40, 41, 42, 43, 44, 45, 46, 47, 48, 49,
   50, 51, 52, 53, 54, 55, 56, 57, 58, 59, 60, 61, 62, 63, 64, 65,
   66, 67, 68, 69, 70, 71, 72, 73, 74, 75, 76, 77, 78, 79, 80, 81,
   82, 83, 84, 85, 86, 87, 88, 89, 90, 91, 92, 93, 94, 95, 96, 97,
   98, 99, 100, 101, 102, 103, 104, 105, 106, 107, 108, 109, 110, 111,
   112, 113, 114, 115, 116, 117, 118, 119, 120, 121, 122, 123, 124,
   125, 124, 125, 126, 127
};
TransIdxLPS[ 128 ] =
{
   1, 0, 0, 1, 2, 3, 4, 5, 4, 5, 8, 9, 8, 9, 10, 11,
   12, 13, 14, 15, 16, 17, 18, 19, 18, 19, 22, 23, 22, 23, 24, 25,
   26, 27, 26, 27, 30, 31, 30, 31, 32, 33, 32, 33, 36, 37, 36, 37,
   38, 39, 38, 39, 42, 43, 42, 43, 44, 45, 44, 45, 46, 47, 48, 49,
   48, 49, 50, 51, 52, 53, 52, 53, 54, 55, 54, 55, 56, 57, 58, 59,
   58, 59, 60, 61, 60, 61, 60, 61, 62, 63, 64, 65, 64, 65, 66, 67,
   66, 67, 66, 67, 68, 69, 68, 69, 70, 71, 70, 71, 70, 71, 72, 73,
   72, 73, 72, 73, 74, 75, 74, 75, 74, 75, 76, 77, 76, 77, 126, 127
};

Arithmetic coding is based on recursive interval division. In conventional arithmetic coding, a range, with an initial value of 0 to 1, is divided into two subintervals based on the probability of the bin. The encoded bits provide an offset that, when converted to a binary fraction, provides a selection of one of the two subintervals. The selected subinterval indicates the value of the decoded bin. After every decoded bin, the video decoder may update the range to equal the selected subinterval. In turn, the video decoder may repeat the interval division process, to implement the interval division as a recursive procedure. The range and offset have limited bit precision, and thus, the video decoder may implement renormalization in instances where the range falls below a certain (e.g., predetermined) value to prevent underflow. The video decoder may perform renormalization after each bin is decoded.

The video coding device may perform arithmetic coding based on probability information that is obtained in a variety of ways. According to a "regular coding mode" of arithmetic coding, the video coding device may use an estimated probability. In cases of arithmetic coding according to the regular coding mode, the bin string is said to be context coded. According to a "bypass mode" of arithmetic coding, the video coding device may use an assumed equal probability of 0.5. In cases of arithmetic coding according to the bypass mode, the bin string is said to be bypass coded. For bypass-coded bins, the video coding device may divide the range into subintervals using a shift. In contrast, the video coding device may use a lookup table to divide the range in the case of context-coded bins. Arithmetic coding according to HEVC is the same as arithmetic coding according to H.264/AVC. According to HEVC and H.264/AVC, the video coding device may employ table-based binary arithmetic coding, and the flow of the regular coding mode for arithmetic coding is described in further detail in the following paragraphs with respect to the accompanying drawings.

Video encoder 20 and video decoder 30 (either or both of which are generically referred to at various portions of this disclosure as a "video coder") may be configured with techniques of this disclosure for context modeling of transform coefficient data. Assuming that one transform coefficient is represented by its magnitude and sign flag, then the magnitude, after binarization, is denoted by a bin string with bin index from 0 to M (M is a positive integer). Various CABAC enhancements of this disclosure are described below with respect to video encoder 20, video decoder 30, and/or one or more components thereof. It will be appreciated that the various techniques of this disclosure may be implemented individually or in any combination thereof, with each other and/or any other techniques described herein.

This disclosure recognizes that the various existing CABAC techniques as discussed above may encounter certain problems. For example, the context modeling methods in HEVC are specially designed for CTUs that are no larger than 64×64. When larger CTUs (e.g., 128×128, 256× 256, or even larger) are used, directly reusing current context modeling methods may be less efficient and/or result in parsing issues. As another example, although the changes proposed JCTVC-H0228 (which is discussed in further detail below with respect to FIG. 12) may potentially provide better coding performance, the replacement of multiple-pass coding by a single-pass coding is harmful for parallelization and the switch of different context model sets decreases the throughput. As another example, the initialized probabilities derived from the pre-define initialization values are slice-type dependent. However, the fixed initialized probabilities for one slice type may not be adaptive based on the statistics of coded information which restricts the coding performance of CABAC.

Figure 4:
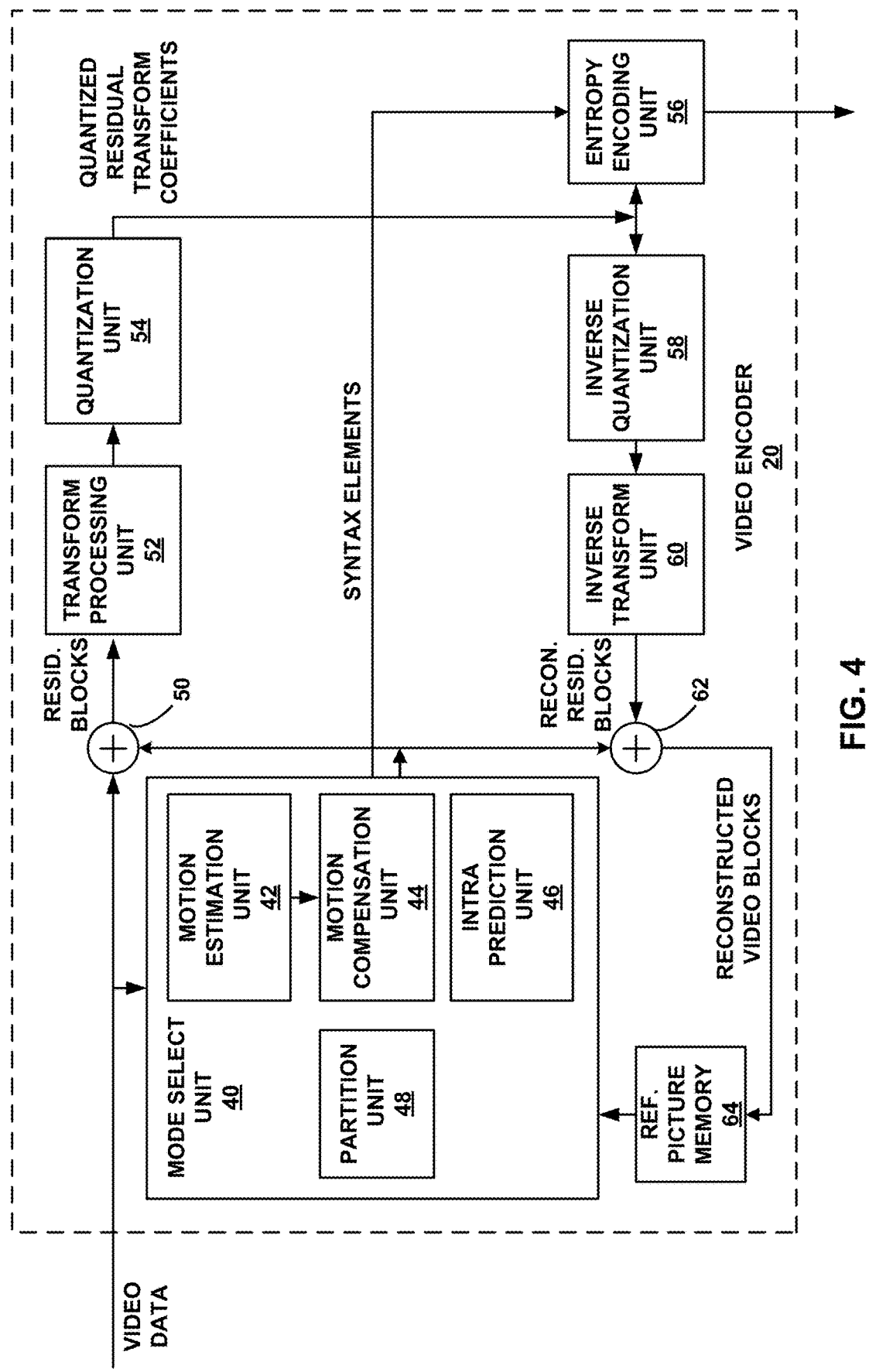
FIG. 4 is a block diagram illustrating an example of a video encoder that may implement techniques for coding data according to an enhanced CABAC design.

FIG. 4 is a block diagram illustrating an example of video encoder 20 that may implement techniques for coding data according to an enhanced CABAC design. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 4, video encoder 20 receives a current video block within a video frame to be encoded. In the example of FIG. 4, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 4) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform CABAC and/or enhanced CABAC according to the techniques of this disclosure. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Various components of video encoder 20, such as entropy encoding unit 56, may implement the enhanced CABAC techniques of this disclosure to perform context modeling. According to various aspects of this disclosure, entropy encoding unit 56 may perform context modeling for the i-th bin of a transform coefficient using the values of the i-th bins of one or more previously-encoded transform coefficients. Said another way, the context modeling of the i-th bin for a current transform coefficient is dependent on the values of the corresponding i-th bins of one or more transform coefficients that entropy encoding unit 56 has already encoded. Context modeling of the i-th bin may exclude use of other bins of the values for the previously-encoded transform coefficients, in order to allow context modeling for a plurality of bins of the values for the transform coefficients to be performed in parallel.

By performing context modeling for a bin of a current transform coefficient using the values of i-th bins of previously-encoded transform, entropy encoding unit 56 may implement the techniques of this disclosure to provide one or more potential improvements over existing CABAC coders. As an example of such a benefit, entropy encoding unit 56 may improve the parallelization of the context modeling operation by implementing the techniques of this disclosure. More specifically, entropy encoding unit 56 may perform context modeling, in parallel, for multiple bins of a transform coefficient currently being encoded. For instance, if entropy encoding unit 56 determines that bin values corresponding to multiple bins are available from previously-encoded transform coefficient(s), then entropy encoding unit 56 may at least partially parallelize the context modeling operations for the bins of the transform coefficient being encoded currently.

Entropy encoding unit 56 may perform the parallelized context modeling of this disclosure in accordance with a multi-pass coding scheme. More specifically, a multi-pass coding scheme refers to a coding technique by which entropy encoding unit 56 assigns separate threads to each particular bin (e.g., thread 1 for the first bin, thread 2 for the second bin, and so on). Thus, according to multi-pass coding, all bin0 instances can be encoded in sequence, independently of the bin1 instances that are coded in sequence, both of which are coded independently of the bin2 instances that are encoded in sequence, etc. In some examples, entropy encoding unit 56 may perform the multi-pass coding with respect to transform units of single block. Moreover, for bins that are encoded according to the regular mode, entropy encoding unit 56 may perform several encoding passes. Each pass may pertain to a single corresponding bin of all transform coefficients. In other words, during each pass, entropy encoding unit 56 does not utilize information relating to the other passes. For instance, entropy encoding unit 56 may encode the first bin (if needed) of all transform coefficients within one transform unit/CG in a first pass. In this example, in a second pass, entropy encoding unit 56 may encode the second bin of all transform coefficients within one transform unit/CG, if needed, and so on.

In one example use case, entropy encoding unit 56 may perform context modeling for bin0 of a currently-coded transform coefficient using the value of bin0 of the previously-coded neighboring transform coefficient, perform context modeling for bin1 of a currently-coded transform coefficient using the value of bin1 of the previously-coded neighboring transform coefficient, and so on. To allow parallelism as discussed above, entropy encoding unit 56 may be configured so as to avoid using different bins when performing context modeling of a particular bin. For example, entropy encoding unit 56 may determine a context for entropy encoding a bin1 of a current transform coefficient without using any bin0 values of the previously-coded transform coefficients. In cases where a set of bins is entropy encoded in parallel, when the respective bins needed for determining the bin contexts are available, entropy encoding unit 56 may use the respective available bin values for the previously-coded transform coefficient, entropy encoding unit 56 may perform the context modeling for multiple bins of the currently-coded transform coefficient in parallel. In the use case scenario described above, if bin0 and bin1 are both available from the previously-coded neighbor transform coefficient, then entropy encoding unit 56 may parallelize the context modeling of bin0 and bin1 for the currently-coded transform coefficient. In this manner, entropy encoding unit 56 may implement the techniques of this disclosure to perform CABAC within the tenets of multi-pass coding as described in HEVC, while improving the context selection for bins of a current transform coefficient by enabling and potentially exploiting parallelization of context modeling operations.

It will be appreciated that entropy encoding unit 56 can, but may not necessarily, perform the entire context modeling of all such bins in parallel. More specifically, entropy encoding unit 56 may perform some portions of the context modeling of multiple bins concurrently. In this way, entropy encoding unit 56 may implement the techniques of this disclosure to draw upon multicore processing technology and/or multiple processors to improve the context modeling operations for a currently-coded transform coefficient.

By encoding corresponding bins of different transform coefficients with parallelization enabled, entropy encoding unit 56 may provide one or more advantages over existing multi-pass CABAC techniques. For instance, by coding the corresponding bins (e.g., the respective bin0) of multiple transform coefficients in a single pass, entropy encoding unit 56 may circumvent the need to store and retrieve a new context model frequently at bin transitions. Instead, entropy encoding unit 56 may use a single context model across a given pass, because the pass targets the corresponding bins (e.g., the respective bin0) across multiple transform coefficients. In this way, entropy encoding unit 56 may implement the parallelized context selection techniques of this disclosure to mitigate or potentially eliminate time delays and resource churn that arise from frequent context-switching. In contrast, existing multi-pass coding would require frequent context model save- and retrieve-operations, because of encoding bin0, bin1, bin2, etc. for a first transform coefficient, and then encoding bin0, bin1, bin2, etc. for a second transform coefficient, and so on.

Figure 10:
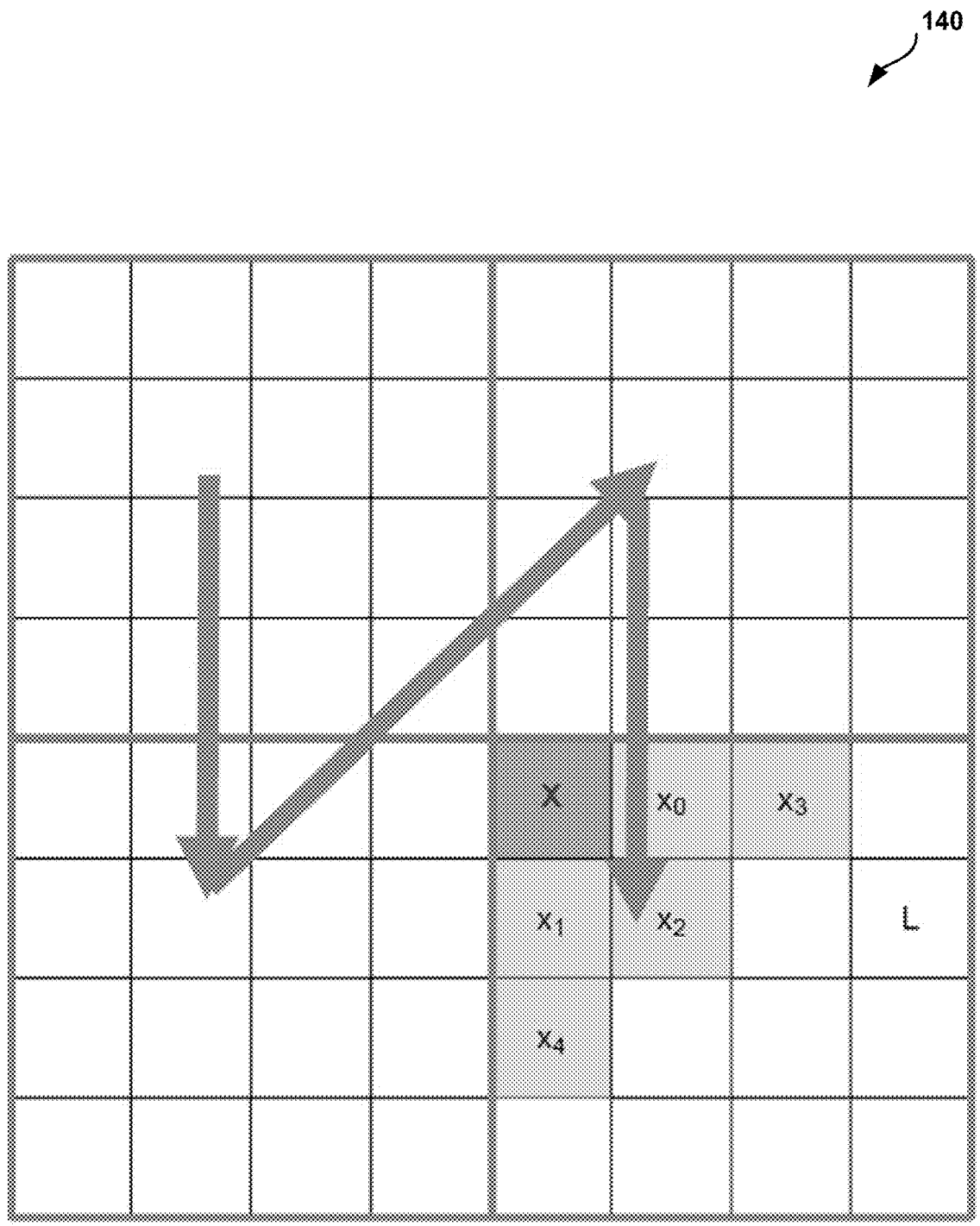
FIG. 10 depicts one example of a template that entropy decoding unit and/or entropy encoding unit may use with respect to the context modeling techniques described herein.

For instance, entropy encoding unit 56 may generate or otherwise access one or more pre-defined templates to use for the i-th bin context modeling functionalities described herein. One non-limiting example of a pre-defined template that entropy encoding unit 56 may use for context modeling of an i-th bin of a currently-coded transform coefficient is illustrated in FIG. 10. A pre-defined template, such as template 140 of FIG. 10 defines a diagonal scan order for an 8×8 transform block, where denotes the last significant scan position, 'x' denotes the current scan position, and "$x_i$," denotes the neighbors covered by local template 140. With respect to $x_i$, the value of "i" is in the range of zero through 4, and the range constraint is expressed as i∈[0,4]. In accordance with one or more aspects of this disclosure, entropy encoding unit 56 may use the i-th bins of transform coefficients located in local template 140 for context modeling of the corresponding i-th bin of a transform coefficient that is being encoded currently. According to some implementations, entropy encoding unit 56 may use multiple templates to perform the parallelized bin context modeling of this disclosure. In one example, the template size and/or shape is dependent on one or more of the following criteria: (i) the size of transform units; or (ii) modes; or (iii) the position of the current transform coefficients within the current transform unit or coefficient group (CG); or (iv) color component information, such as luma and/or chroma component information.

By using one or more pre-defined templates to traverse a previously-coded TU for bin values, entropy encoding unit 56 may implement the techniques of this disclosure to provide one or more enhancements over existing CABAC technology. For instance, by using a TU traversal template, such as local template 140 of FIG. 10, entropy encoding unit 56 may circumvent the need to separately determine a traversal scheme with respect to different coding passes. Thus, by implementing the template-based parallelized context selection techniques of this disclosure, entropy encoding unit 56 may increase throughput with respect to bin coding, while maintaining coding precision.

According to another example implementation, entropy encoding unit 56 may only apply the parallelized context modeling techniques of this disclosure to the first 'K' bins of the currently-coded transform coefficient, where 'K' is smaller than M, and where 'M' denotes the upper bound of the available bin indexes, and where M starts from 0. Entropy encoding unit 56 may encode the remaining (M+1−K) bins are coded using another context modeling technique, or according to bypass mode.

According to another example implementation, entropy encoding unit 56 may define the universe of previously-coded transform coefficients as the 'N' consecutive transform coefficients in the encoding order within the current transform unit or CG before the transform coefficient currently being encoded. Alternatively, entropy encoding unit 56 may determine N to be a variable. In one example, entropy encoding unit 56 may determine the value of N dependent on the relative position of the currently-encoded transform coefficient in the current transform unit. In another example, entropy encoding unit 56 may determine the value of N dependent on the transform unit size.

In another implementation, entropy encoding unit 56 may define the universe of previously-encoded transform coefficients as those transform coefficients positioned at the neighborhood of the current position within the current transform unit or CG. In one example, the neighborhood of the current position is constrained to those positions directly adjacent to the current position, or positions either directly adjacent to or separated from the current position. In another example, the neighborhood may also include these positions, but expand to include positions in one or more spatial neighboring transform units.

In accordance with various aspects of this disclosure, entropy encoding unit 56 may define the context index of a bin as a function of values associated with one or more previously-coded transform coefficients. For instance, entropy encoding unit 56 may use a function that yields the sum of all i-th bin values of the previously-coded transform coefficients. More specifically, in this example, entropy encoding unit 56 may perform a summation of the values of the available i-th bin values of all previously-encoded transform coefficients of the TU/CG. In turn, entropy encoding unit 56 may use the resulting sum as the context index (CtIdx) during context modeling for the i-th bin of the currently-coded transform coefficient. In another example, entropy encoding unit 56 may define a cut-off value. In this example, when the output of the function exceeds the pre-defined cut-off value, entropy encoding unit 56 may use the same context with respect to the bin currently being coded. In some examples, entropy encoding unit 56 may determine the cut-off value is based on (or to be dependent upon) the bin index/transform unit size/coding mode/the transform coefficient position within one transform unit.

In some examples, entropy encoding unit 56 may encode the corresponding bins coded in different passes such that these bins share the same context models. In one example, entropy encoding unit 56 may determine that the context index derivation method, e.g. the function to calculate the context index, for bins in different passes are different. According to one example, entropy encoding unit 56 may determine that the context index derivation method, e.g. the function to calculate the context index, for bins in different passes may be the same.

According to some aspects of this disclosure, entropy encoding unit 56 may keep the context index derivation rule unchanged for the same pass in different sizes of transform units. However, entropy encoding unit 56 may apply an offset to the context index to perform context modeling for the currently-coded bin. For instance, entropy encoding unit 56 may determine that two different transform sizes have two sets of context models. In turn, entropy encoding unit 56 may define the offset as the number of context models in one such set. For instance, if entropy encoding unit 56 determines that the TU size is less than a square of predefined dimensions M×M, then entropy encoding unit 56 may determine that each such TU (smaller than M×M) TU size has its own respective set of context models. Conversely, entropy encoding unit 56 may determine that all TUs with sizes equal to or larger than M×M share the same set of context models.

In various use case scenarios, entropy encoding unit 56 may set the value of M at 16. More specifically, in these examples, if entropy encoding unit 56 determines that the size of the currently-coded TU is less than a 16×16 square, then entropy encoding unit 56 may determine that the currently-coded TU has is associated with a set of context models that corresponds to the TU's particular size. Conversely, if entropy encoding unit determines that the currently-coded TU has a size that equal to or larger than 16×16, then entropy encoding unit 56 may determine that the currently-coded TU shares the same set of context models with all other TUs that have a size equal to or greater than 16×16. In some examples, entropy encoding unit 56 may apply the TU size-based context selection only to luma blocks.

According to some examples, the Rice parameter used for coding the remaining bins is dependent on transform size. Alternatively, or in addition, the Rice parameter may be dependent on coding mode. In one example, instead of using Golomb-Rice code for coeff_abs_level_remaining, entropy encoding unit 56 may use other binarization techniques. Alternatively, or in addition, more than one binarization method may be applied for coding the coeff_abs_level_remaining syntax element. In one example, the binarization method (e.g., Rice parameter) used for coding coeff_abs_level_remaining is dependent on coding modes. Alternatively, the binarization method (e.g., Rice parameter) used for coding coeff_abs_level_remaining may be dependent on the relative position within one TU. Alternatively, the binarization method (e.g., Rice parameter) used for coding coeff_abs_level_remaining may be dependent on the distance from the first coded/decoded transform coefficient in scan order. In some instances, the binarization method (e.g., Rice parameter) used for coding coeff_abs_level_remaining is dependent on coding group position relative to the transform unit.

According to some aspects of this disclosure, entropy encoding unit 56 may determine the coefficient group (CG) size based on the transform size. In other words, according to these aspects, the CG size is dependent on transform size. Alternatively, or in addition, entropy encoding unit 56 may determine the CG size based on the coding mode. In these examples, entropy encoding unit 56 may determine the CG size as being dependent on one or both of the transform size and/or the coding mode. Alternatively, or in addition, entropy encoding unit 56 may determine the CG size based on a transform matrix.

According to some aspects of this disclosure, entropy encoding unit 56 may also apply the parallelized context modeling techniques can also to the blocks that are encoded using transform bypass mode (also referred to as "transform skip mode"). Transform bypass mode refers to a coding mode according to which video encoder 20 may skip the transform and quantization operations of encoding, to provide a lossless coding output. Thus, according to certain aspects of this disclosure, entropy encoding unit 56 may expand the parallelized context selection techniques to provide the potential resulting advantages in instances of lossless coding.

Example details of various transform coefficient context modeling techniques of this disclosure are discussed below in further detail. One example of context modeling in accordance with multi-pass coding is described below. According to this example, entropy encoding unit 56 may apply the coding elements and coding order (multiple pass coding, and CG-based) as laid out in HEVC. In addition, entropy encoding unit 56 may apply the binarization techniques while keeping the magnitudes of the transform coefficients unchanged. However, entropy encoding unit 56 may modify the context index and Rice parameter calculation method for coding magnitudes of the transform coefficients.

The context index calculation for bin0 (significant flag) may be dependent on the following information: the number of non-zero coefficients in the template (i.e., magnitudes of coefficients are larger than 0); the position of the current coefficient within the current TU; the TU size for the luma component; and the color components. With respect to the color component dependency, the luma and chroma are considered separately. Additionally, in considering the TU size for the luma component, the context index calculation is independent with TU size for luma. The TU size of the luma component may include three sets, namely, 4×4 TU, 8×8 TU, 16×16 and above TUs.

For bin1 and bin2 (Grt than 1, Grt than 2), the context index calculation is dependent on the following information: the number of absLevels in the template larger than 1 (for bin1) and larger than 2 (for bin2); the position of the current coefficient within the current TU; and the color components. The Rice parameter derivation process is dependent on bypass coding information, and on the value of the sum_absolute_levelMinus1 syntax element.

In one example, entropy encoding unit 56 may define the function sum_template(k) to return the number of coefficients in a template, such that that the magnitudes of the coefficients are larger than k. An example of the sum_template(k) function is as follows:

$$\text{sum\_template}(k) = \sum \delta_j(x_i, k)$$

$$\text{with } \delta_j(x, k) = \begin{cases} 1 & |x_i| > k \\ 0 & x_i = 0 \end{cases},$$

Additionally, in this example, entropy encoding unit 56 may define a function $f(x, y, n, t)$ to handle the position information and another function $\delta_k(u, v)$ to handle the component information as follows:

$$f(x, y, n, t) = \begin{cases} n & x + y < t \\ 0 & x + y \geq t \end{cases}$$

$$\delta_k(u, v) = \begin{cases} u & v = 0 \\ 0 & v \neq 0 \end{cases}$$

FIG. 10 depicts one example of a template (local template 140) that entropy decoding unit 70 and/or entropy encoding unit 56 may use with respect to the context modeling techniques described herein. The current transform coefficient is marked as 'X' and the five spatial neighbors are marked as '$X_i$' (with 'i' representing an integer from 0 through 4). If any one of the following conditions is satisfied, then entropy encoding unit 56 may mark $X_i$ as unavailable and not used in the context index derivation process:
   the position of $X_i$ and current transform coefficient X are not located in the same transform unit; or
   the position of $X_i$ is located outside of the picture's horizontal or vertical boundaries; or
   the transform coefficient $X_i$ has not yet been coded. In the case of multi-pass coding, whenever the bins in the same coding pass are coded, the bins could be used in the context index derivation process. Therefore, from a decoding perspective, it is not necessary to fully decode one transform coefficient.

Alternatively, entropy encoding unit 56 may apply one or more other templates that can include the information from a neighboring transform unit. In various examples, the neighboring TU may be a spatial neighbor or a temporal neighbor. According to one or more of the context modeling techniques described herein, the context index calculations may be defined as described in the following paragraphs.

With respect to bin0, entropy encoding unit 56 may derive the context index as follows:

$$c_0 = \min(\text{sum\_template}(0), 5) + f(x, y, 6, 2) + $$
$$\delta_k(f(x, y, 6, 5), cIdx) + \text{offset}(cIdx, \text{width})$$
$$c_0 = c_0 + \text{offset}(cIdx, \text{width})$$

where $$\text{offset}(v, w) = \begin{cases} w == 4 ? 0 : \begin{pmatrix} w == 8 ? NumberLumaCtxOneset: \\ NumberLumaCtxOneset * 2 \end{pmatrix} & v = 0 \\ NumberLumaCtxOneset * 3 & v \neq 0 \end{cases}$$

In one example, based on the range of $c_0$, one set of luma contexts may include a number of context models that equals the value of NumberLumaCtxOneset. For instance, the set of luma contexts may include 18 context models. With respect to different transform sizes (with the transform width denoted by 'w') for coding luma bin0s, entropy encoding unit 56 may select a different set for each transform size. In addition, chroma and luma contexts are separated to further improve the coding performance. For YCbCr inputs, the three color components, i.e., Y, Cb and Cr are represented with component index v equal to 0, 1, and 2, respectively.

In these examples, entropy encoding unit 56 may derive the context index for bin1 as follows:

$$c_1 = \min(\text{sum\_template}(1), 4) + N$$

$$c_1 = c_1 + \delta_k(f(x,y,5,3), cIdx) + \delta_k(f(x,y,5,10), cIdx)$$

Additionally, in these examples, entropy encoding unit 56 may derive the context index for bin2 as follows:

$$c_2 = \min(\text{sum\_template}(2), 4) + N$$

$$c_2 = c_2 + \delta_k(x, y, 5, 3), cIdx) + \delta_k(x, y, 5, 10), cIdx)$$

In one example, N is equal to 0. In another example, N is equal to 1. Alternatively, or in addition, when N is equal to 1, entropy encoding unit 56 may code the first bin1 or bin2 with the context index c1 or c2 equal to 0. In this example, entropy encoding unit 56 may code the other instances of bin1s and bin2s according to the equations above.

In one example, entropy encoding unit 56 may encode bin1 and bin2 with the same set of context models, but with different indices. Alternatively, bin1 and bin2 are coded with two sets of context models and no dependency between them exists. For the remaining bins, entropy encoding unit 56 may apply the design laid out in HEVC or the design in JCTVC-H0228. In various examples, entropy encoding unit 56 may use different constant values in building the various functions described above.

Additional aspects of this disclosure are directed to context initialization enhancements. The context initialization enhancements of this disclosure may be implemented independently of the parallelized context selection techniques described above, or may be implemented in combination with any one or more of the parallelized context selection techniques described above. One or more of the context initialization techniques of this disclosure are directed to reusing context information from previously-encoded information. For instance, entropy encoding unit 56 may inherit, or otherwise derive, the context information for a slice by copying a status from a previously-encoded slice, which may belong to the current picture or a previously-encoded picture. In various examples in accordance with the inheritance-based context initialization techniques of this disclosure, the term 'status' refers to a combination of state information and a most probable symbol (MPS) value. In the following description, the term 'slice' may be used interchangeably with the term 'tile.'

By inheriting the context initialization information from a previously-encoded slice, entropy encoding unit 56 may implement the techniques of this disclosure to provide enhanced accuracy as compared to existing CABAC context initialization techniques. For instance, existing CABAC context initialization techniques rely on obtaining context status information from a table. However, the table is formed using static information. However, according to the inheritance-based context initialization techniques of this disclosure, entropy encoding unit may draw context initialization information from a previously-encoded slice that is of the same slice type and/or has the same quantization parameters (QPs) as the slice currently being encoded. In this way, entropy encoding unit 56 may implement the techniques of this disclosure to improve the accuracy of the context initialization information used for a current slice.

According to some implementations, entropy encoding unit 56 may identify the center LCU of a previously-encoded slice as the slice from which to inherit the context initialization information. In various examples, entropy encoding unit 56 may inherit context initialization for multiple slices of the current picture from multiple corresponding previously-encoded slices. In one example, entropy encoding unit 56 may use the same block (namely, the center LCU) of the previously-encoded picture from which to inherit the context initialization information for all of the multiple slices encoded according to the context initialization techniques of this disclosure. In another example, entropy encoding unit 56 may inherit the context initialization information for each of the multiple slices from the respective center LCU from each of the corresponding slices of the previously-encoded picture.

For instance, after encoding the center LCU of the previously-encoded picture, entropy encoding unit 56 may store all of the status information with respect to slice context initialization. In turn, entropy encoding unit 56 may access or read the copied status information and use the status information for initializing the context for one or more slices of the picture currently being encoded. By using the status information from a previously-encoded picture to perform context initialization for slices of a current picture, entropy encoding unit 56 may reduce the reliance on a fixed table of static information for the purpose of context initialization. For instance, after using the fixed table to initialize context for slices of a first picture, as well as for any intra-coded pictures, entropy encoding unit 56 may perform context initialization for inter-coded pictures that are encoded subsequently. Entropy encoding unit 56 may implement the inheritance-based context initialization techniques of this disclosure with respect to P slices and/or B slices.

Additional example details for the context initialization techniques of this disclosure are described below. Entropy encoding unit 56 may, additionally or alternatively, be configured to perform techniques according to this disclosure for context initialization, as discussed below. Entropy encoding unit 56 may implement the context initialization techniques of this disclosure to inherit the context information after encoding one block located in a previously encoded picture as the initialized context information for coding the current slice. Entropy encoding unit 56 may apply the inheritance-based context initialization techniques to P and/or B slices. Additionally, the position of the 'one block' referred to above is pre-defined and fixed for one whole sequence. For instance, the largest coding unit size (LCU) is denoted by "N×N," the picture width is denoted by "W," and the picture height is denoted by "H." In this example, the number of LCUs within one LCU row, denoted by "PicWidthInCtbsY, is equal to the output of a ceiling function, namely, Ceil(W÷N). Additionally, in this example, the number of LCU rows, denoted by "PicHeightInCtbsY," is equal to Ceil(H÷N) where the ceiling function Ceil (x) represents the smallest integer greater than or equal to x.

According to some examples, the position is defined as the central LCU of the first slice in the previously coded picture. Supposing the numLCUinSlice represent the LCU number in the first slice, the position is defined as: TargetCUAddr=numLCUinSlice/2. In one example, the position is defined as: TargetCUAddr= (PicWidthInCtbsY*PicHeightInCtbsY)/2+PicWidthInCtbsY/2. Furthermore, when TargetCUAddr is equal to or larger than (PicWidthInCtbsY*PicHeightInCtbsY), (e.g., PicHeightInCtbsY is equal to 1), TargetCUAddr is reset to (PicWidthInCtbsY*PicHeightInCtbsY−1), which is corresponding to the last LCU. In one example, the position is defined as the last LCU of the previously coded picture, or the center LCU within one frame (i.e., PicWidthInCtbsY*PicHeightInCtbsY/2), or the last LCU of the center LCU row (i.e., PicWidthInCtbsY*(PicHeightInCtbsY/2)−1), or the last LCU of the k-th LCU row (e.g., k is equal to 1). According to one example, the position is defined as the last LCU of the first slice in the previously-encoded picture. According to some implementations of the context initialization techniques of this disclosure, different resolutions may have different definitions of the position of the coding block.

In some examples, the position of the 'one block' is signaled in a parameter set, such as a sequence parameter set (SPS) or a picture parameter set (PPS). Parameter sets, such as SPSs and/or PPSs, can be signaled out-of-band with respect to slices of the current picture. In some examples, the position of the 'one block' can be signaled in a slice header. A slice header may be signaled in-band with respect to a corresponding slice. In these and other examples, the indication of the previously-encoded picture, such as a reference picture index, a corresponding picture order count difference (or delta POC), may be signaled in a parameter set or slice header.

In some examples, a 'previously-coded picture' is defined as a picture which is encoded/decoded just (immediately) before the current picture. In some examples, a 'previously-coded picture' is defined as a picture which is the last picture encoded or decoded before the current picture, such that a first slice in the previous picture has the same slice type to the current slice. According to some examples, a 'previously-coded picture' is defined as the picture which is the encoded/decoded picture before the current picture and the first slice in the previous picture has the same initialized quantization parameters to the current slice. According to some examples, a 'previously-coded picture' is defined as a picture containing a previously coded slice which has the same slice type, or both the same slice type and quantization parameter(s), or both the same slice type and temporal layer, as the current slice and/or the same initialized quantization parameters. In some examples, a 'previously-coded picture' is defined as a picture that is present in a picture buffer (such as a coded picture buffer or a decoded picture buffer), and may be used for the current picture as a reference picture. According to these examples, as in HEVC based platform, the previous slice must belong to a picture in a reference picture set (RPS), or a picture in one of the following subsets of the RPS: RefPicSetStCurrBefore, RefPicSetStCurrAfter, and RefPicSetLtCurr.

According to some implementations of the context initialization techniques of this disclosure, if all of the pictures coded after one intra-coded picture in display order do not have the same slice types and same initialized quantization parameters, then the inheritance of context information may be disabled. In this case, the conventional initialization method is applied, e.g., entropy encoding unit 56 may use the fixed table from which to draw initialization status information. According to some implementations, entropy encoding unit 56 may apply the inheritance-based context initialization techniques of this disclosure to specific context models, and not to other context models. In addition, or alternatively, the position of the 'one block' may be different for different context models. It will be appreciated that the various implementation options listed above may be implemented individually or in various combinations, in accordance with the context initialization techniques of this disclosure.

In some examples of the context initialization techniques of this disclosure, if entropy encoding unit 56 determines that the cabac_init_present_flag is enabled, then entropy encoding unit 56 may determine that a slice included in the 'previously-encoded picture' should have the same type as the currently-encoded slice. Said another way, in this example, if the cabac_init_present_flag is enabled, then the definition of a previously-encoded picture is dependent on matching slice types. Additionally, from a decoding standpoint, the signaled cabac_init_flag is not taken into consideration according to this implementation. In some instances, alternatively, entropy encoding unit 56 may first modify the slice type of the current slice based on cabac_init_flag and a selection of the 'previously-encoded picture'.

Additional example details for the context initialization techniques of this disclosure are described below. According to some implementations, entropy encoding unit 56 may not apply the inheritance-based context initialization techniques of this disclosure with respect to Intra Random Access Pictures (IRAP). For instance, entropy encoding 56 may not implement the inheritance-based context initialization techniques with respect to any of the three types of IRAPs, namely, instantaneous decoding refresh (IDR) pictures, clean random access (CRA) pictures, and broken link access (BLA) pictures.

In one example of the inheritance-based context initialization based on previously coded information, entropy encoding unit 56 may encode one picture with one slice. In this example, entropy encoding unit 56 may apply one or more of the following rules to derive the initialized states of context models. A first rule is that the slice of the previously-encoded picture has a slice type that is the same as the slice type for the currently-encoded slice. Alternatively, or in addition, the initialized slice quantization parameter (QP) is the same as the slice QP used for coding the currently-encoded slice.

According to some aspects of this disclosure, entropy encoding unit 56 may inherit the context initialization information from the previously-encoded slice when different QPs are used for the current slice and the predictor slice. In these examples, entropy encoding unit 56 may apply a mapping process with respect to context states before using the context initialization information for encoding the current slice. For example, entropy encoding unit 56 may utilize one or more the initialization functions (e.g., an initialization function specified in HEVC) as well as the two QPs and context to convert one state to another state. In some instances, entropy encoding unit 56 may record state information (e.g., the states) after encoding one block with a pre-defined address in the previously coded picture, and use the recorded state information as the initialized state information for the currently-encoded slice.

In one example, 'one block' represents a largest coding unit (LCU). For instance, the LCU size (dimensionality) may be denoted by 'N×N,' the picture width by 'W,' and the picture height by 'H.' The number of LCUs within one LCU row may be denoted by PicWInCtbsY, and is equal to the output of the ceiling function Ceil(W÷N). The number of LCU rows in the picture, denoted by PicHInCtbsY, is equal to the output of the ceiling function Ceil(H÷N). Generically described, the function Ceil (x) returns the smallest integer greater than or equal to x. Additionally, the width of the picture, measured in units of LCUs, and the height of the picture, measured in LCUs, are represented respectively by the PicWInCtbsY and PicHInCtbsY values obtained using the ceiling functions described above. In one example, the address of the LCU is defined according to the following equation:

$$TargetCUAddr=(PicWInCtbsY*PicHInCtbsY)/2+PicWInCtbsY/2$$

Furthermore, when TargetCUAddr is equal to or larger than the value of (PicWInCtbsY*PicHInCtbsY), entropy encoding unit 56 may reset TargetCUAddr is reset to the value of (PicWInCtbsY*PicHInCtbsY−1). For instance, TargetCUAddr may equal or exceed the above value in cases where PicHInCtbsY is equal to 1. Additionally, the value of (PicWInCtbsY*PicHInCtbsY−1) corresponds to the last LCU in one picture.

Figure 9:
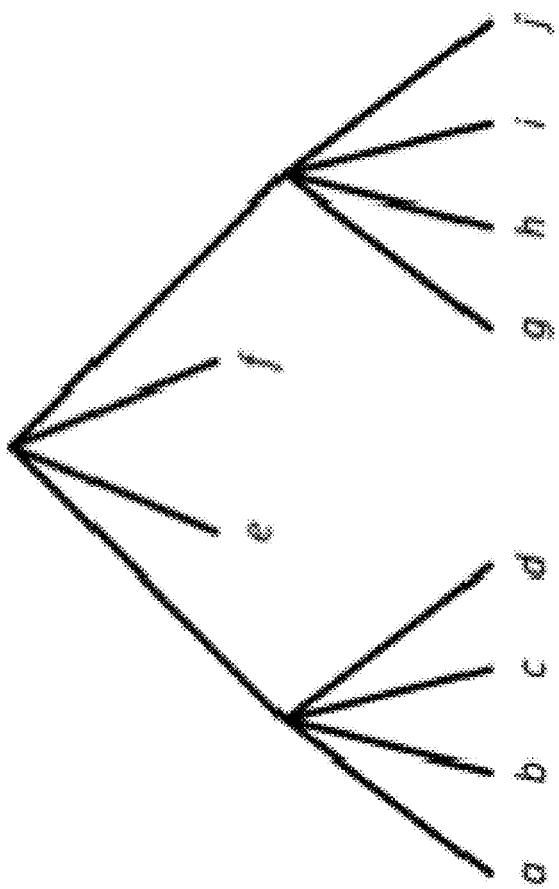
FIG. 9 is a conceptual diagram that illustrates a transform scheme based on a residual quadtree structure.
Figure 9:
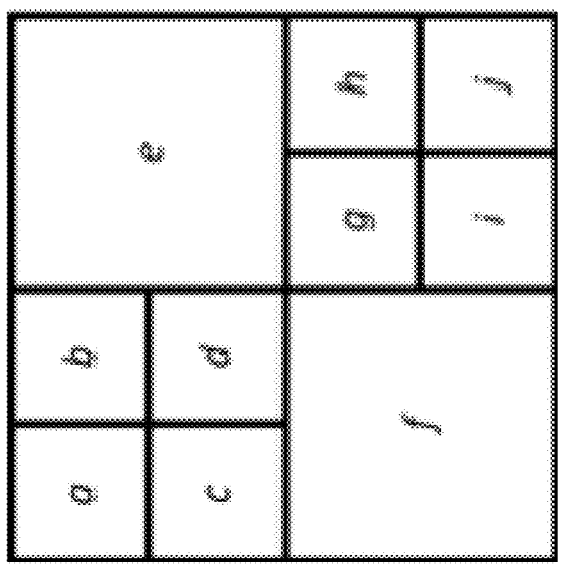

In some instances, furthermore, entropy encoding unit 56 may not apply the rules-based context initialization techniques described above for the first one or more pictures after a new intra-coded picture in display order. An example where entropy encoding unit 56 may not apply the rules-based context initialization is where entropy encoding unit 56 encounters a new slice type or a new QP (e.g., the new slice type or new QP has appeared) for the first time. For instance, entropy encoding unit 56 may mitigate or potentially avoid issues related to random access. An example of this technique is shown in FIG. 9, in which the coding (and thereby, decoding) order for pictures with picture order count (POC) values from 28 to 35 is as follows: 32, 28, . . . 30, 29, 31, 40, 36, 34, 33, 35.

In terms of display order, the picture with a POC value equal to 40 is the first picture that is decoded after the I-picture with a POC value equal to 32. Although the picture with the POC value of 24 has the same QP as the picture with POC equal to 40, and both share the same slice types, entropy encoding unit 56 may not predict the picture with POC value equal to 40 using the coded information of the picture with POC equal to 24. Similarly, entropy encoding unit 56 may not predict the picture with POC equal to 33 using the coded information of the picture with POC equal to 31. However, entropy encoding unit 56 may predict the picture with POC equal to 35 using the coded information of the picture with POC equal to 33, because both pictures are subsequent (in display order) to the I-picture.

In instances where prediction from previously coded picture is disallowed, disabled, or otherwise not available to entropy encoding unit 56, entropy encoding unit 56 may apply the context initialization techniques as defined in HEVC. As described above, video encoder 20 of FIG. 4 represents an example of a video encoder that may be configured to perform any of the various techniques of this disclosure for enhanced CABAC, alone or in any combination. In some examples, video encoder 20 is configured to select a coding mode for encoding a transform unit. In some examples, video encoder 20 may include, be, or be part of a device that includes a camera configured to capture at least a portion of the video data. In some examples, video encoder 20 may include a memory device that is configured to receive the captured video data from the camera.

Figure 5:
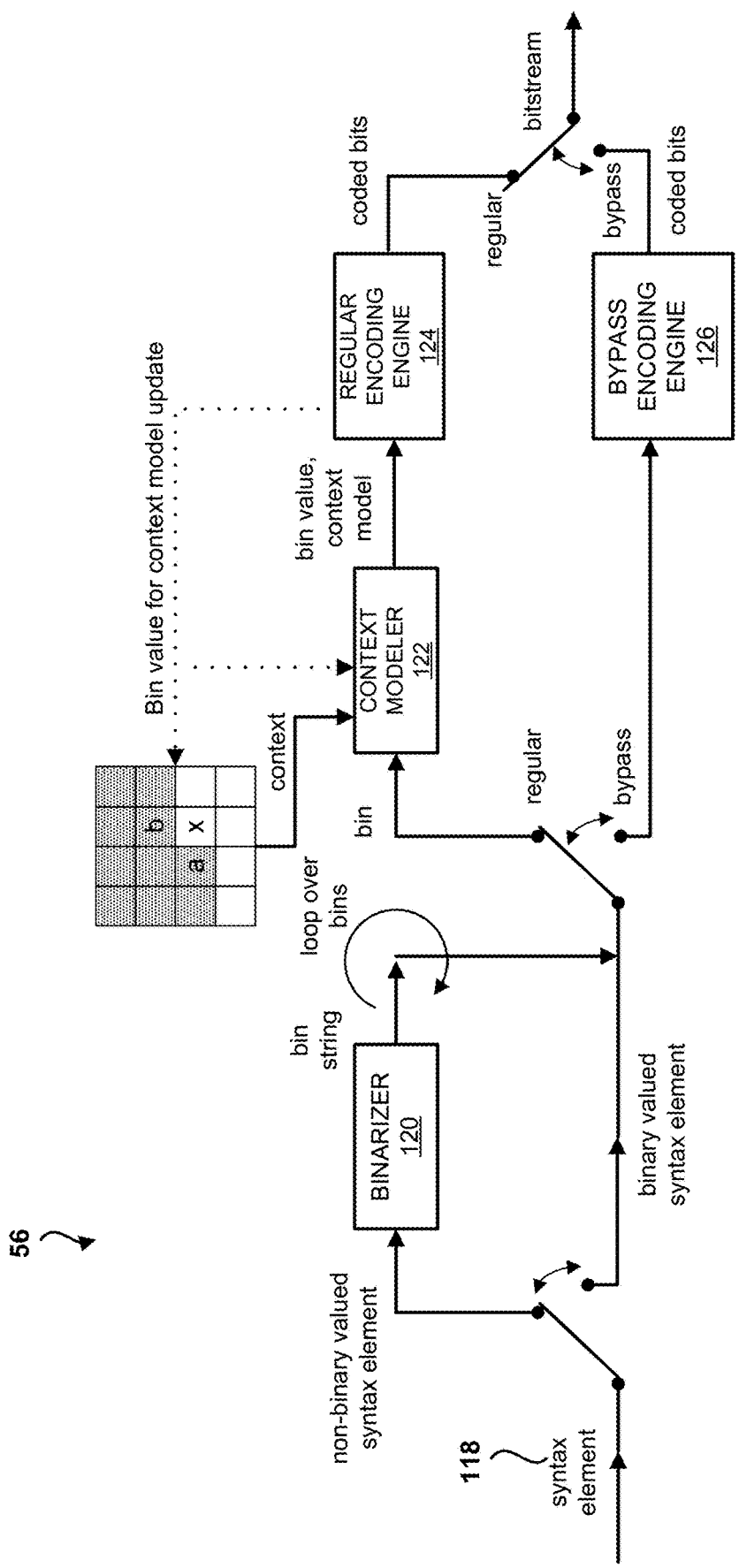
FIG. 5 is a block diagram of an example entropy encoding unit that may be configured to perform CABAC in accordance with the techniques of this disclosure.

FIG. 5 is a block diagram of an example entropy encoding unit 56 that may be configured to perform CABAC in accordance with the techniques of this disclosure. A syntax element 118 is input into the entropy encoding unit 56. If the syntax element is already a binary-value syntax element (e.g., a flag or other syntax element that only has a value of 0 and 1), the step of binarization may be skipped. If the syntax element is a non-binary valued syntax element (e.g., a syntax element that may have values other than 1 or 0), the non-binary valued syntax element is binarized by binarizer 120. Binarizer 120 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 120 is fed to the binary arithmetic coding side of entropy encoding unit 56. That is, for a predetermined set of non-binary valued syntax elements, each bin type (e.g., bin0) is coded before the next bin type (e.g., bin1). Coding may be performed in either regular mode or bypass mode. In bypass mode, bypass coding engine 126 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given the values of previously-encoded bins. The probability of a bin being an LPS is determined by context modeler 122. Context modeler 122 outputs the bin value and the probability state for the context model (e.g., the probability state σ, including the value of the LPS and the probability of the LPS occurring). The context model may be an initial context model for a series of bins, or may be determined based on the coded values of previously coded bins. As described above, context modeler 122 may update the state based on whether or not the received bin was the MPS or the LPS. After the context model and probability state σ is determined by context modeler 122, regular coding engine 124 performs BAC on the bin value.

Context modeler 122 may implement the techniques of this disclosure to perform context modeling in a parallelized manner. According to various aspects of this disclosure, context modeler 122 may perform context modeling for the i-th bin of a transform coefficient using the values of the i-th bins of one or more previously-encoded transform coefficients. In this way, the context modeling of the i-th bin for a current transform coefficient is dependent on the values of the corresponding i-th bins of one or more transform coefficients for which context modeler 122 has already selected the context.

By performing context modeling for a bin of a current transform coefficient using the values of i-th bins of previously-encoded transform, context modeler 122 may implement the techniques of this disclosure to provide one or more potential improvements over existing CABAC coding devices. As an example of such a benefit, context modeler 122 may improve the parallelization of the context modeling operation by implementing the techniques of this disclosure. For instance, context modeler 122 may perform context modeling, in parallel, for multiple bins of a transform coefficient currently being encoded. As one example, if context modeler 122 determines that bin values corresponding to multiple bins are available from previously-encoded transform coefficient(s), then context modeler 122 may at least partially parallelize the context modeling operations for the bins of the transform coefficient being encoded currently.

Context modeler 122 may perform the parallelized context modeling of this disclosure in accordance with a multi-pass coding scheme. More specifically, a multi-pass coding scheme refers to a coding technique by which entropy encoding unit 56 assigns separate threads to each particular bin (e.g., thread 1 for the first bin, thread 2 for the second bin, and so on). Thus, according to multi-pass coding, all bin0 instances can be encoded in sequence, independently of the bin1 instances that are coded in sequence, both of which are coded independently of the bin2 instances that are encoded in sequence, etc. In some examples, context modeler 122 may perform the multi-pass coding with respect to transform units of single block. Moreover, for bins that are encoded according to the regular mode, context modeler 122 may perform the context selection in multiple passes. Each pass may pertain to a single corresponding bin of all transform coefficients. In other words, during each pass, context modeler 122 does not utilize information relating to the other passes. For instance, context modeler 122 may select the context for the first bin of all transform coefficients within one transform unit/CG in a first pass. In this example, in a second pass, context modeler 122 may select the context for the second bin of all transform coefficients within one transform unit/CG, if needed, and so on.

In one example use case, context modeler 122 may perform context modeling for bin0 of a currently-coded transform coefficient using the value of bin0 of the previously-coded neighboring transform coefficient, perform context modeling for bin1 of a currently-coded transform coefficient using the value of bin1 of the previously-coded neighboring transform coefficient, and so on. Using any bin values that are available for the previously-coded transform coefficient, context modeler 122 may perform the context modeling for multiple bins of the currently-coded transform coefficient in parallel. In the use case scenario described above, if bin0 and bin1 are both available from the previously-coded neighbor transform coefficient, then context modeler 122 may parallelize the context modeling of bin0 and bin1 for the currently-coded transform coefficient. In this manner, context modeler 122 may implement the techniques of this disclosure to perform CABAC within the tenets of multi-pass coding as described in HEVC, while improving the context selection for bins of a current transform coefficient by enabling and potentially exploiting parallelization of context modeling operations.

It will be appreciated that context modeler 122 can, but may not necessarily, perform the entire context modeling of all such bins in parallel. More specifically, context modeler 122 may perform some portions of the context modeling of multiple bins concurrently. In this way, context modeler 122 may implement the techniques of this disclosure to draw upon multicore processing technology and/or multiple processors to improve the context modeling operations for a currently-coded transform coefficient.

By encoding corresponding bins of different transform coefficients in a single pass, context modeler 122 may provide one or more advantages over existing multi-pass CABAC techniques. For instance, by coding the corresponding bins (e.g., the respective bin0) of multiple transform coefficients in a single pass, context modeler 122 may circumvent the need to store and retrieve a new context model frequently at bin transitions. Instead, context modeler 122 may use a single context model across a given pass, because the pass targets the corresponding bins (e.g., the respective bin0) across multiple transform coefficients. In this way, context modeler 122 may implement the parallelized context selection techniques of this disclosure to mitigate or potentially eliminate time delays and resource churn that arise from frequent context-switching. In contrast, existing multi-pass coding would require frequent context model save- and retrieve-operations, because of encoding bin0, bin1, bin2, etc. for a first transform coefficient, and then encoding bin0, bin1, bin2, etc. for a second transform coefficient, and so on.

For instance, context modeler 122 may generate or otherwise access one or more pre-defined templates to use for the i-th bin context modeling functionalities described herein. One non-limiting example of a pre-defined template that context modeler 122 may use for context modeling of an i-th bin of a currently-coded transform coefficient is illustrated in FIG. 10. A pre-defined template, such as template 140 of FIG. 10 defines a diagonal scan order for an 8×8 transform block, where denotes the last significant scan position, 'x' denotes the current scan position, and "$x_i$," denotes the neighbors covered by local template 140. With respect to $x_i$, the value of "i" is in the range of zero through 4, and the range constraint is expressed as i∈[0,4]. In accordance with one or more aspects of this disclosure, context modeler 122 may use the i-th bins of transform coefficients located in local template 140 for context modeling of the corresponding i-th bin of a transform coefficient that is being encoded currently. According to some implementations, context modeler 122 may use multiple templates to perform the parallelized bin context modeling of this disclosure. In one example, the template size and/or shape is dependent on one or more of the following criteria: (i) the size of transform units; (ii) modes; or (iii) the position of the current transform coefficients within the current transform unit or coefficient group (CG).

By using one or more pre-defined templates to traverse a previously-coded TU for bin values, context modeler 122 may implement the techniques of this disclosure to provide one or more enhancements over existing CABAC technology. For instance, by using a TU traversal template, such as local template 140 of FIG. 10, context modeler 122 may circumvent the need to separately determine a traversal scheme with respect to different coding passes. Thus, by implementing the template-based parallelized context selection techniques of this disclosure, context modeler 122 may increase throughput with respect to bin coding, while maintaining coding precision.

According to another example implementation, context modeler 122 may only apply the parallelized context modeling techniques of this disclosure to the first 'K' bins of the currently-coded transform coefficient, where 'K' is smaller than M, and where 'M' denotes the upper bound of the available bin indexes. Context modeler 122 may encode the remaining (M+1−K) bins are coded using another context modeling technique, or according to bypass mode.

According to another example implementation, context modeler 122 may define the universe of previously-coded transform coefficients as the 'N' consecutive transform coefficients in the encoding order within the current transform unit or CG before the transform coefficient currently being encoded. Alternatively, context modeler 122 may determine N to be a variable. In one example, context modeler 122 may determine the value of N dependent on the relative position of the currently-encoded transform coefficient in the current transform unit. In another example, context modeler 122 may determine the value of N dependent on the transform unit size.

In another implementation, context modeler 122 may define the universe of previously-encoded transform coefficients as those transform coefficients positioned at the neighborhood of the current position within the current transform unit or CG. In one example, the neighborhood of the current position is constrained to those positions directly adjacent to the current position, or positions either directly adjacent to or separated from the current position. In another example, the neighborhood may also include these positions, but expand to include positions in one or more spatial neighboring transform units.

In accordance with various aspects of this disclosure, context modeler 122 may define the context index of a bin as a function of values associated with one or more previously-coded transform coefficients. For instance, context modeler 122 may use a function that yields the sum of all i-th bin values of the previously-coded transform coefficients. More specifically, in this example, context modeler 122 may perform a summation of the values of the available i-th bin values of all previously-encoded transform coefficients of the TU/CG. In turn, context modeler 122 may use the resulting sum as the context index (CtIdx) during context modeling for the i-th bin of the currently-coded transform coefficient.

According to some aspects of this disclosure, context modeler 122 may keep the context index derivation rule unchanged for the same pass in different sizes of transform units. However, context modeler 122 may apply an offset to the context index to perform context modeling for the currently-coded bin. For instance, context modeler 122 may determine that two different transform sizes have two sets of context models. In turn, context modeler 122 may define the offset as the number of context models in one such set. For instance, if context modeler 122 determines that the TU size is less than a square of predefined dimensions M×M, then context modeler 122 may determine that each such TU (smaller than M×M) TU size has its own respective set of context models. Conversely, entropy encoding unit 56 may determine that all TUs with sizes equal to or larger than M×M share the same set of context models.

In various use case scenarios, context modeler 122 may set the value of M at 16. More specifically, in these examples, if context modeler 122 determines that the size of the currently-coded TU is less than a 16×16 square, then context modeler 122 may determine that the currently-coded TU has is associated with a set of context models that corresponds to the TU's particular size. Conversely, if entropy encoding unit determines that the currently-coded TU has a size that equal to or larger than 16×16, then context modeler 122 may determine that the currently-coded TU shares the same set of context models with all other TUs that have a size equal to or greater than 16×16. In some examples, context modeler 122 may apply the TU size-based context selection only to luma blocks.

According to some aspects of this disclosure, context modeler 122 may determine the coefficient group (CG) size based on the transform size. In other words, according to these aspects, the CG size is dependent on transform size. Alternatively, or in addition, context modeler 122 may determine the CG size based on the coding mode. In these examples, context modeler 122 may determine the CG size as being dependent on one or both of the transform size and/or the coding mode. Alternatively, or in addition, context modeler 122 may determine the CG size based on a transform matrix.

According to some aspects of this disclosure, context modeler 122 may also apply the parallelized context modeling techniques can also to the blocks that are encoded using transform bypass mode (also referred to as "transform skip mode"). Transform bypass mode refers to a coding mode according to which video encoder 20 may skip the transform and quantization operations of encoding, to provide a lossless coding output. Thus, according to certain aspects of this disclosure, context modeler 122 may expand the parallelized context selection techniques to provide the potential resulting advantages in instances of lossless coding.

Returning to FIG. 4, in some cases, the entropy encoding unit 56 or another unit of video encoder 20 may be configured to perform other coding functions, in addition to entropy coding. For example, entropy encoding unit 56 may be configured to determine coded block pattern (CBP) values for CU's and PU's. Also, in some cases, entropy encoding unit 56 may perform run length coding of coefficients. In addition, entropy encoding unit 56, or other processing units, also may code other data, such as the values of a quantization matrix.

As discussed above, inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of the reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and the motion compensation unit 44 as a reference block to inter-code a block in a subsequent video frame.

Figure 6:
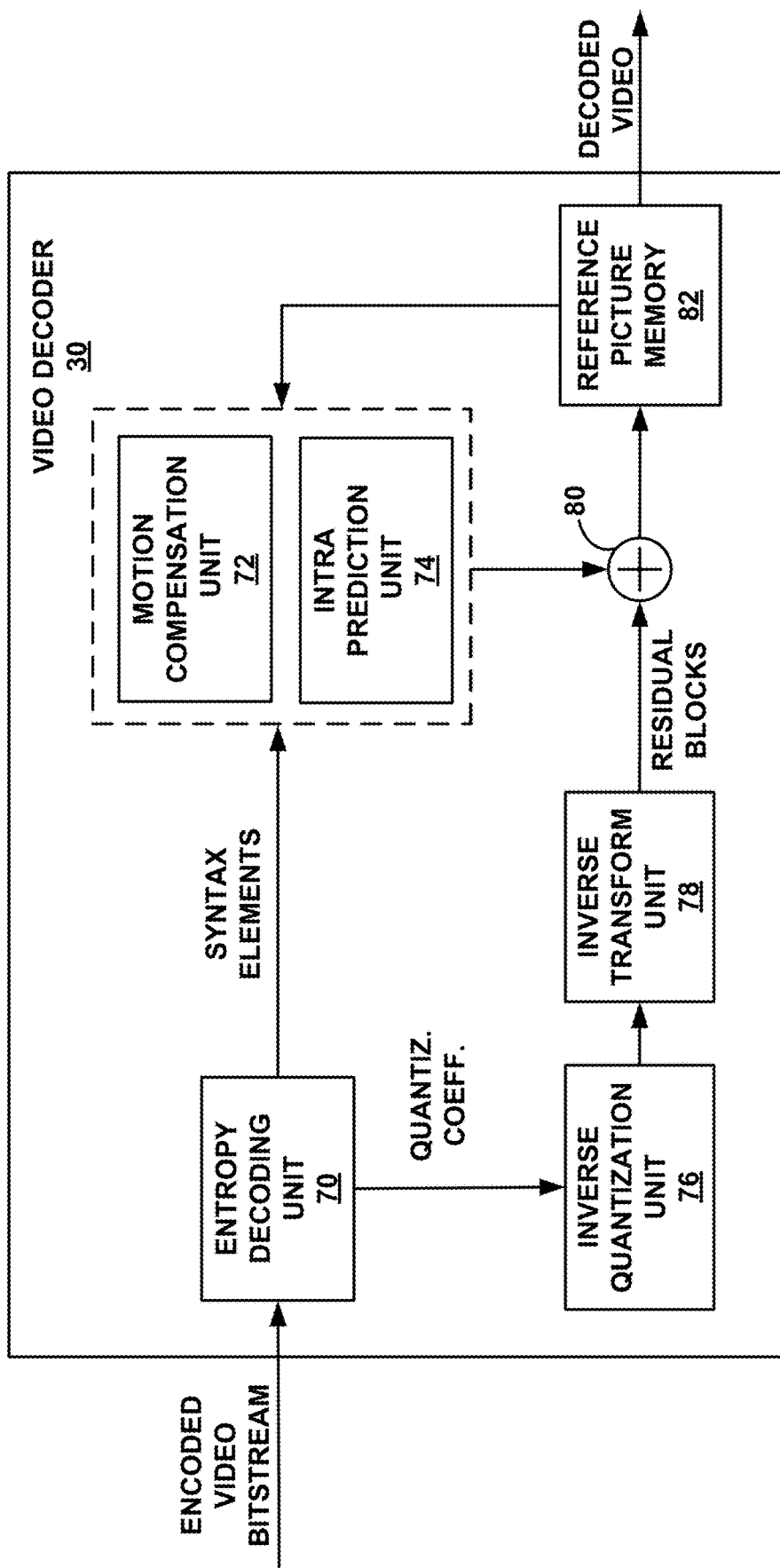
FIG. 6 is a block diagram illustrating an example of a video decoder that may implement techniques for coding data according to an enhanced CABAC design.

FIG. 6 is a block diagram illustrating an example of video decoder 30 that may implement techniques for coding data according to an enhanced CABAC design. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 4). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. In some examples, entropy decoding unit 70 may perform CABAC and/or enhanced CABAC according to the techniques of this disclosure. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30 of FIG. 6 represents an example of a video decoder that may be configured to perform any of the various techniques of this disclosure for enhanced CABAC, alone or in any combination. Hence, the techniques described above may be performed by video encoder 20 (FIGS. 1 and 4) and/or video decoder 30 (FIGS. 1 and 5), both of which may be generally referred to as a video coder. Likewise, video coding may refer to video encoding or video decoding, as applicable. Various components of video decoder 30, such as entropy decoding unit 70, may implement the enhanced CABAC techniques of this disclosure to perform context modeling. According to various aspects of this disclosure, entropy decoding unit 70 may perform context modeling for the i-th bin of a transform coefficient using the values of the i-th bins of one or more previously-decoded transform coefficients. Said another way, the context modeling of the i-th bin for a current transform coefficient is dependent on the values of the corresponding i-th bins of one or more transform coefficients that entropy decoding unit 70 has already decoded.

By performing context modeling for a bin of a current transform coefficient using the values of i-th bins of previously-decoded transform, entropy decoding unit 70 may implement the techniques of this disclosure to provide one or more potential improvements over existing CABAC coders. As an example of such a benefit, entropy decoding unit 70 may improve the parallelization of the context modeling operation by implementing the techniques of this disclosure. More specifically, entropy decoding unit 70 may perform context modeling, in parallel, for multiple bins of a transform coefficient currently being decoded. For instance, if entropy decoding unit 70 determines that bin values corresponding to multiple bins are available from previously-decoded transform coefficient(s), then entropy decoding unit 70 may at least partially parallelize the context modeling operations for the bins of the transform coefficient being decoded currently.

Entropy decoding unit 70 may perform the parallelized context modeling of this disclosure in accordance with a multi-pass coding scheme. More specifically, a multi-pass coding scheme refers to a coding technique by which entropy decoding unit 70 assigns separate threads to each particular bin (e.g., thread 1 for the first bin, thread 2 for the second bin, and so on). Thus, according to multi-pass coding, all bin0 instances can be decoded in sequence, independently of the bin1 instances that are decoded in sequence, both of which are decoded independently of the bin2 instances that are decoded in sequence, etc. In some examples, entropy decoding unit 70 may perform the multi-pass coding with respect to transform units of single block. Moreover, for bins that are decoded according to the regular mode, entropy decoding unit 70 may perform several decoding passes. Each pass may pertain to a single corresponding bin of all transform coefficients. In other words, during each pass, entropy decoding unit 70 does not utilize information relating to the other passes. For instance, entropy decoding unit 70 may decode the first bin (if needed) of all transform coefficients within one transform unit/CG in a first pass. In this example, in a second pass, entropy decoding unit 70 may decode the second bin of all transform coefficients within one transform unit/CG, if needed, and so on.

In one example use case, entropy decoding unit 70 may perform context modeling for bin0 of a currently-coded transform coefficient using the value of bin0 of the previously-coded neighboring transform coefficient, perform context modeling for bin1 of a currently-coded transform coefficient using the value of bin1 of the previously-coded neighboring transform coefficient, and so on. Using any bin values that are available for the previously-coded transform coefficient, entropy decoding unit 70 may perform the context modeling for multiple bins of the currently-coded transform coefficient in parallel. In the use case scenario described above, if bin0 and bin1 are both available from the previously-coded neighbor transform coefficient, then entropy decoding unit 70 may parallelize the context modeling of bin0 and bin1 for the currently-coded transform coefficient. In this manner, entropy decoding unit 70 may implement the techniques of this disclosure to perform CABAC within the tenets of multi-pass coding as described in HEVC, while improving the context selection for bins of a current transform coefficient by enabling and potentially exploiting parallelization of context modeling operations.

It will be appreciated that entropy decoding unit 70 can, but may not necessarily, perform the entire context modeling of all such bins in parallel. More specifically, entropy decoding unit 70 may perform some portions of the context modeling of multiple bins concurrently. In this way, entropy decoding unit 70 may implement the techniques of this disclosure to draw upon multicore processing technology and/or multiple processors to improve the context modeling operations for a currently-coded transform coefficient.

By decoding corresponding bins of different transform coefficients in a single pass, entropy decoding unit 70 may provide one or more advantages over existing multi-pass CABAC techniques. For instance, by decoding the corresponding bins (e.g., the respective bin0) of multiple transform coefficients in a single pass, entropy decoding unit 70 may circumvent the need to store and retrieve a new context model frequently at bin transitions. Instead, entropy decoding unit 70 may use a single context model across a given pass, because the pass targets the corresponding bins (e.g., the respective bin0) across multiple transform coefficients. In this way, entropy decoding unit 70 may implement the parallelized context selection techniques of this disclosure to mitigate or potentially eliminate time delays and resource churn that arise from frequent context-switching. In contrast, existing multi-pass coding would require frequent context model save- and retrieve-operations, because of decoding bin0, bin1, bin2, etc. for a first transform coefficient, and then decoding bin0, bin1, bin2, etc. for a second transform coefficient, and so on.

For instance, entropy decoding unit 70 may generate or otherwise access one or more pre-defined templates to use for the i-th bin context modeling functionalities described herein. One non-limiting example of a pre-defined template that entropy decoding unit 70 may use for context modeling of an i-th bin of a currently-coded transform coefficient is illustrated in FIG. 10. A pre-defined template, such as template 140 of FIG. 10 defines a diagonal scan order for an 8×8 transform block, where 'L' denotes the last significant scan position, 'x' denotes the current scan position, and "$x_i$" denotes the neighbors covered by local template 140. With respect to $x_i$, the value of "i" is in the range of zero through 4, and the range constraint is expressed as i∈[0,4]. In accordance with one or more aspects of this disclosure, entropy decoding unit 70 may use the i-th bins of transform coefficients located in local template 140 for context modeling of the corresponding i-th bin of a transform coefficient that is being decoded currently. According to some implementations, entropy decoding unit 70 may use multiple templates to perform the parallelized bin context modeling of this disclosure. In one example, the template size and/or shape is dependent on one or more of the following criteria: (i) the size of transform units; (ii) modes; or (iii) the position of the current transform coefficients within the current transform unit or coefficient group (CG).

By using one or more pre-defined templates to traverse a previously-coded TU for bin values, entropy decoding unit 70 may implement the techniques of this disclosure to provide one or more enhancements over existing CABAC technology. For instance, by using a TU traversal template, such as local template 140 of FIG. 10, entropy decoding unit 70 may circumvent the need to separately determine a traversal scheme with respect to different coding passes. Thus, by implementing the template-based parallelized context selection techniques of this disclosure, entropy decoding unit 70 may increase throughput with respect to bin coding, while maintaining coding precision.

According to another example implementation, entropy decoding unit 70 may only apply the parallelized context modeling techniques of this disclosure to the first 'K' bins of the currently-coded transform coefficient, where 'K' is smaller than M, and where 'M' denotes the upper bound of the available bin indexes. Entropy decoding unit 70 may decode the remaining (M+1−K) bins are coded using another context modeling technique, or according to bypass mode.

According to another example implementation, entropy decoding unit 70 may define the universe of previously-coded transform coefficients as the 'N' consecutive transform coefficients in the decoding order within the current transform unit or CG before the transform coefficient currently being decoded. Alternatively, entropy decoding unit 70 may determine N to be a variable. In one example, entropy decoding unit 70 may determine the value of N dependent on the relative position of the currently-decoded transform coefficient in the current transform unit. In another example, entropy decoding unit 70 may determine the value of N such that N is dependent on the transform unit size.

In another implementation, entropy decoding unit 70 may define the universe of previously-decoded transform coefficients as those transform coefficients positioned at the neighborhood of the current position within the current transform unit or CG. In one example, the neighborhood of the current position is constrained to those positions directly adjacent to the current position, or positions either directly adjacent to or separated from the current position. In another example, the neighborhood may also include these positions, but expand to include positions in one or more spatial neighboring transform units.

In accordance with various aspects of this disclosure, entropy decoding unit 70 may define the context index of a bin as a function of values associated with one or more previously-coded transform coefficients. For instance, entropy decoding unit 70 may use a function that yields the sum of all i-th bin values of the previously-coded transform coefficients. More specifically, in this example, entropy decoding unit 70 may perform a summation of the values of the available i-th bin values of all previously-decoded transform coefficients of the TU/CG. In turn, entropy decoding unit 70 may use the resulting sum as the context index (CtIdx) during context modeling for the i-th bin of the currently-coded transform coefficient. In another example, entropy decoding unit 70 may define a cut-off value. In this example, when the output of the function exceeds the pre-defined cut-off value, entropy decoding unit 70 may use the same context with respect to the bin currently being coded. In some examples, entropy decoding unit 70 may determine the cut-off value is based on (or to be dependent upon) the bin index/transform unit size/coding mode/the transform coefficient position within one transform unit.

In some examples, entropy decoding unit 70 may decode the corresponding bins coded in different passes such that these bins share the same context models. In one example, entropy decoding unit 70 may determine that the context index derivation method, e.g. the function to calculate the context index, for bins in different passes are different. According to one example, entropy decoding unit 70 may determine that the context index derivation method, e.g. the function to calculate the context index, for bins in different passes may be the same.

According to some aspects of this disclosure, entropy decoding unit 70 may keep the context index derivation rule unchanged for the same pass in different sizes of transform units. However, entropy decoding unit 70 may apply an offset to the context index to perform context modeling for the currently-coded bin. For instance, entropy decoding unit 70 may determine that two different transform sizes have two sets of context models. In turn, entropy decoding unit 70 may define the offset as the number of context models in one such set. For instance, if entropy decoding unit 70 determines that the TU size is less than a square of predefined dimensions M×M, then entropy decoding unit 70 may determine that each such TU (smaller than M×M) TU size has its own respective set of context models. Conversely, entropy decoding unit 70 may determine that all TUs with sizes equal to or larger than M×M share the same set of context models.

In various use case scenarios, entropy decoding unit 70 may set the value of M at 16. More specifically, in these examples, if entropy decoding unit 70 determines that the size of the currently-coded TU is less than a 16×16 square, then entropy decoding unit 70 may determine that the currently-coded TU has is associated with a set of context models that corresponds to the TU's particular size. Conversely, if entropy decoding unit 70 determines that the currently-decoded TU has a size that equal to or larger than 16×16, then entropy decoding unit 70 may determine that the currently-coded TU shares the same set of context models with all other TUs that have a size equal to or greater than 16×16. In some examples, entropy decoding unit 70 may apply the TU size-based context selection only to luma blocks.

According to some examples, the Rice parameter used for coding the remaining bins is dependent on transform size. Alternatively, or in addition, the Rice parameter may be dependent on coding mode. In one example, instead of using Golomb-Rice code for coeff_abs_level_remaining, entropy decoding unit 70 may use other binarization techniques. Alternatively, or in addition, more than one binarization method may be applied for coding the coeff_abs_level_remaining syntax element. In one example, the binarization method (e.g., Rice parameter) used for coding coeff_abs_level_remaining is dependent on coding modes. Alternatively, the binarization method (e.g., Rice parameter) used for coding coeff_abs_level_remaining may be dependent on the relative position within one TU. Alternatively, the binarization method (e.g., Rice parameter) used for coding coeff_abs_level_remaining may be dependent on the distance from the first coded/decoded transform coefficient in scan order. In some instances, the binarization method (e.g., Rice parameter) used for coding coeff_abs_level_remaining is dependent on coding group position relative to the transform unit.

According to some aspects of this disclosure, entropy decoding unit 70 may determine the coefficient group (CG) size based on the transform size. In other words, according to these aspects, the CG size is dependent on transform size. Alternatively, or in addition, entropy decoding unit 70 may determine the CG size based on the coding mode. In these examples, entropy decoding unit 70 may determine the CG size as being dependent on one or both of the transform size and/or the coding mode. Alternatively, or in addition, entropy decoding unit 70 may determine the CG size based on a transform matrix.

According to some aspects of this disclosure, entropy decoding unit 70 may also apply the parallelized context modeling techniques to blocks that are encoded using transform bypass mode (also referred to as "transform skip mode"). Transform bypass mode refers to a coding mode according to which video decoder 30 may skip the inverse transform and inverse quantization operations of decoding, to process a losslessly-encoded portion of a video bitstream. Thus, according to certain aspects of this disclosure, entropy decoding unit 70 may expand the parallelized context selection techniques to provide the potential resulting advantages in instances where the received encoded video bitstream is losslessly encoded.

Example details of various transform coefficient context modeling techniques of this disclosure are discussed below in further detail. One example of context modeling in accordance with multi-pass coding is described below. According to this example, entropy decoding unit 70 may apply the coding elements and coding order (multiple pass coding, and CG-based) as laid out in HEVC. In addition, entropy decoding unit 70 may apply the binarization techniques while keeping the magnitudes of the transform coefficients unchanged. However, entropy decoding unit 70 may modify the context index and Rice parameter calculation method for coding magnitudes of the transform coefficients.

The context index calculation for bin0 (significant flag) is dependent on the following information: the number of non-zero coefficients in the template (i.e., magnitudes of coefficients are larger than 0); the position of the current coefficient within the current TU; the TU size for the luma component; and the color components. With respect to the color component dependency, the luma and chroma are considered separately. Additionally, in considering the TU size for the luma component, the context index calculation is independent with TU size for luma. The TU size of the luma component may include three sets, namely, 4×4 TU, 8×8 TU, 16×16 and above TUs.

For bin1 and bin2 (Grt than 1, Grt than 2), the context index calculation is dependent on the following information: the number of absLevels in the template larger than 1 (for bin1) and larger than 2 (for bin2); the position of the current coefficient within the current TU; and the color components.

The Rice parameter derivation process is dependent on bypass coding information, and on the value of the sum_absolute_levelMinus1 syntax element.

In one example, entropy decoding unit 70 may define the function sum_template(k) to return the number of coefficients in a template, such that that the magnitudes of the coefficients are larger than k. An example of the sum_template(k) function is as follows:

$$\text{sum\_template}(k) = \sum_i \delta_j(x_i, k)$$
$$\text{with } \delta_j(x, k) = \begin{cases} 1 & |x_i| > k \\ 0 & x_i = 0 \end{cases},$$

Additionally, in this example, entropy decoding unit 70 may define a function $f(x, y, n, t)$ to handle the position information and another function $\delta_k(u, v)$ to handle the component information as follows:

$$f(x, y, n, t) = \begin{cases} n & x + y < t \\ 0 & x + y \geq t \end{cases}$$

$$\delta_k(u, v) = \begin{cases} u & v = 0 \\ 0 & v \neq 0 \end{cases}$$

FIG. 10 depicts one example of a template (local template 140) that entropy decoding unit 70 may use with respect to the context modeling techniques described herein. The current transform coefficient is marked as 'X' and the five spatial neighbors are marked as '$X_i$' (with 'i' representing an integer from 0 through 4). If any one of the following conditions is satisfied, then entropy decoding unit 70 may mark $X_i$ as unavailable and not used in the context index derivation process:

- the position of $X_i$ and current transform coefficient X are not located in the same transform unit; or
- the position of $X_i$ is located outside of the picture's horizontal or vertical boundaries; or
- the transform coefficient $X_i$ has not yet been coded yet. In the case of multi-pass coding, whenever the bins in the same coding pass are coded, the bins could be used in the context index derivation process. Therefore, from a decoding perspective, it is not necessary to fully decode one transform coefficient.

Alternatively, entropy decoding unit 70 may apply one or more other templates that can include the information from a neighboring transform unit. In various examples, the neighboring TU may be a spatial neighbor or a temporal neighbor. According to one or more of the context modeling techniques described herein, the context index calculations may be defined as described in the following paragraphs.

With respect to bin0, entropy decoding unit 70 may derive the context index as follows:

$$c_0 = \min(\text{sum\_template}(0), 5) + f(x, y, 6, 2) +$$
$$\delta_k(f(x, y, 6, 5), cIdx) + \text{offset}(cIdx, \text{width})$$

$$c_0 = c_0 + \text{offset}(cIdx, \text{width})$$

where

-continued $$\text{offset}(v, w) = \begin{cases} w == 4 ? 0: \begin{pmatrix} w == 8 ? NumberLumaCtxOneset: \\ NumberLumaCtxOneset*2 \end{pmatrix} & v = 0 \\ NumberLumaCtxOneset*3 & v \neq 0 \end{cases}$$

In one example, based on the range of $c_0$, one set of luma contexts may include a number of context models that equals the value of NumberLumaCtxOneset. For instance, the set of luma contexts may include 18 context models. With respect to different transform sizes (with the transform width denoted by 'w') for coding luma bin0s, entropy decoding unit 70 may select a different set for each transform size. In addition, chroma and luma contexts are separated to further improve the coding performance. For YCbCr inputs, the three color components, i.e., Y, Cb and Cr are represented with component index v equal to 0, 1, and 2, respectively.

In these examples, entropy decoding unit 70 may derive the context index for bin1 as follows:

$c_1 = \min(\text{sum\_template}(1), 4) + N$ $c_1 = c_1 + \delta_k(f(x,y,5,3), cIdx) + \delta_k(f(x,y,5,10), cIdx)$ Additionally, in these examples, entropy decoding unit 70 may derive the context index for bin2 as follows:

$c_2 = \min(\text{sum\_template}(2), 4) + N$ $c_2 = c_2 + \delta_k(x,y,5,3), cIdx) + \delta_k(x,y,5,10), cIdx)$ In one example, N is equal to 0. In another example, N is equal to 1. Alternatively, or in addition, when N is equal to 1, entropy decoding unit 70 may code the first bin1 or bin2 with the context index c1 or c2 equal to 0. In this example, entropy decoding unit 70 may code the other instances of bin1s and bin2s according to the equations above.

In one example, entropy decoding unit 70 may decode bin1 and bin2 with the same set of context models, but with different indices. Alternatively, bin1 and bin2 are coded with two sets of context models and no dependency between them exists. For the remaining bins, entropy decoding unit 70 may apply the design laid out in HEVC or the design in JCTVC-H0228. In various examples, entropy decoding unit 70 may use different constant values in building the various functions described above.

Additional aspects of this disclosure are directed to context initialization enhancements. The context initialization enhancements of this disclosure may be implemented independently of the parallelized context selection techniques described above, or may be implemented in combination with any one or more of the parallelized context selection techniques described above. One or more of the context initialization techniques of this disclosure are directed to reusing context information from previously-decoded information. For instance, entropy decoding unit 70 may inherit, or otherwise derive, the context information for a slice by copying a status from a previously-decoded slice, which may belong to the current picture or a previously-decoded picture.

By inheriting the context initialization information from a previously-decoded slice, entropy decoding unit 70 may implement the techniques of this disclosure to provide enhanced accuracy as compared to existing CABAC context initialization techniques. For instance, existing CABAC context initialization techniques rely on obtaining context status information from a table. However, the table is formed using static information. However, according to the inheritance-based context initialization techniques of this disclosure, entropy decoding unit 70 may draw context initialization information from a previously-decoded slice that is of the same slice type and/or has the same quantization parameters (QPs) as the slice currently being decoded. In this way, entropy decoding unit 70 may implement the techniques of this disclosure to improve the accuracy of the context initialization information used for a current slice.

According to some implementations, entropy decoding unit 70 may identify the center LCU of a previously-decoded slice as the slice from which to inherit the context initialization information. In various examples, entropy decoding unit 70 may inherit context initialization for multiple slices of the current picture from multiple corresponding previously-decoded slices. In one example, entropy decoding unit 70 may use the same block (namely, the center LCU) of the previously-decoded picture from which to inherit the context initialization information for all of the multiple slices decoded according to the context initialization techniques of this disclosure. In another example, entropy decoding unit 70 may inherit the context initialization information for each of the multiple slices from the respective center LCU from each of the corresponding slices of the previously-decoded picture.

For instance, after decoding the center LCU of the previously-decoded picture, entropy decoding unit 70 may store all of the status information with respect to slice context initialization. In turn, entropy decoding unit 70 may access or read the copied status information and use the status information for initializing the context for one or more slices of the picture currently being decoded. By using the status information from a previously-decoded picture to perform context initialization for slices of a current picture, entropy decoding unit 70 may reduce the reliance on a fixed table of static information for the purpose of context initialization. For instance, after using the fixed table to initialize context for slices of a first picture, as well as for any intra-coded pictures, entropy decoding unit 70 may perform context initialization for inter-coded pictures that are decoded subsequently. Entropy decoding unit 70 may implement the inheritance-based context initialization techniques of this disclosure with respect to P slices and/or B slices.

Additional example details for the context initialization techniques of this disclosure are described below. Entropy decoding unit 70 may, additionally or alternatively, be configured to perform techniques according to this disclosure for context initialization, as discussed below. Entropy decoding unit 70 may implement the context initialization techniques of this disclosure to inherit the context information after encoding one block located in a previously-decoded picture as the initialized context information for coding the current slice. Entropy decoding unit 70 may apply the inheritance-based context initialization techniques to P and/or B slices. Additionally, the position of the 'one block' referred to above is pre-defined and fixed for one whole sequence. For instance, the largest coding unit size (LCU) is denoted by "N×N," the picture width is denoted by "W," and the picture height is denoted by "H." In this example, the number of LCUs within one LCU row, denoted by "PicWidthInCtbsY," is equal to the output of a ceiling function, namely, Ceil(W÷N). Additionally, in this example, the number of LCU rows, denoted by "PicHeightInCtbsY," is equal to Ceil(H÷N) where the ceiling function Ceil (x) represents the smallest integer greater than or equal to x.

According to some examples, the position is defined as the central LCU of the first slice in the previously-decoded picture. Supposing the numLCUinSlice represent the LCU number in the first slice, the position is defined as: TargetCUAddr=numLCUinSlice/2. In one example, the position is defined as: TargetCUAddr=(PicWidthInCtbsY*PicHeightInCtbsY)/2+PicWidthInCtbsY/2. Furthermore, when TargetCUAddr is equal to or larger than (PicWidthInCtbsY*PicHeightInCtbsY), (e.g., PicHeightInCtbsY is equal to 1), TargetCUAddr is reset to (PicWidthInCtbsY*PicHeightInCtbsY−1), which is corresponding to the last LCU. In one example, the position is defined as the last LCU of the previously coded picture, or the center LCU within one frame (i.e., PicWidthInCtbsY*PicHeightInCtbsY/2), or the last LCU of the center LCU row (i.e., PicWidthInCtbsY*(PicHeightInCtbsY/2)−1), or the last LCU of the k-th LCU row (e.g., k is equal to 1). According to one example, the position is defined as the last LCU of the first slice in the previously-decoded picture. According to some implementations of the context initialization techniques of this disclosure, different resolutions may have different definitions of the position of the coding block.

In some examples, entropy decoding unit 70 may obtain the position of the 'one block' from in a parameter set, such as a sequence parameter set (SPS) or a picture parameter set (PPS) that is signaled in the encoded video bitstream. Parameter sets, such as SPSs and/or PPSs, can be signaled out-of-band with respect to slices of the current picture. In some examples, the position of the 'one block' can be signaled in a slice header. A slice header may be signaled in-band with respect to a corresponding slice. In these and other examples, the indication of the previously-decoded picture, such as a reference picture index, a corresponding picture order count difference (or delta POC), may be signaled in a parameter set or slice header.

In some examples, a 'previously-coded picture' is defined as a picture which is decoded just (immediately) before the current picture. In some examples, a 'previously-coded picture' is defined as a picture which is the last picture decoded before the current picture, such that a first slice in the previous picture has the same slice type to the current slice. According to some examples, a 'previously-coded picture' is defined as the picture which is the decoded picture before the current picture and the first slice in the previous picture has the same initialized quantization parameters to the current slice. According to some examples, a 'previously-coded picture' is defined as a picture containing a previously coded slice which has the same slice type, or both the same slice type and quantization parameter(s), or both the same slice type and temporal layer, as the current slice and/or the same initialized quantization parameters. In some examples, a 'previously-coded picture' is defined as a picture that is present in a picture buffer (such as a decoded picture buffer), and may be used for the current picture as a reference picture. According to these examples, as in HEVC based platform, the previous slice must belong to a picture in a reference picture set (RPS), or a picture in one of the following subsets of the RPS: RefPicSetStCurrBefore, RefPicSetStCurrAfter, and RefPicSetLtCurr.

According to some implementations of the context initialization techniques of this disclosure, if all of the pictures coded after one intra-coded picture in display order do not have the same slice types and same initialized quantization parameters, then the inheritance of context information may be disabled. In this case, the conventional initialization method is applied, e.g., entropy decoding unit 70 may use the fixed table from which to draw initialization status information. According to some implementations, entropy decoding unit 70 may apply the inheritance-based context initialization techniques of this disclosure to specific context models, and not to other context models. In addition, or alternatively, the position of the 'one block' may be different for different context models. It will be appreciated that the various implementation options listed above may be implemented individually or in various combinations, in accordance with the context initialization techniques of this disclosure.

In some examples of the context initialization techniques of this disclosure, if entropy decoding unit 70 determines that the cabac_init_present_flag is enabled, then entropy decoding unit 70 may determine that a slice included in the 'previously-decoded picture' should have the same type as the currently-encoded slice. Said another way, in this example, if the cabac_init_present_flag is enabled, then the definition of a previously-decoded picture is dependent on matching slice types. Additionally, from a decoding standpoint, the signaled cabac_init_flag is not taken into consideration according to this implementation. In some instances, alternatively, entropy decoding unit 70 may first modify the slice type of the current slice based on cabac_init_flag and a selection of the 'previously-decoded picture'.

Additional example details for the context initialization techniques of this disclosure are described below. According to some implementations, entropy decoding unit 70 may not apply the inheritance-based context initialization techniques of this disclosure with respect to Intra Random Access Pictures (IRAP). For instance, entropy decoding unit 70 may not implement the inheritance-based context initialization techniques with respect to any of the three types of IRAPs, namely, instantaneous decoding refresh (IDR) pictures, clean random access (CRA) pictures, and broken link access (BLA) pictures.

In one example of the inheritance-based context initialization based on previously coded information, entropy decoding unit 70 may decode one picture with one slice. In this example, entropy decoding unit 70 may apply one or more of the following rules to derive the initialized states of context models. A first rule is that the slice of the previously-decoded picture has a slice type that is the same as the slice type for the currently-decoded slice. Alternatively, or in addition, the initialized slice quantization parameter (QP) is the same as the slice QP used for coding the currently-decoded slice. In some instances, entropy decoding unit 70 may record state information (e.g., the states) after decoding one block with a pre-defined address in the previously-decoded picture, and use the recorded state information as the initialized state information for the currently-decoded slice.

In one example, 'one block' represents a largest coding unit (LCU). For instance, the LCU size (dimensionality) may be denoted by 'N×N,' the picture width by 'W,' and the picture height by 'H.' The number of LCUs within one LCU row may be denoted by PicWInCtbsY, and is equal to the output of the ceiling function Ceil(W÷N). The number of LCU rows in the picture, denoted by PicHInCtbsY, is equal to to the output of the ceiling function Ceil(H÷N). Generically described, the function Ceil (x) returns the smallest integer greater than or equal to x. Additionally, the width of the picture, measured in units of LCUs, and the height of the picture, measured in LCUs, are represented respectively by the PicWInCtbsY and PicHInCtbsY values obtained using the ceiling functions described above. In one example, the address of the LCU is defined according to the following equation:

Target$CU$Addr=(PicWInCtbsY*PicHInCtbsY)/2+PicWInCtbsY/2

Furthermore, when TargetCUAddr is equal to or larger than the value of (PicWInCtbsY*PicHInCtbsY), entropy decoding unit 70 may reset TargetCUAddr is reset to the value of (PicWInCtbsY*PicHInCtbsY−1). For instance, TargetCUAddr may equal or exceed the above value in cases where PicHInCtbsY is equal to 1. Additionally, the value of (PicWInCtbsY*PicHInCtbsY−1) corresponds to the last LCU in one picture.

In some instances, furthermore, entropy decoding unit 70 may not apply the rules-based context initialization techniques described above for the first one or more pictures after a new intra-coded picture in display order. An example where entropy decoding unit 70 may not apply the rules-based context initialization is where entropy decoding unit 70 encounters a new slice type or a new QP (e.g., the new slice type or new QP has appeared) for the first time. For instance, entropy decoding unit 70 may mitigate or potentially avoid issues related to random access. An example of this technique is shown in FIG. 9, in which the decoding order for pictures with picture order count (POC) values from 28 to 35 is as follows: 32, 28, . . . 30, 29, 31, 40, 36, 34, 33, 35.

In terms of display order, the picture with a POC value equal to 40 is the first picture that is decoded after the I-picture with a POC value equal to 32. Although the picture with the POC value of 24 has the same QP as the picture with POC equal to 40, and both share the same slice types, entropy decoding unit 70 may not predict the picture with POC value equal to 40 using the coded information of the picture with POC equal to 24. Similarly, entropy decoding unit 70 may not reconstruct the picture with POC equal to 33 using the information decoded with respect to the picture with POC equal to 31. However, entropy decoding unit 70 may reconstruct the picture with POC equal to 35 using the coded information of the picture with POC equal to 33, because both pictures are subsequent (in display order) to the I-picture.

In instances where reconstruction using previously-decoded pictures is disallowed, disabled, or otherwise not available to entropy decoding unit 70, entropy decoding unit 70 may apply the context initialization techniques as defined in HEVC. As described above, video decoder 30 of FIG. 6 represents an example of a video decoding device that is configured to perform any of the various techniques of this disclosure for enhanced CABAC, alone or in any combination.

Figure 7:
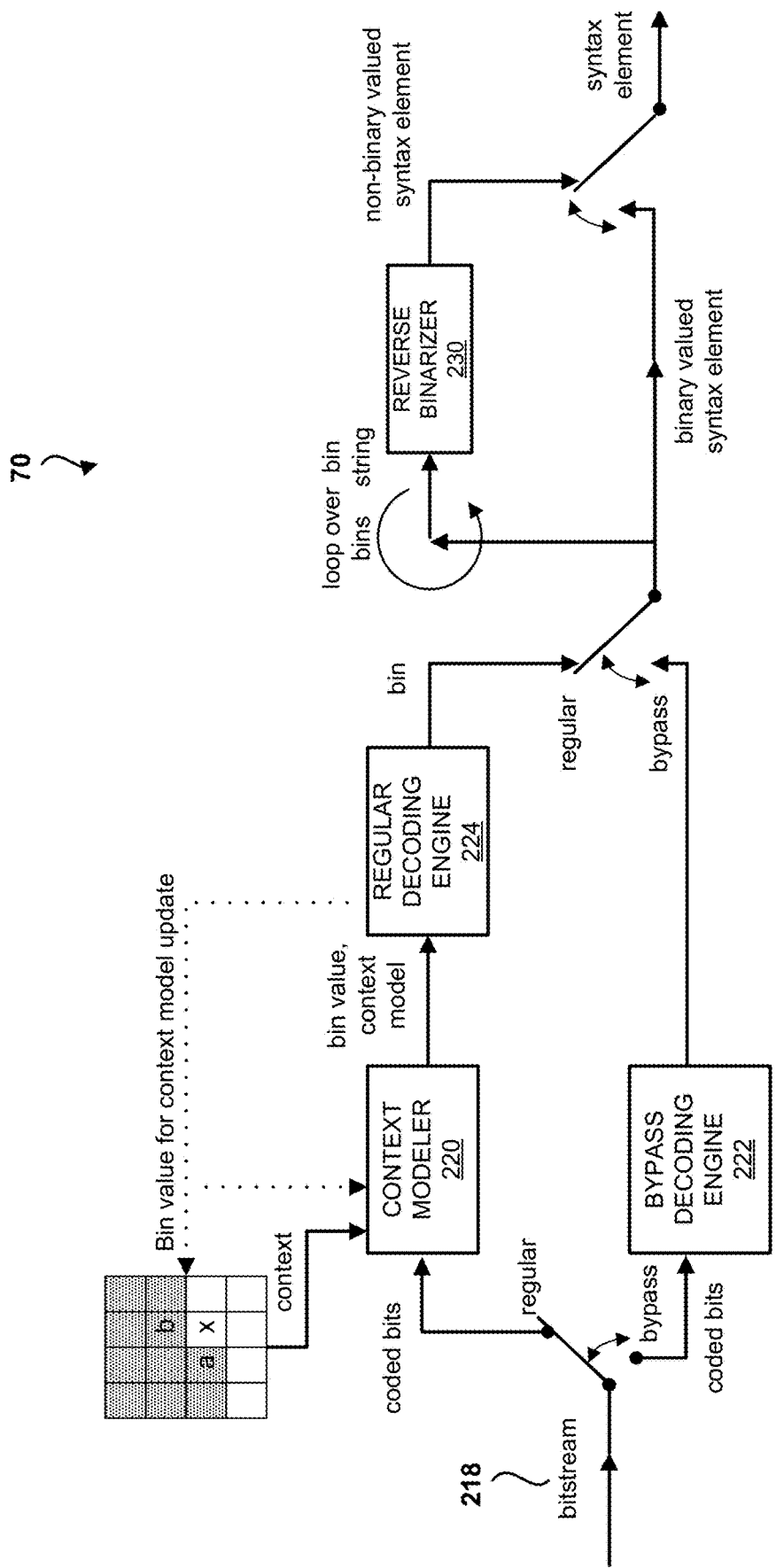
FIG. 7 is a block diagram of an example entropy encoding unit that may be configured to perform CABAC in accordance with the techniques of this disclosure.

FIG. 7 is a block diagram of an example entropy decoding unit 70 that may be configured to perform CABAC in accordance with the techniques of this disclosure. Entropy decoding unit 70 of FIG. 7 is one example implementation of entropy decoding unit 70 of FIG. 6. In various examples, entropy decoding unit 70 performs CABAC in an inverse manner as that of entropy decoding unit 70 described in FIG. 5. Coded bits from bitstream 218 are input into entropy decoding unit 70. The coded bits are fed to either context modeler 220 or bypass coding engine 222 based on whether or not they were entropy coded using bypass mode or regular mode. If the coded bits were coded in bypass mode, bypass decoding engine will use Golomb-Rice or exponential Golomb decoding, for example, to retrieve the binary-valued syntax elements or bins of non-binary syntax elements.

If the coded bits were coded in regular mode, context modeler 220 may determine a probability model for the coded bits and regular decoding engine 224 may decode the coded bits to produce bins of non-binary valued syntax elements (or the syntax elements themselves if binary-valued). After the context model and probability state σ is determined by context modeler 220, regular decoding engine 224 performs BAC on the bin value.

FIG. 5 is a block diagram of an example entropy decoding unit 70 that may be configured to perform CABAC in accordance with the techniques of this disclosure. A syntax element 118 is input into the entropy decoding unit 70. If the syntax element is already a binary-value syntax element (e.g., a flag or other syntax element that only has a value of 0 and 1), the step of binarization may be skipped. If the syntax element is a non-binary valued syntax element (e.g., a syntax element that may have values other than 1 or 0), the non-binary valued syntax element is binarized by binarizer 120. Binarizer 120 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 120 is fed to the binary arithmetic coding side of entropy encoding unit 56. That is, for a predetermined set of non-binary valued syntax elements, each bin type (e.g., bin0) is coded before the next bin type (e.g., bin1). Coding may be performed in either regular mode or bypass mode. In bypass mode, bypass coding engine 126 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin can be reconstructed given the values of previously-decoded bins. The probability of a bin being an LPS is determined by context modeler 220. Context modeler 220 outputs the bin value and the probability state for the context model (e.g., the probability state σ, including the value of the LPS and the probability of the LPS occurring). The context model may be an initial context model for a series of bins, or may be determined based on the values of previously reconstructed bins. As described above, context modeler 220 may update the state based on whether or not the received bin was the MPS or the LPS. After the context model and probability state σ is determined by context modeler 220, regular decoding engine 224 performs BAC on the bin value.

Context modeler 220 may implement the techniques of this disclosure to perform context modeling in a parallelized manner. According to various aspects of this disclosure, context modeler 220 may perform context modeling for the i-th bin of a transform coefficient using the values of the i-th bins of one or more previously-decoded transform coefficients. In this way, the context modeling of the i-th bin for a current transform coefficient is dependent on the values of the corresponding i-th bins of one or more transform coefficients for which context modeler 220 has already selected the context.

By performing context modeling for a bin of a current transform coefficient using the values of i-th bins of previously-decoded transform, context modeler 220 may implement the techniques of this disclosure to provide one or more potential improvements over existing CABAC coding devices. As an example of such a benefit, context modeler 220 may improve the parallelization of the context modeling operation by implementing the techniques of this disclosure. For instance, context modeler 220 may perform context modeling, in parallel, for multiple bins of a transform coefficient currently being decoded. As one example, if context modeler 220 determines that bin values corresponding to multiple bins are available from previously-decoded transform coefficient(s), then context modeler 220 may at least partially parallelize the context modeling operations for the bins of the transform coefficient being decoded currently.

Context modeler 220 may perform the parallelized context modeling of this disclosure in accordance with a multi-pass decoding scheme. More specifically, a multi-pass decoding scheme refers to a decoding technique by which entropy decoding unit 70d assigns separate threads to each particular bin (e.g., thread 1 for the first bin, thread 2 for the second bin, and so on). Thus, according to multi-pass coding, all bin0 instances can be decoded in sequence, independently of the bin1 instances that are decoded in sequence, both of which are decoded independently of the bin2 instances that are decoded in sequence, etc. In some examples, context modeler 220 may perform the multi-pass decoding with respect to transform units of single block. Moreover, for bins that are decoded according to the regular mode, context modeler 220 may perform the context selection in multiple passes. Each pass may pertain to a single corresponding bin of all transform coefficients. In other words, during each pass, context modeler 220 does not utilize information relating to the other passes. For instance, context modeler 220 may select the context for the first bin of all transform coefficients within one transform unit/CG in a first pass. In this example, in a second pass, context modeler 220 may select the context for the second bin of all transform coefficients within one transform unit/CG, if needed, and so on.

In one example use case, context modeler 220 may perform context modeling for bin0 of a currently-coded transform coefficient using the value of bin0 of the previously-coded neighboring transform coefficient, perform context modeling for bin1 of a currently-coded transform coefficient using the value of bin1 of the previously-coded neighboring transform coefficient, and so on. Using any bin values that are available for the previously-coded transform coefficient, context modeler 220 may perform the context modeling for multiple bins of the currently-coded transform coefficient in parallel. In the use case scenario described above, if bin0 and bin1 are both available from the previously-coded neighbor transform coefficient, then context modeler 220 may parallelize the context modeling of bin0 and bin1 for the currently-coded transform coefficient. In this manner, context modeler 220 may implement the techniques of this disclosure to perform CABAC within the tenets of multi-pass decoding as described in HEVC, while improving the context selection for bins of a current transform coefficient by enabling and potentially exploiting parallelization of context modeling operations.

It will be appreciated that context modeler 220 can, but may not necessarily, perform the entire context modeling of all such bins in parallel. More specifically, context modeler 220 may perform some portions of the context modeling of multiple bins concurrently. In this way, context modeler 220 may implement the techniques of this disclosure to draw upon multicore processing technology and/or multiple processors to improve the context modeling operations for a currently-coded transform coefficient.

By decoding corresponding bins of different transform coefficients in a single pass, context modeler 220 may provide one or more advantages over existing multi-pass CABAC techniques. For instance, by decoding the corresponding bins (e.g., the respective bin0) of multiple transform coefficients in a single pass, context modeler 220 may circumvent the need to store and retrieve a new context model frequently at bin transitions. Instead, context modeler 220 may use a single context model across a given pass, because the pass targets the corresponding bins (e.g., the respective bin0) across multiple transform coefficients. In this way, context modeler 220 may implement the parallelized context selection techniques of this disclosure to mitigate or potentially eliminate time delays and resource churn that arise from frequent context-switching. In contrast, existing multi-pass coding would require frequent context model save- and retrieve-operations, because of decoding bin0, bin1, bin2, etc. for a first transform coefficient, and then decoding bin0, bin1, bin2, etc. for a second transform coefficient, and so on.

For instance, context modeler 220 may generate or otherwise access one or more pre-defined templates to use for the i-th bin context modeling functionalities described herein. One non-limiting example of a pre-defined template that context modeler 220 may use for context modeling of an i-th bin of a currently-coded transform coefficient is illustrated in FIG. 10. A pre-defined template, such as template 140 of FIG. 10 defines a diagonal scan order for an 8×8 transform block, where 'L' denotes the last significant scan position, 'x' denotes the current scan position, and "$x_i$," denotes the neighbors covered by local template 140. With respect to $x_i$, the value of "i" is in the range of zero through 4, and the range constraint is expressed as i∈[0,4]. In accordance with one or more aspects of this disclosure, context modeler 220 may use the i-th bins of transform coefficients located in local template 140 for context modeling of the corresponding i-th bin of a transform coefficient that is being decoded currently. According to some implementations, context modeler 220 may use multiple templates to perform the parallelized bin context modeling of this disclosure. In one example, the template size and/or shape is dependent on one or more of the following criteria: (i) the size of transform units; (ii) modes; or (iii) the position of the current transform coefficients within the current transform unit or coefficient group (CG).

By using one or more pre-defined templates to traverse a previously-coded TU for bin values, context modeler 220 may implement the techniques of this disclosure to provide one or more enhancements over existing CABAC technology. For instance, by using a TU traversal template, such as local template 140 of FIG. 10, context modeler 220 may circumvent the need to separately determine a traversal scheme with respect to different decoding passes. Thus, by implementing the template-based parallelized context selection techniques of this disclosure, context modeler 220 may increase throughput with respect to bin decoding, while maintaining picture accuracy.

According to another example implementation, context modeler 220 may only apply the parallelized context modeling techniques of this disclosure to the first 'K' bins of the currently-coded transform coefficient, where 'K' is smaller than M, and where 'M' denotes the upper bound of the available bin indexes. Context modeler 220 may decode the remaining (M+1−K) bins are coded using another context modeling technique, or according to bypass mode.

According to another example implementation, context modeler 220 may define the universe of previously-coded transform coefficients as the 'N' consecutive transform coefficients in the decoding order within the current transform unit or CG before the transform coefficient currently being decoded. Alternatively, context modeler 220 may determine N to be a variable. In one example, context modeler 220 may determine the value of N dependent on the relative position of the currently-decoded transform coefficient in the current transform unit. In another example, context modeler 220 may determine the value of N dependent on the transform unit size.

In another implementation, context modeler 220 may define the universe of previously-decoded transform coefficients as those transform coefficients positioned at the neighborhood of the current position within the current transform unit or CG. In one example, the neighborhood of the current position is constrained to those positions directly adjacent to the current position, or positions either directly adjacent to or separated from the current position. In another example, the neighborhood may also include these positions, but expand to include positions in one or more spatial neighboring transform units.

In accordance with various aspects of this disclosure, context modeler 220 may define the context index of a bin as a function of values associated with one or more previously-coded transform coefficients. For instance, context modeler 220 may use a function that yields the sum of all i-th bin values of the previously-coded transform coefficients. More specifically, in this example, context modeler 220 may perform a summation of the values of the available i-th bin values of all previously-decoded transform coefficients of the TU/CG. In turn, context modeler 220 may use the resulting sum as the context index (CtIdx) during context modeling for the i-th bin of the currently-coded transform coefficient.

According to some aspects of this disclosure, context modeler 220 may keep the context index derivation rule unchanged for the same pass in different sizes of transform units. However, context modeler 220 may apply an offset to the context index to perform context modeling for the currently-coded bin. For instance, context modeler 220 may determine that two different transform sizes have two sets of context models. In turn, context modeler 220 may define the offset as the number of context models in one such set. For instance, if context modeler 220 determines that the TU size is less than a square of predefined dimensions M×M, then context modeler 220 may determine that each such TU (smaller than M×M) TU size has its own respective set of context models. Conversely, entropy decoding unit 70 may determine that all TUs with sizes equal to or larger than M×M share the same set of context models.

In various use case scenarios, context modeler 220 may set the value of M at 16. More specifically, in these examples, if context modeler 220 determines that the size of the currently-coded TU is less than a 16×16 square, then context modeler 220 may determine that the currently-coded TU has is associated with a set of context models that corresponds to the TU's particular size. Conversely, if entropy decoding unit 70 determines that the currently-coded TU has a size that equal to or larger than 16×16, then context modeler 220 may determine that the currently-coded TU shares the same set of context models with all other TUs that have a size equal to or greater than 16×16. In some examples, context modeler 220 may apply the TU size-based context selection only to luma blocks.

According to some aspects of this disclosure, context modeler 220 may determine the coefficient group (CG) size based on the transform size. In other words, according to these aspects, the CG size is dependent on transform size. Alternatively, or in addition, context modeler 220 may determine the CG size based on the coding mode. In these examples, context modeler 220 may determine the CG size as being dependent on one or both of the transform size and/or the coding mode. Alternatively, or in addition, context modeler 220 may determine the CG size based on a transform matrix.

According to some aspects of this disclosure, context modeler 220 may also apply the parallelized context modeling techniques can also to the blocks that are decoded using transform bypass mode (also referred to as "transform skip mode"). Transform bypass mode refers to a coding mode according to which video decoder 30 may skip the inverse transform and inverse quantization operations of decoding, such as in cases where bitstream 218 is losslessly encoded. Thus, according to certain aspects of this disclosure, context modeler 220 may expand the parallelized context selection techniques to provide the potential resulting advantages in instances where bitstream 218 is losslessly encoded.

Figure 8:
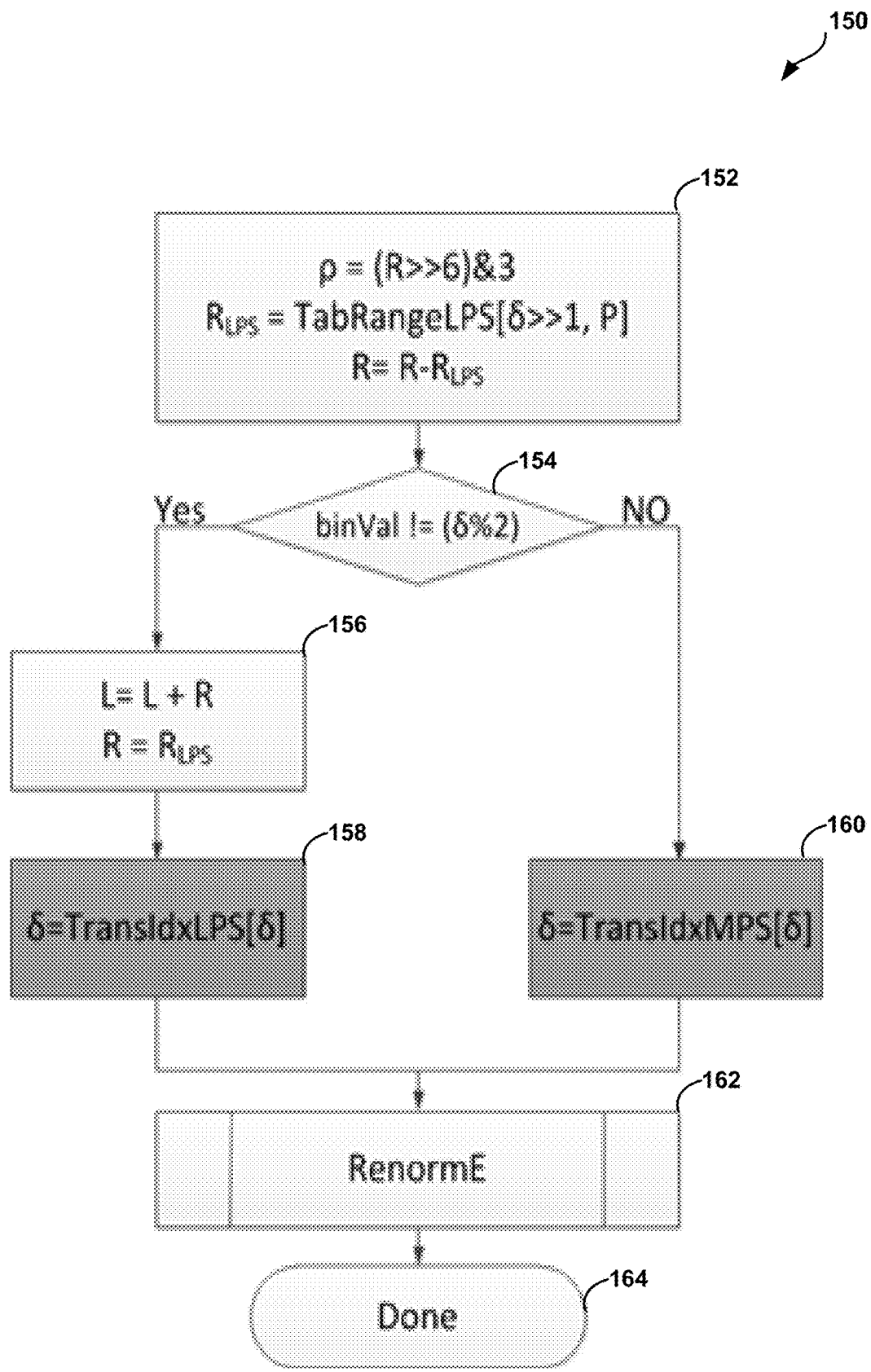
FIG. 8 is a flowchart illustrating an example process for table-based binary arithmetic coding.

FIG. 8 is a flowchart illustrating an example process 150 for table-based binary arithmetic coding. That is, FIG. 8 illustrates the binary arithmetic encoding process including the updating process of probability estimation (in gray shaded boxes for steps 158 and 160) for a single bin value (binVal) using regular coding mode. In particular, process 150 of FIG. 8 illustrates a binary arithmetic encoding process for a given bin value binVal using the regular coding mode. The internal state of the arithmetic encoding engine is characterized by two quantities: the current interval range R and the base (lower endpoint) L of the current code interval. However, the precision needed to store these registers in a CABAC engine (both in regular and bypass mode) can be reduced up to 9 and 10 bits, respectively. Encoding of the given binary value binVal observed in a context with probability state index δ and value of MPS (δ%2) is performed in a sequence of four elementary steps as follows.

Process 150 may begin at step 152, at which the video coding device subdivides a current interval according to the given probability estimates. This interval subdivision process involves three elementary operations as shown at step 152 of process 150. First, the current interval range R is approximated by a quantized value Q(R) using an equi-partition of the whole range $2^8 \leq R \leq 2^9$ into four cells. But instead of using the corresponding representative quantized range values $Q_0$, $Q_1$, $Q_2$, and $Q_3$ explicitly in the CABAC engine, is only addressed by its quantizer index ρ, which can be efficiently computed by a combination of a shift and bit-masking operation, i.e.:

$$\rho = (R >> 6) \ \& \ 3 \quad (4.5)$$

Then, this index ρ and the probability state index δ are used as entries in a 2-D table TabRangeLPS to determine the (approximate) LPS related subinterval range $R_{LPS}$, as shown in FIG. 8. Here, the table TabRangeLPS contains all 64×4 pre-computed product values for $p_σ \cdot Q_ρ$ for $0 \leq (δ >> 1) \leq 63$ and $0 \leq ρ \leq 3$ in 8-bit precision. Given the dual subinterval range for the MPS, the subinterval corresponding to the given bin value binVal is chosen in decision block 94 of process 150. If binVal is equal to the MPS value (NO branch of decision block 154), the video coding device may choose the lower subinterval, so that L is unchanged. Otherwise (YES branch of decision block 154), the video coding device may select the upper subinterval with range equal to $R_{LPS}$ (156).

At steps 158 and 160 process 90 the update of the probability states is performed as described in ITU-T H.264, § 1.2.2.2 (illustrated using gray shaded boxes). Step 162 consists of the renormalization of the registers L and R ("RenormE" box in FIG. 1). Step 164 represents the end of process 150.

The 2-D table TabRangeLPS is defined as follows:

```
TabRangeLPS[64][4] =
{
    { 128, 176, 208, 240},
    { 128, 167, 197, 227},
    { 128, 158, 187, 216},
    { 123, 150, 178, 205},
    { 116, 142, 169, 195},
    { 111, 135, 160, 185},
    { 105, 128, 152, 175},
    { 100, 122, 144, 166},
    { 95, 116, 137, 158},
    { 90, 110, 130, 150},
    { 85, 104, 123, 142},
    { 81, 99, 117, 135},
    { 77, 94, 111, 128},
    { 73, 89, 105, 122},
    { 69, 85, 100, 116},
    { 66, 80, 95, 110},
    { 62, 76, 90, 104},
    { 59, 72, 86, 99},
    { 56, 69, 81, 94},
    { 53, 65, 77, 89},
    { 51, 62, 73, 85},
    { 48, 59, 69, 80},
    { 46, 56, 66, 76},
    { 43, 53, 63, 72},
    { 41, 50, 59, 69},
    { 39, 48, 56, 65},
    { 37, 45, 54, 62},
    { 35, 43, 51, 59},
    { 33, 41, 48, 56},
    { 32, 39, 46, 53},
    { 30, 37, 43, 50},
    { 29, 35, 41, 48},
    { 27, 33, 39, 45},
    { 26, 31, 37, 43},
    { 24, 30, 35, 41},
    { 23, 28, 33, 39},
    { 22, 27, 32, 37},
    { 21, 26, 30, 35},
    { 20, 24, 29, 33},
    { 19, 23, 27, 31},
    { 18, 22, 26, 30},
    { 17, 21, 25, 28},
    { 16, 20, 23, 27},
    { 15, 19, 22, 25},
    { 14, 18, 21, 24},
    { 14, 17, 20, 23},
    { 13, 16, 19, 22},
    { 12, 15, 18, 21},
    { 12, 14, 17, 20},
    { 11, 14, 16, 19},
    { 11, 13, 15, 18},
    { 10, 12, 15, 17},
    { 10, 12, 14, 16},
    { 9, 11, 13, 15},
    { 9, 11, 12, 14},
    { 8, 10, 12, 14},
    { 8, 9, 11, 13},
    { 7, 9, 11, 12},
    { 7, 9, 10, 12},
    { 7, 8, 10, 11},
    { 6, 8, 9, 11},
    { 6, 7, 9, 10},
    { 6, 7, 8, 9},
    { 2, 2, 2, 2}
};
```

The decoding process is described in Section 9.3.4.3.2.2 of the HEVC specification.

FIG. 9 is a conceptual diagram that illustrates a transform scheme based on a residual quadtree structure. To adapt the various characteristics of the residual blocks, a transform coding structure using the residual quadtree (RQT) is applied in HEVC. The residual quadtree structure is described below. Additional details are described and available at www.hhi.fraunhofer.de/fields-of-competence/image-processing/researchgroups/image-video-coding/hevc-high-efficiency-video-coding/transform-coding-using-the-residual-quadtree-rqt.html According to the residual quadtree structure illustrated in FIG. 9, each picture is divided into coding tree units (CTUs). The CTUs of the picture are coded (e.g., encoded and/or decoded) in raster scan order for a specific tile or slice. A CTU is a square block and represents the root of a quadtree or coding tree. The CTU size may range from 8×8 to 64×64, with the width and length being expressed in units of luma samples. The 64×64 dimensionality is commonly used by HEVC-compliant coding devices. Each CTU can be further split into smaller square blocks called coding units (CUs). After the CTU is split into CUs (sometimes recursively), each CU is further divided into prediction units (PUs) and transform units (TUs). PUs and CUs also have a square form factor. The partitioning of a CU into TUs is carried out recursively based on a quadtree approach. Therefore, the residual signal of each CU is coded using a tree structure, namely, the residual quadtree (RQT). The RQT allows TU sizes (expressed as square dimensionalities in units of luma samples) from 4×4 up to 32×32.

FIG. 9 shows an example where a CU includes 10 TUs. The TUs are labeled with the letters a to j, and each TU label is illustrated inside the corresponding block partitioning. Each node of the RQT is a transform unit (TU). The individual TUs are processed in depth-first tree traversal order. The result of depth-first tree traversal with respect to FIG. 9 is illustrated in FIG. 9 according to alphabetical order. More specifically, FIG. 9 illustrates an example of a recursive Z-scan with depth-first traversal. The quadtree approach illustrated in FIG. 9 enables the adaptation of the transform to varying space-frequency characteristics of the residual signal.

In many examples, larger transform block sizes, which have larger spatial support, provide better frequency resolution. However, smaller transform block sizes, which have smaller spatial support, provide better spatial resolution. The trade-off between the two (spatial and frequency resolutions), is selected by way of an encoder mode decision. For example, the encoder mode decision may be based on a rate-distortion (RD) optimization technique. The rate-distortion optimization technique calculates a weighted sum of coding bits and reconstruction distortion. For instance, mode select unit 40 may base a mode selection decision on the rate-distortion cost for each coding mode. In some examples, the rate-distortion cost for each available mode may correlate to a specific RQT splitting structure associated with each coding mode. In an RD cost-based decision scheme, mode select unit may select the coding mode with the lowest (or least) rate-distortion cost as the best available mode.

Three parameters are defined in the RQT partitioning scheme. The parameters are: the maximum depth of the tree, the minimum allowed transform size and the maximum allowed transform size. According to some aspects of HEVC, the minimum and maximum transform sizes can vary within the range from 4×4 to 32×32 samples. The range from 4×4 to 32×32 samples corresponds to the supported block transforms discussed above. The maximum allowed depth of the RQT restricts or constrains the number of TUs that the RQT partitioning scheme can yield. A maximum depth equal to zero means that a CTU cannot be split any further if each included TU reaches the maximum allowed transform size, e.g., 32×32.

All of the parameters discussed above interact (e.g., are used synergistically), and influence the RQT structure. Described below is a use-case scenario in which the root CTU size is 64×64, the maximum depth is equal to zero, and the maximum transform size is equal to 32×32. In this case, the video coding device would need to partition the CTU at least once. If the CTU is not partitioned, then the RQT would yield a 64×64 TU, which is not permitted, per the third parameter. Video encoder 20 may include the RQT parameters (including but not limited to the maximum RQT depth and the minimum and maximum transform size) in the bitstream, at the sequence parameter set (SPS) level. Video encoder 20 may specify and signal different values for the RQT depth with respect to intra- and inter-coded CUs. In turn, video decoder 30 may recover the RQT parameters from the received bitstream, and perform RQT partitioning using the constraints specified in the signaled parameters.

Video encoder 20 and/or video decoder 30 may apply the quadtree transform for both Intra and Inter residual blocks. In many examples, video encoder 20 and/or video decoder 30 may apply the DCT-II transform of the same size of the current residual quadtree partition is applied for a residual block. However, if the current residual quadtree block is 4×4 and is generated by Intra prediction, video encoder 20 and/or video decoder 30 may apply the 4×4 DST-VII transform described above. In HEVC, larger size transforms, e.g., 64×64 transforms, are not adopted mainly due to their limited benefits, and relatively high complexity for relatively smaller resolution videos.

FIG. 10 is a conceptual diagram depicting an example template (local template 140) that a video coding device may use with respect to the context modeling techniques described herein. The current transform coefficient is marked as 'X' and the five spatial neighbors are marked as '$X_i$' (with T representing an integer from 0 through 4). If any one of a set of conditions is satisfied, then the video coding devices may mark $X_i$ as unavailable and not used in the context index derivation process. A first condition in the set of conditions is that the position of $X_i$ and current transform coefficient X are not located in the same transform unit. A second condition in the set of conditions is that the position of $X_i$ is located outside of the picture's horizontal or vertical boundaries. A third condition in the set of conditions is that the transform coefficient $X_i$ has not been coded yet. In the case of multi-pass coding, whenever the bins in the same coding pass are coded, the bins could be used in the context index derivation process. Therefore, from a decoding perspective, it is not necessary to fully decode one transform coefficient.

Figure 11:
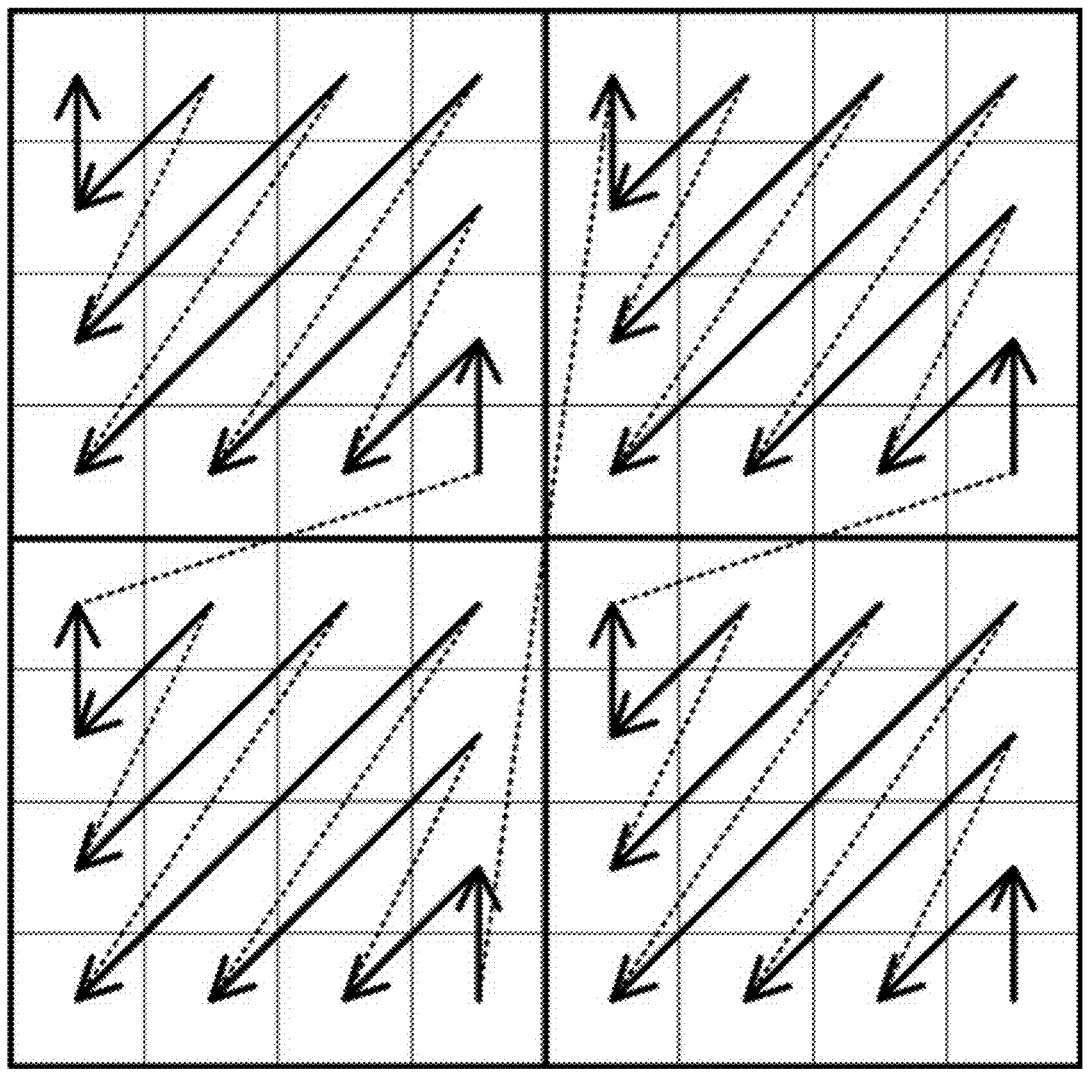
FIG. 11 is a conceptual diagram illustrating an example coefficient scan based on coefficient groups.

FIG. 11 is a conceptual diagram illustrating an example coefficient scan based on coefficient groups. Regardless the TU size, the residual of the transform unit is coded with non-overlapped coefficient groups (CG), each contains the coefficients of a 4×4 block of a TU. For example, a 32×32 TU has totally 64 CGs, and a 16×16 TU has totally 16 CGs. The CGs inside a TU may be coded according to a certain pre-defined scan order. When coding each CG, the coefficients inside the current CG are scanned and coded according to a certain pre-defined scan order for 4×4 block. FIG. 11 illustrates the coefficient scan for an 8×8 TU containing 4 CGs.

The syntax element table is defined as follows:
7.3.8.11 Residual Coding Syntax

|  | Descriptor |
|---|---|
| residual_coding( x0, y0, log2TrafoSize, cIdx ) { |  |
|     if( transform_skip_enabled_flag && !cu_transquant_bypass_flag && |  |
|         ( log2TrafoSize = = 2 ) ) |  |
|         transform_skip_flag[ x0 ][ y0 ][ cIdx ] | ae(v) |
|     last_sig_coeff_x_prefix | ae(v) |
|     last_sig_coeff_y_prefix | ae(v) |
|     if( last_sig_coeff_x_prefix > 3 ) |  |
|         last_sig_coeff_x_suffix | ae(v) |
|     if( last_sig_coeff_y_prefix > 3 ) |  |
|         last_sig_coeff_y_suffix | ae(v) |
|     lastScanPos = 16 |  |
|     lastSubBlock = ( 1 << ( log2TrafoSize − 2 ) ) * ( 1 << ( |  |
|         log2TrafoSize − 2 ) ) − 1 |  |
|     do { |  |
|         if( lastScanPos = = 0 ) { |  |
|             lastScanPos = 16 |  |
|             lastSubBlock− − |  |
|         } |  |
|         lastScanPos− − |  |
|         xS = ScanOrder[ log2TrafoSize − 2 ][ scanIdx ][ lastSubBlock ][ 0 ] |  |
|         yS = ScanOrder[ log2TrafoSize − 2 ][ scanIdx ][ lastSubBlock ][ 1 ] |  |
|         xC = ( xS << 2 ) + ScanOrder[ 2 ][ scanIdx ][ lastScanPos ][ 0 ] |  |
|         yC = ( yS << 2 ) + ScanOrder[ 2 ][ scanIdx ][ lastScanPos ][ 1 ] |  |
|     } while( ( xC != LastSignificantCoeffX ) \|\| ( yC != |  |
|         LastSignificantCoeffY ) ) |  |
|     for( i = lastSubBlock; i >= 0; i− − ) { |  |
|         xS = ScanOrder[ log2TrafoSize − 2 ][ scanIdx ][ i ][ 0 ] |  |
|         yS = ScanOrder[ log2TrafoSize − 2 ][ scanIdx ][ i ][ 1 ] |  |
|         inferSbDcSigCoeffFlag = 0 |  |
|         if( ( i < lastSubBlock ) && ( i > 0 ) ) { |  |
|             coded_sub_block_flag[ xS ][ yS ] | ae(v) |
|             inferSbDcSigCoeffFlag = 1 |  |
|         } |  |
|         for( n = ( i = = lastSubBlock ) ? lastScanPos − 1 : 15; n >= 0; n− − ) { |  |
|             xC = ( xS << 2 ) + ScanOrder[ 2 ][ scanIdx ][ n ][ 0 ] |  |
|             yC = ( yS << 2 ) + ScanOrder[ 2 ][ scanIdx ][ n ][ 1 ] |  |

|  | Descriptor |
|---|---|
| ```
        if( coded_sub_block_flag[ xS ][ yS ] && ( n > 0 | |
!inferSbDcSigCoeffFlag ) ) {
            sig_coeff_flag[ xC ][ yC ]
            if( sig_coeff_flag[ xC ][ yC ] )
                inferSbDcSigCoeffFlag = 0
        }
    }
    firstSigScanPos = 16
    lastSigScanPos = −1
    numGreater1Flag = 0
    lastGreater1ScanPos = −1
    for( n = 15; n >= 0; n− − ) {
        xC = ( xS << 2 ) + ScanOrder[ 2 ][ scanIdx ][ n ][ 0 ]
        yC = ( yS << 2 ) + ScanOrder[ 2 ][ scanIdx ][ n ][ 1 ]
        if( sig_coeff_flag[ xC ][ yC ] ) {
            if( numGreater1Flag < 8 ) {
                coeff_abs_level_greater1_flag[ n ]
                numGreater1Flag++
                if( coeff_abs_level_greater1_flag[ n ] && lastGreater1ScanPos
= = −1 )
                    lastGreater1ScanPos = n
            }
            if( lastSigScanPos = = −1 )
                lastSigScanPos = n
            firstSigScanPos = n
        }
    }
    signHidden = ( lastSigScanPos − firstSigScanPos > 3 &&
!cu_transquant_bypass_flag )
    if( lastGreater1ScanPos != −1 )
        coeff_abs_level_greater2_flag[ lastGreater1ScanPos ]
    for( n = 15; n >= 0; n− − ) {
        xC = ( xS << 2 ) + ScanOrder[ 2 ][ scanIdx ][ n ][ 0 ]
        yC = ( yS << 2 ) + ScanOrder[ 2 ][ scanIdx ][ n ][ 1 ]
        if( sig_coeff_flag[ xC ][ yC ] &&
            ( !sign_data_hiding_enabled_flag | | !signHidden | | ( n !=
firstSigScanPos ) ) )
            coeff_sign_flag[ n ]
    }
    numSigCoeff = 0
    sumAbsLevel = 0
    for( n = 15; n >= 0; n− − ) {
        xC = ( xS << 2 ) + ScanOrder[ 2 ][ scanIdx ][ n ][ 0 ]
        yC = ( yS << 2 ) + ScanOrder[ 2 ][ scanIdx ][ n ][ 1 ]
        if( sig_coeff_flag[ xC ][ yC ] ) {
            baseLevel = 1 + coeff_abs_level_greater1_flag[ n ] +
                    coeff_abs_level_greater2_flag[ n ]
            if( baseLevel = = ( ( numSigCoeff < 8 ) ?
                        ( ( n = = lastGreater1ScanPos) ? 3 : 2 ) : 1 ) )
                coeff_abs_level_remaining[ n ]
            TransCoeffLevel[ x0 ][ y0 ][ cIdx ][ xC ][ yC ] =
                ( coeff_abs_level_remaining[ n ] + baseLevel ) * ( 1 − 2 *
coeff_sign_flag[ n ] )
            if( sign_data_hiding_enabled_flag && signHidden ) {
                sumAbsLevel += ( coeff_abs_level_remaining[ n ] + baseLevel
)
                if( ( n = = firstSigScanPos ) && ( ( sumAbsLevel % 2 ) = =
1 ) )
                    TransCoeffLevel[ x0 ][ y0 ][ cIdx ][ xC ][ yC ] =
                        −TransCoeffLevel[ x0 ][ y0 ][ cIdx ][ xC ][ yC ]
            }
            numSigCoeff++
        }
    }
  }
}
``` | ae(v)<br><br><br><br><br><br><br><br><br><br><br><br><br><br><br><br><br><br><br>ae(v)<br><br><br><br><br><br><br>ae(v)<br><br><br><br><br><br><br><br>ae(v) |

For each color component, video encoder 20 may first signal one flag to indicate whether current TU has at least one non-zero coefficient. If there is at least one non-zero coefficient in the current TU, then video encoder 20 may explicitly encode the position of the last significant coefficient in the coefficient scan order in a TU with a coordinate relative to the top-left corner of the transform unit. The vertical or horizontal component of the coordinate is represented by its prefix and suffix, where the prefix is binarized with truncated rice (TR) and suffix is binarized with fixed length.

Semantics:

last_sig_coeff_x_prefix specifies the prefix of the column position of the last significant coefficient in scanning order within a transform block. The values of last_sig_coeff_x_prefix shall be in the range of 0 to (log 2 TrafoSize<<1)−1, inclusive.

last_sig_coeff_y_prefix specifies the prefix of the row position of the last significant coefficient in scanning order within a transform block. The values of last_sig_coeff_y_prefix shall be in the range of 0 to (log 2 TrafoSize<<1)−1, inclusive.

last_sig_coeff_x_suffix specifies the suffix of the column position of the last significant coefficient in scanning order within a transform block. The values of last_sig_coeff_x_suffix shall be in the range of 0 to (1<<((last_sig_coeff_x_prefix>>1)−1))−1, inclusive.

The column position of the last significant coefficient in scanning order within a transform block LastSignificantCoeffX is derived as follows:
If last_sig_coeff_x_suffix is not present, the following applies:
  LastSignificantCoeffX=last_sig_coeff_x_prefix
Otherwise (last_sig_coeff_x_suffix is present), the following applies:
  LastSignificantCoeffX=(1<<((last_sig_coeff_x_prefix>>1)−1))*(2+(last_sig_coeff_x_prefix & 1))+last_sig_coeff_x_suffix last_sig_coeff_y_suffix specifies the suffix of the row position of the last significant coefficient in scanning order within a transform block. The values of last_sig_coeff_y_suffix shall be in the range of 0 to (1<<((last_sig_coeff_y_prefix>>1)−1))−1, inclusive.

The row position of the last significant coefficient in scanning order within a transform block LastSignificantCoeffY is derived as follows:
If last_sig_coeff_y_suffix is not present, the following applies:
  LastSignificantCoeffY=last_sig_coeff_y_prefix
Otherwise (last_sig_coeff_y_suffix is present), the following applies:
  LastSignificantCoeffY=(1<<((last_sig_coeff_y_prefix>>1)−1))*(2+(last_sig_coeff_y_prefix & 1))+last_sig_coeff_y_suffix When scanIdx is equal to 2, the coordinates are swapped as follows: (LastSignificantCoeffX, LastSignificantCoeffY)=Swap(LastSignificantCoeffX, LastSignificantCoeffY)

With such a position coded and also the coefficient scanning order of the CGs, one flag is further signaled for CGs except the last CG (in scanning order) which indicates whether it contains non-zero coefficients.

Context modeling of CG flag. When coding whether one CG has non-zero coefficients, i.e., the CG flag (coded_sub_block_flag in the HEVC specification), the information of neighboring CGs are utilized to build the context. To be more specific, the context selection for coding the CG flag is defined as follows:
(Right CG available && Flag of right CG is equal to 1)||(below CG available && Flag of below CG is equal to 1)

Here, the right and below CG are the two neighboring CGs close to current CG. For example, in FIG. 11, when encoding the top-left 4×4 block, video encoder 20 may define the right CG as the top-right 4×4 block and the below CG is defined as the left-below 4×4 block. Chroma and luma use different sets of context models, but with the same rule to select one of them. Details of the derivation of context index increment can be found in 9.3.4.2.4 of HEVC.

Transform coefficient coding within one CG: For those CGs that may contain non-zero coefficients, video encoder 20 may further encode (and video decoder 30 may further decode) significant flags (significant_flag), absolute values of coefficients (including coeff_abs_level_greater1_flag, coeff_abs_level_greater2_flag and coeff_abs_level_remaining) and sign information (coeff_sign_flag) for each coefficient according to the pre-defined 4×4 coefficient scan order. The coding (e.g., encoding and/or decoding) of transform coefficient levels is separated into multiple scan passes.

First pass of the first bin coding: In this pass, all the first bins (or the bin index 0, bin0) of transform coefficients at each position within one CG are coded except that it could be derived that the specific transform coefficient is equal to 0. The variable sigCtx depends on the current location relative to the top-left position of current TU, the color component index cIdx, the transform block size, and previously decoded bins of the syntax element coded_sub_block_flag. Different rules are applied depending on the TU size. Example details of the selection of the context index increment are defined in 9.3.4.2.5 of HEVC.

Second pass of the second bin coding: The coding of coeff_abs_level_greater1_flags is applied in this pass. The context modeling is dependent on color component index, the current sub-block scan index, and the current coefficient scan index within the current sub-block. Example details of the selection of the context index increment are defined in 9.3.4.2.6 of HEVC.

Third pass of the third bin coding: The coding of coeff_abs_level_greater2_flags is applied in this pass. The context modeling is similar to that used by coeff_abs_level_greater1_flags. Example details of the selection of the context index increment are defined in 9.3.4.2.7 of HEVC. In order to improve throughput, the second and third passes may not process all the coefficients in a CG. The first eight coeff_abs_level_greater1_flags in a CG are coded in regular mode. After that, the values are left to be coded in bypass mode in the fifth pass by the syntax coeff_abs_level_remaining. Similarly, only the coeff_abs_level_greater2_flags for the first coefficient in a CG with magnitude larger than 1 is coded. The rest of coefficients with magnitude larger than 1 of the CG use coeff_abs_level_remaining to code the value. This method limits the number of regular bins for coefficient levels to a maximum of 9 per CG: 8 for the coeff_abs_level_greater1_flags and 1 for coeff_abs_level_greater2_flags.

Fourth pass of sign information: In some examples of HEVC, the sign of each nonzero coefficient is coded in the fourth scan pass in bypass mode. For each CG, and depending on a criterion, encoding the sign of the last nonzero coefficient (in reverse scan order) is simply omitted when using sign data hiding (SDH). Instead, the sign value is embedded in the parity of the sum of the levels of the CG using a predefined convention: even corresponds to "+" and odd to "−." The criterion to use SDH is the distance in scan order between the first and the last nonzero coefficients of the CG. If this distance is equal or larger than four (4), SDH is used. The value of four (4) was chosen because it provides the largest gain on HEVC test sequences.

Last pass of remaining bins: The remaining bins are coded in a further scan pass. Let the baseLevel of a coefficient be defined as:

baseLevel=significant_flag+
    coeff_abs_level_greater1_flag+
    coeff_abs_level_greater2_flag where a flag has a value of 0 or 1 and is inferred to be 0 if not present. Then, the absolute value of the coefficient is defined as follows:

absCoeffLevel=baseLevel+coeff_abs_level_remaining.

The Rice parameter is set to 0 at the beginning of each CG and it is conditionally updated depending on the previous value of the parameter and the current absolute level as follows:

if absCoeffLevel>3×2m, m=min(4,m+1).

The syntax element coeff_abs_level_remaining may be coded in bypass mode. In addition, some examples of HEVC employ Golomb-Rice codes for small values and switches to an Exp-Golomb code for larger values. The transition point between the codes is typically when the unary code length equals 4. The parameter update process allows the binarization to adapt to the coefficient statistics when large values are observed in the distribution.

Context modeling of inter_pred_idc. inter_pred_idc specifies whether list0, list1, or bi-prediction is used for the current prediction unit. The syntax element has up to two bins, both of which are CABAC context coded. The binairzed bin string is defined as follows:

| Value of inter_pred_idc | Bin string (nPbW + nPbH) != 12 | Bin string (nPbW + nPbH) != 12 |
|---|---|---|
| 0 | 00 | 00 |
| 1 | 01 | 01 |
| 2 | 1 | 1 | where nPbW and nPbH represent the current luma prediction block width and height, respectively.

For each inter-coded slice, e.g., P slice or B slice, the context selection is based on the following rule:

If the sum (nPbW+nPbH) is unequal to 12, the first bin is coded using four contexts and the second bin is coded with one context. The context selection of the first bin is according the current CU depth. In HEVC, CU depth is in the range of 0 to 3, inclusive. The inclusive range of 0 through 3 can be expressed as [0,3].

In JCTVC-H0228 (T. Nguyen, D. Marpe, T. Wiegand, "Non-CE11: Proposed Cleanup for Transform Coefficient Coding", JCTVC-H0228, 8th Meeting: San Jose, Calif., USA, 1-10 Feb. 2012), one-scan pass coding was proposed. According to the one-scan pass that was proposed, all information on a transform coefficient level is coded in a single step instead of multiple pass coding as in HEVC. For each scan position, neighbors covered by a local template are evaluated, as done for bin0 (the first bin of the bin string, also referred as significant_coeff_flag or coeff_abs_greater0_flag) in the current design of HEVC. From this evaluation, context models and the Rice parameter, which controls the adaptive binarization of the remaining absolute value, are derived. To be more specific, the context models for the bin0, bin1, bin2 and the Rice parameters are all selected (bin1 and bin2 are also referred as coeff_abs_greater1_flag and coeff_abs_greater2_flag) based on the transform coefficient magnitudes located in the local template.

An example for the local template 140 is given in FIG. 10 for an 8×8 transform block with diagonal scan, where L denotes the last significant scan position, x denotes the current scan position and $x_i$ with i∈[0,4] denotes the neighbours covered by the local template.

sum_absolute_level, which indicates the absolute sum of the neighbours, and sum_absolute_levelMinus1, which indicates the absolute sum of each level minus 1, are used to derive context indices for bin0, bin1, bin2, and to determine the Rice parameter r.

$$\text{sum\_absolute\_level} = \sum |x_i| \quad (5)$$

$$\text{sum\_absolute\_levelMinus1} = \sum \delta_j(x_i)$$

$$\text{With } \delta_j(x) = \begin{cases} |x_i| - 1 & |x_i| > 0 \\ 0 & x_i = 0 \end{cases}$$

For bin0, the resulting sum_absolute_level from the local template evaluation is directly mapped to a context model index with a cut-off value of 5. The same rule is applied for the calculation of the context model index of bin1 and bin2 by using sum_absolute_levelMinus1 and a cut-off value of 4. This derivation rule is summarized in the following with $c_0$ represents the context model index for bin0, $c_1$ the context model index for bin1, and $c_2$ the context model index for bin2.

$c_0$=min(sum_absolute_level,5)

$c_1$=min(sum_absolute_levelMinus1,4)+1

$$c_2 = \text{min}(\text{sum\_absolute\_levelMinus1},4)+1 \quad (6)$$

Figure 12:
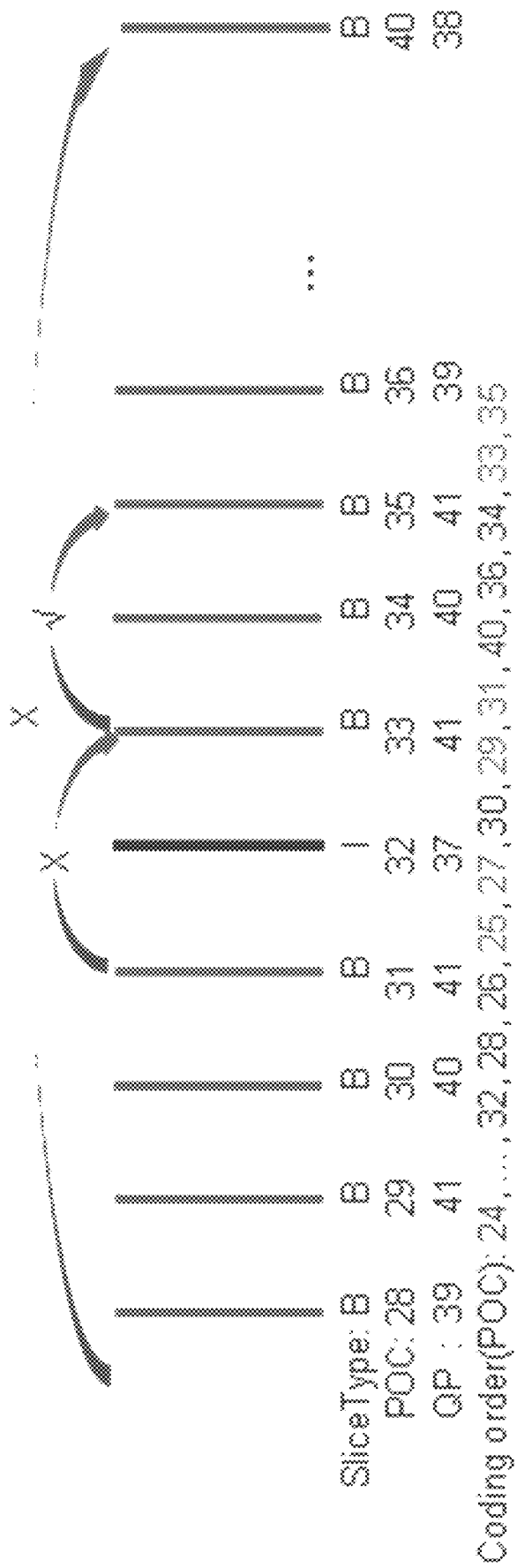
FIG. 12 is a conceptual diagram illustrating an example of bin derivation.

FIG. 12 is a conceptual diagram illustrating an example of bin derivation. The derivation rule for bin1 and bin2 are the same. Next, for the luma component, an additional offset is calculated for bin0, bin1 and bin2 of luma transform levels. The additional context index (i.e., offset) depends on the location of the current scan position. FIG. 12 illustrates an example of this process. In particular, FIG. 12 shows context index ranges for different regions within one TU (a) for luma bin0, (b) for luma bin1 and bin2 (not the last coefficient in forward scan order).

In summary, the whole concept is summarized in the following formulas, where x denotes the horizontal spatial location inside the transform block of the current scan position, y denotes the vertical spatial location, and cIdx denotes the current plane type with 0 stands for luma. Additionally, the range of context index for different positions are marked in FIG. 13.

$$c_0 = c_0 + f(x, y, 6, 2) + \delta_k(f(x, y, 6, 5), cIdx) \quad (7)$$

$$c_1 = c_1 + \delta_k(f(x, y, 5, 3), cIdx) + \delta_k(f(x, y, 5, 10), cIdx)$$

$$c_2 = c_2 + \delta_k(f(x, y, 5, 3), cIdx) + \delta_k(f(x, y, 5, 10), cIdx)$$

$$\text{With } f(x, y, n, t) = \begin{cases} n & x + y < t \\ 0 & x + y \geq t \end{cases}$$

$$\text{And } \delta_k(u, v) = \begin{cases} u & v = 0 \\ 0 & v \neq 0 \end{cases}$$

As shown above, the formula for $c_1$ is the same as for $c_2$. In addition to the same context model index for the bin1 and bin2, the same context model is used for the coding of bin1 and bin2. Further, for the first scan position in coding order (i.e. the last signification scan position); a separate context model index is used for bin1 and bin2. The first bin index (bin0) is inferred for the last significant scan position. This separate context model is never selected again by the context model selection scheme and is assigned as $c_1=0$. The total number of context models is tabulated in the following table:

| | H0228 | |
|---|---|---|
| | Luma | Chroma |
| bin0 | 18 | 12 |
| bin1 | 16 | 6 |
| bin2 | 0 | 0 |
| Remaining bins | 0 | 0 |
| Total | | 52 |

The Rice parameter r is derived as follows. For each scan position, the parameter is set to 0. Then, the sum_absolute_levelMinus1 is compared against a threshold set $t_R=\{3, 9, 21\}$. In other words, the Rice parameter is 0 if the sum_absolute_levelMinus1 falls into the first interval, is 1 if sum_absolute_levelMinus1 falls into the second interval and so on. The derivation of the Rice parameter r is summarized in the following:

$$r(x) = \begin{cases} 0 & x \in [0, 3] \\ 1 & x \in [4, 9] \\ 2 & x \in [10, 21] \\ 3 & x > 21 \end{cases} \quad (8)$$

with $x$ = sum_abslolute_levelMinus1.

Figure 13:
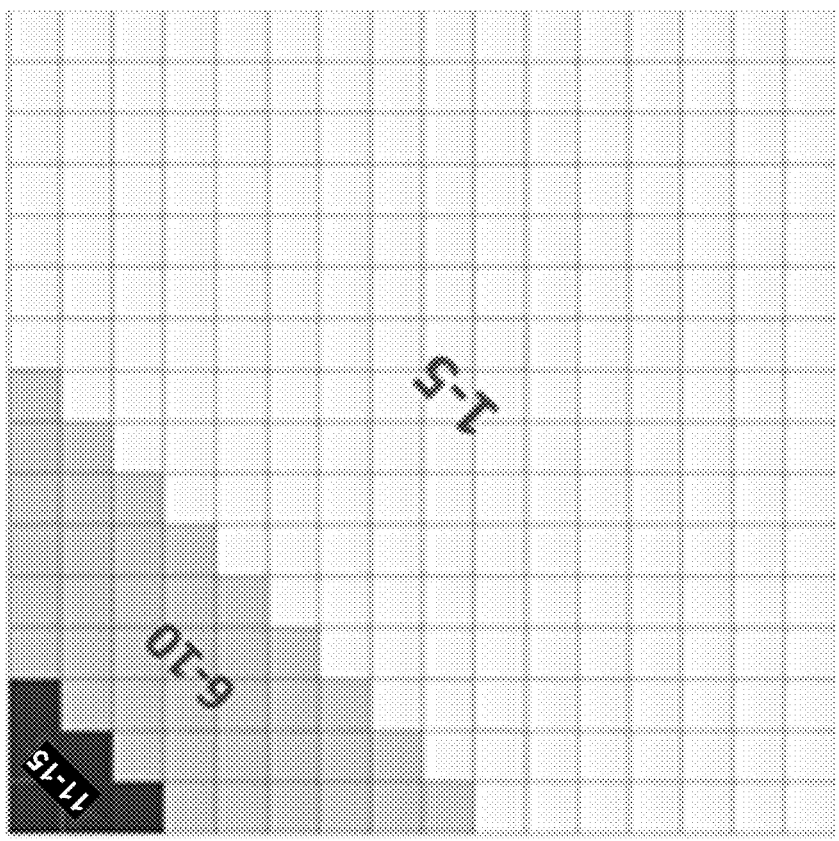
FIG. 13 is a conceptual diagram illustrating a range of context indexes for different positions within a TU, for different luma bins.
Figure 13:
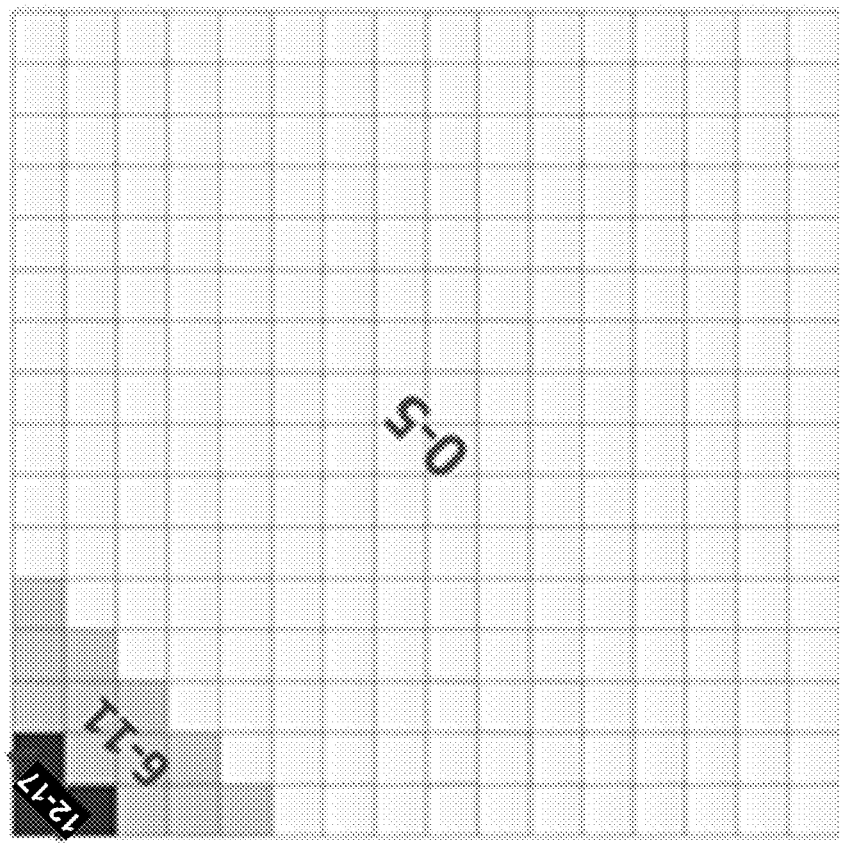

FIG. 13 is a conceptual diagram illustrating a range of context indexes for different positions within a TU, for different luma bins. In the example FIG. 13, the block on the left illustrates the context index range for different regions within the TU for luma bin0. The block on the right illustrates the context index range for different regions within the TU for luma bin1 and bin2. The particular positions are called out using numbers within the luma bins of FIG. 13, and the different regions are distinguished using shading.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Figure 14:
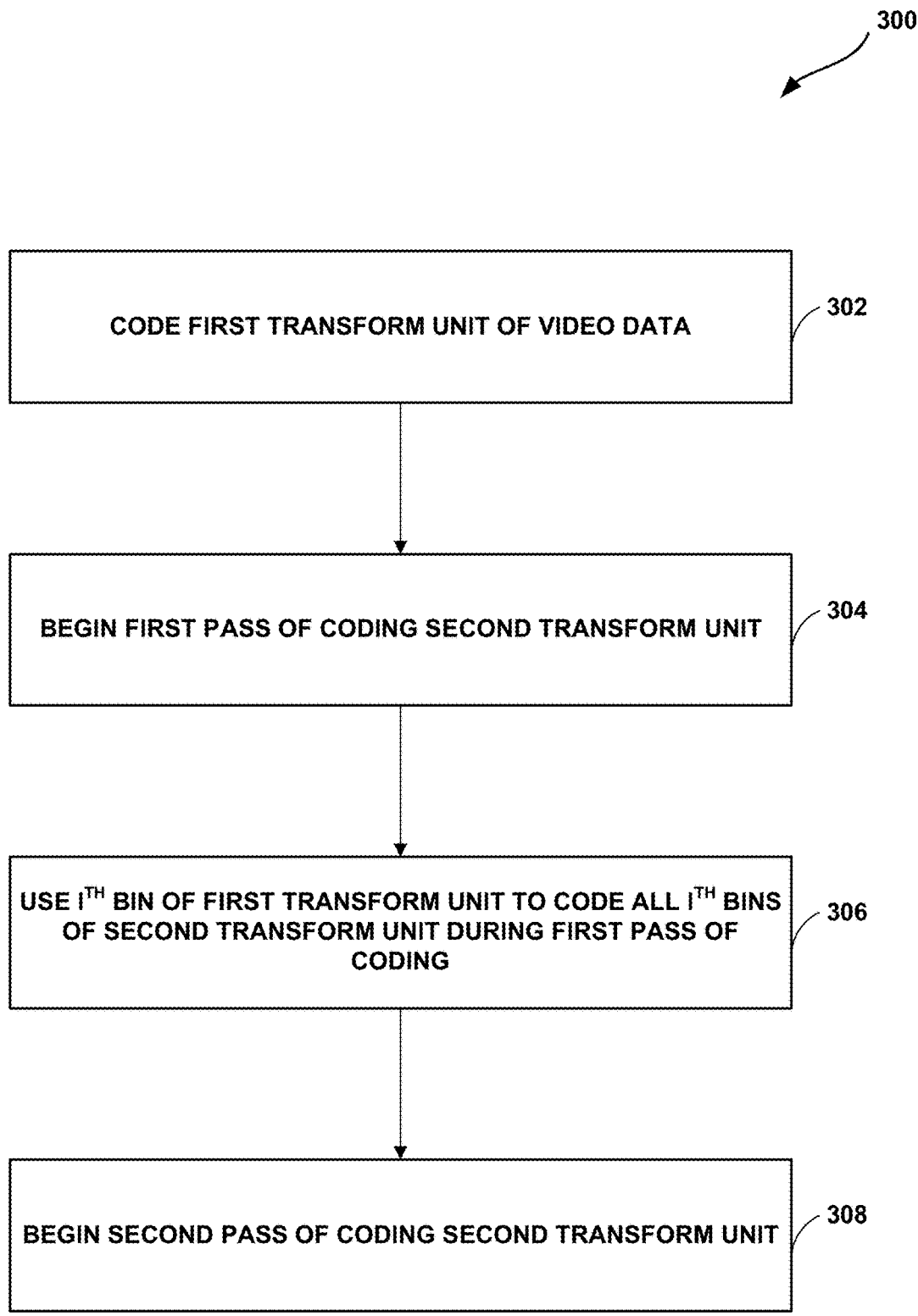
FIG. 14 is a flowchart illustrating an example process that a video coding device, or various components thereof, may perform to implement one or more of the context modeling techniques of this disclosure.

FIG. 14 illustrates an example process 300 that a video coding device, or various components thereof, may perform to implement one or more of the context modeling techniques of this disclosure. While process 300 may be performed by a variety of devices, process 300 is described herein with respect to video decoder 30. Process 300 may begin when video decoder 30 codes (e.g., decodes) a first TU (302). In turn, video decoder 30 may begin a first pass of coding a second TU (304). As such the first TU represents a previously-coded block with respect to the second TU.

Video decoder 30 may use the $i^{th}$ bin of the first TU to code all $i^{th}$ bins of the second TU within the first pass of coding (306). For instance, video decoder 30 may use the bin0 of the first TU to select the context index for the respective $i^{th}$ bin of all transform coefficients of the second TU, during the first pass of a multi-pass decoding process for the second TU. In this way, video decoder 30 may implement the context modeling techniques of this disclosure to improve parallelization, by using bins of a previously-coded block to complete context selection for all $i^{th}$ bin of all transform coefficients of a TU currently being coded.

In this way, video decoder 30 represents an example of a video coding device that includes a memory configured to store video data, and one or more processors. The processor(s) may be configured to determine, for each of a plurality of bins of a value for a syntax element of a current transform coefficient, contexts using respective corresponding bins of values for the syntax element of one or more previously-coded transform coefficients. To determine the contexts, the one or more processors are configured to determine a context for an ith bin of the value for the syntax element of the current transform coefficient using a corresponding ith bin of a value for the syntax element of a previously-coded transform coefficient, where 'i' comprises a non-negative integer, and where to use the corresponding ith bin of the value for the syntax element of the previously-coded transform coefficient, the one or more processors are configured to use only the ith bin of the value for the syntax element of the previously-coded transform coefficient and no other bins of the value for the syntax element of the previously-coded transform coefficient. The processor(s) are further configured to CABAC code (e.g., CABAC decode) the ith bin of the value for the syntax element of the current transform coefficient using the determined context.

In some examples, to determine the context for the ith bin of the value for the syntax element of the current transform coefficient, the one or more processors are configured to determine the context for the ith bin of the value for the syntax element of the current transform coefficient using a template that identifies one or more neighboring transform coefficients to be used for CABAC decoding the current transform coefficient. In some examples, the one or more processors are further configured to determine at least one of a size or a shape of the template based on at least one of a size of a transform unit that includes the current transform coefficient, a coding mode associated with a coding unit that includes including the transform unit, a position of the current transform coefficient in the transform unit that includes the current transform coefficient, or a position of the current transform coefficient in a coefficient group that includes the current transform coefficient. In some examples, the one or more processors are further configured to determine at least one of a size or a shape of the template based on color component information, the color component information including one or both of luma component information or chroma component information.

In some examples, the current transform coefficient is included in a transform unit, where some or all bins of the transform unit are CABAC encoded according to a regular mode, and to CABAC code the ith bin of the value for the syntax element of the current transform coefficient, the one or more processors are configured to code the ith bin of the value for the syntax element of the current transform coefficient during an ith coding pass during which all corresponding ith bins of all transform coefficients of the transform unit are CABAC coded. In some examples, to determine the context for the ith bin of the value for the syntax element of the current transform coefficient, the one or more processors are configured to determine a context index for the ith bin of the value for the syntax element of the current transform coefficient using a function of the previously-coded transform coefficients. In some examples, the previously-coded transform coefficients are positioned in a template. In some examples, to use the function of the previously-coded transform coefficients, the one or more processors are configured to use the function of a first 'M' previously-coded transform coefficients, and where 'M' represents a non-negative value. In some examples, the function comprises a summation function, and the corresponding ith bin of the value for the syntax element of previously-coded transform coefficient is included in a plurality of corresponding ith bins of values for syntax elements of a plurality of previously-coded transform coefficients.

In some examples, to determine the context index for the ith bin of the value for the syntax element of the current transform coefficient using the summation function, the one or more processors are configured to define the context index for the ith bin of the value for the syntax element of the current transform coefficient as a sum of all of the plurality of the corresponding ith bins of values for the syntax elements of the plurality of the previously-coded transform coefficients. In some examples, the one or more processors are further configured to clip a result of the summation function to form a clipped sum that is within a pre-defined range. Said another way, the one or more processors may perform a method that includes clipping the result of the summation function to form a clipped sum that is within a pre-defined range. In some examples, to determine the context for the ith bin of the value for the syntax element of the current transform coefficient, the one or more processors are configured to determine a context index for the ith bin of the value for the syntax element of the current transform coefficient and to add an offset to the determined context index. In some examples, the one or more processors are further configured to determine the offset based on a size of a transform unit that includes the current transform coefficient.

In some examples, the one or more processors are further configured to determine whether the transform unit is within a threshold size and, if the transform unit is within the threshold size, to determine that the transform unit is associated with a set of context models that is common to all transform units that are within the threshold size. In some examples, the threshold size is associated with a 16×16 dimensionality. In some examples, the stored video data comprises encoded video data, the one or more processors are further configured to decode at least a portion of the encoded video data to form reconstructed video data, and video decoder 30 may include, be, or be part of a device that includes a display device configured to display at least a portion of the reconstructed video data. In some examples, the one or more processors are further configured to encode at least a portion of the stored video data, and the previously-coded transform coefficient comprises a previously-encoded transform coefficient.

Figure 15:
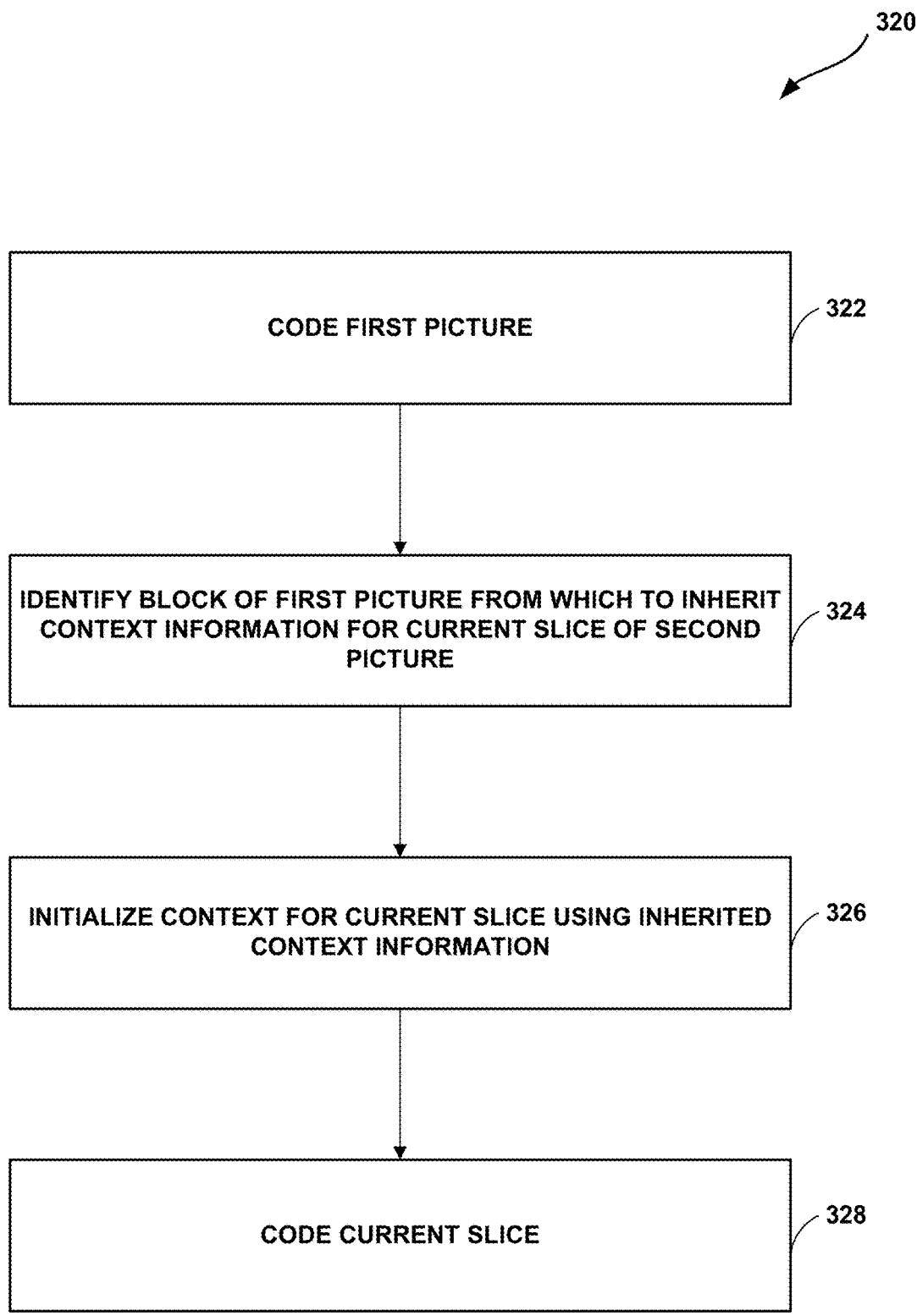
FIG. 15 is a flowchart illustrating an example process that a video coding device, or various components thereof, may perform to implement one or more of the inheritance-based context initialization techniques of this disclosure.

FIG. 15 is a flowchart illustrating an example process 320 that a video coding device, or various components thereof, may perform to implement one or more of the inheritance-based context initialization techniques of this disclosure. While process 320 may be performed by a variety of devices, process 320 is described herein with respect to video decoder 30. Process 320 may begin when video decoder 30 codes (e.g., decodes) a first picture (322). Thus, the first picture represents a previously-coded (e.g., previously-decoded) picture with respect to pictures that video decoder 30 may reconstruct subsequently. In turn, video decoder 30 may identify a block of the first from which to inherit context information for a current slice of a second picture (324). As such, the second picture may represent a "current picture" in that video decoder 30 is currently decoding the second picture, and the current slice may represent a particular slice of the second picture that video decoder 30 is decoding.

Video decoder 30 may initialize context information for the current slice using the context information inherited from the first picture (326). For instance, video decoder 30 may store one or more statuses of the inherited context information, and retrieve the stored status(es) to initialize the context for the current slice. In turn, video decoder 30 may code the current slice using the initialized context information (328).

In this way, video decoder 30 represents an example of a video coding device that includes a memory configured to store video data, and one or more processors. The processor(s) are configured to initialize context information for a current slice of a current picture by inheriting context information after coding a previously-coded block of a previously-coded slice of the stored video data as initialized context information for the current slice of the current picture, and to code data of the current slice using the initialized context information. In some examples the previously-coded block includes a largest coding unit (LCU) that is at a center position within the previously-coded slice or at a center position within a previously-coded picture associated with the previously-coded slice. In some examples, the current slice includes a uni-directional predicted slice (P-slice), and the previously-coded slice includes a bi-directional predicted slice (B-slice). In some examples, the current slice includes a bi-directional predicted slice (B-slice), and the previously-coded slice includes a uni-directional predicted slice (P-slice).

In some examples, the current slice is included in a plurality of slices in the current picture for which context information is inherited from the previously-coded picture, and the processor(s) are further configured to initialize respective context information for all of the plurality of slices by inheriting the context information after coding the LCU that is at the center position within the previously-coded slice. In some examples, the processor(s) are further configured to determine whether the current slice is inter-coded, and to initialize the context information for the current slice of the current picture, the processor(s) are configured to inherit the context information after coding the previously-coded block as the initialized context information for the current slice of the current picture based on a determination that the current slice is inter-coded.

In some examples, the processor(s) are configured to determine whether the previously-coded slice is inter-coded. In some examples, the processor(s) are further configured to determine whether the current slice and the previously-coded block share same quantization parameters (QPs), and to initialize the context information for the current slice of the current picture, the processor(s) are configured to inherit the context information after coding the previously-coded block as the initialized context information for the current slice of the current picture based on a determination that the current slice and the previously-coded slice share the same QPs. In some examples, the processor(s) are further configured to determine whether an Intra Random Access Picture (TRAP) is positioned, in output order, between the current picture and a previously-coded picture associated with the previously-coded slice.

In some examples, to initialize the context information for the current slice of the current picture, the processor(s) are configured to inherit the context information of the previously-coded block of the previously-coded picture as the initialized context information for the current slice of the current picture based on a determination that no TRAP is positioned between the current picture and the previously-coded picture in the output order. In some examples, the processor(s) are further configured to define a position of the previously-coded block according to the following equation: TargetCUAddr=(PicWidthInCtbsY*PicHeightInCtbsY)/2+ PicWidthInCtbsY/2, where "PicWidthInCtbsY" denotes a number of largest coding units (LCUs) included in a single row of the previously-coded block, and where "PicHeightInCtbsY" denotes a total number of LCU rows included in the previously-coded block. In some examples, the context information includes one or more context states associated with the current slice.

In some examples, the context information further includes values associated with most probable state (MPS) information. In some examples, to initialize the context information for the current slice by inheriting the context information after coding the previously-coded block, the processor(s) are configured to initialize some but not all contexts of the context information for the current slice by inheriting the context information after coding the previously-coded block. In some examples, the previously-coded slice includes one of (i) a slice in the current picture, where the previously-coded slice is different from the current slice, or (ii) a slice in a previously-coded picture. In some examples, the processor(s) are further configured to select the previously-coded picture by identifying the previously-coded picture as a last picture, in output order before the current picture, that shares same quantization parameters (QPs) and slice types as the current picture. In some examples, the stored video data includes encoded video data, the processor(s) are further configured to decode at least a portion of the encoded video data to form reconstructed video data, and the video coding device further includes a display device configured to display at least a portion of the reconstructed video data.

Figure 16:
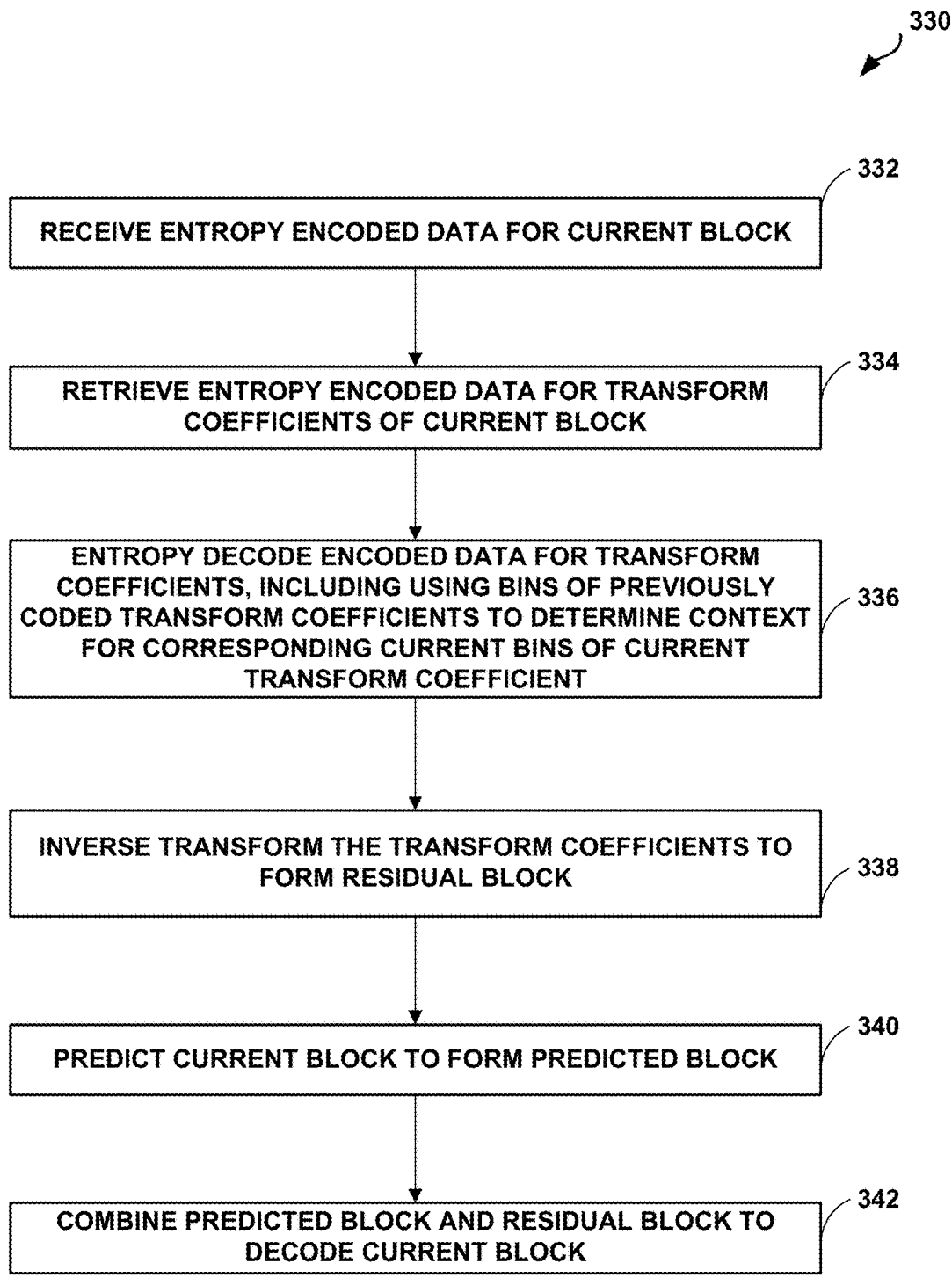
FIG. 16 is a flowchart illustrating an example process that a video coding device, or various components thereof, may perform to implement one or more of techniques of this disclosure as part of a video decoding process.

FIG. 16 is a flowchart illustrating an example process 330 that a video coding device, or various components thereof, may perform to implement one or more of techniques of this disclosure as part of a video decoding process. While process 330 may be performed by a variety of devices, process 330 is described herein with respect to video decoder 30. Process 330 may begin when video decoder 30 receives entropy encoded data for a current block (332). Additionally, video decoder 30 may retrieve entropy encoded data for transform coefficients of the current block (334).

In turn, video decoder 30 may entropy decode encoded data for the transform coefficients of the current block (336). For instance, to entropy decode the transform coefficients, video decoder 30 may use bins of previously-decoded transform coefficients to determine context information for corresponding current bins of a current transform coefficient (336). Video decoder 30 (e.g., by invoking inverse transform unit 78) may apply an inverse transform to the transform coefficients to form a residual block (338). In turn, video decoder 30 may predict the current block to form a predicted block (340). Video decoder 30 may combine the predicted block with residual block to decode the current block (342).

Figure 17:
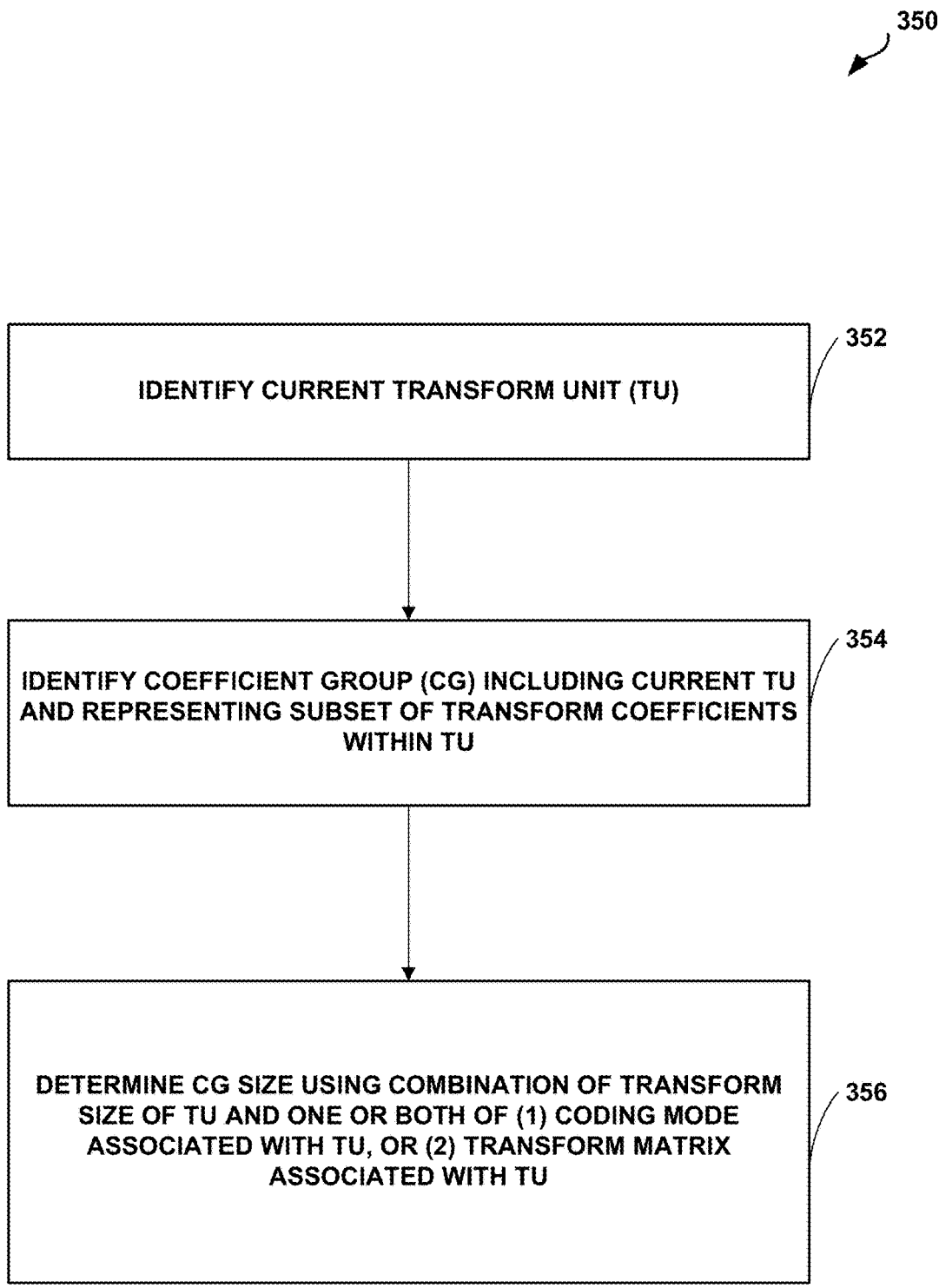
FIG. 17 is a flowchart illustrating an example process that a video coding device, or various components thereof, may perform to implement one or more coefficient group (CG) size-determination techniques of this disclosure.

FIG. 17 is a flowchart illustrating an example process 350 that a video coding device, or various components thereof, may perform to implement one or more coefficient group (CG) size-determination techniques of this disclosure. While process 320 may be performed by a variety of devices, process 350 is described herein with respect to video decoder 30. Process 350 may begin when video decoder 30 identifies a transform unit (TU) (352). For instance, video decoder 30 may identify a current TU, such as a TU that is currently being decoded. Additionally, video decoder 30 may identify a coefficient group that includes the current TU, where the coefficient group represents a subset of the transform coefficients of the current TU (354). Video decoder 30 may determine a size of the CG based on a combination of a transform size associated with the transform unit and one or both of (i) a coding mode associated with the transform unit, or (ii) a transform matrix associated with the transform unit (356).

In this way, video decoder 30 represents an example of a video coding device that includes a memory device configured to store video data, and one or more processors. The processor(s) are configured to identify a coefficient group (CG) that includes a current transform coefficient of the video data, the CG representing a subset of transform coefficients within a transform unit and to determine a size of the CG based on a transform size associated with the transform unit. In some examples, the processor(s) may determine the size of the CG based on a combination of the transform size associated with the transform unit and one or both of (i) a coding mode associated with the transform unit, or (ii) a transform matrix associated with the transform unit. In some examples, the stored video data comprises encoded video data, and the one or more processors are configured to decode at least a portion of the encoded video data to form decoded video data. In some examples, the stored video data comprises encoded video data, and the one or more processors are configured to decode at least a portion of the encoded video data to form decoded video data.

In some examples, the transform unit comprises an encoded transform unit, and where the coding mode associated with the transform unit comprises a coding mode used for forming the encoded transform unit. In some examples, video decoder 30 includes, is, or is part of a device that comprises a display configured to display at least a portion of the decoded video data. In some examples, the one or more processors are further configured to determine, for each of a plurality of bins of a value for a syntax element of the current transform coefficient, contexts using respective corresponding bins of values for the syntax element of one or more previously-decoded transform coefficients. In some examples, to determine the contexts, the one or more processors are configured to determine a context for an $i^{th}$ bin of the value for the syntax element of the current transform coefficient using a corresponding $i^{th}$ bin of a value for the syntax element of a previously-decoded transform coefficient, where i comprises a non-negative integer. In some examples, to use the corresponding $i^{th}$ bin of the value for the syntax element of the previously-decoded transform coefficient, the processor(s) use only the $i^{th}$ bin of the value for the syntax element of the previously-decoded transform coefficient and no other bins of the value for the syntax element of the previously-decoded transform coefficient. In some such examples, the processors(s) may context adaptive binary arithmetic coding (CABAC) decode the $i^{th}$ bin of the value for the syntax element of the current transform coefficient using the determined context. In some examples, the CG comprises a square region of blocks, and the size of the CG is 4×4, expressed in units of blocks.

In some examples, the coding mode comprises a CG-based coding mode. In some examples, video decoder 30 includes, is, or is part of a device that includes one or more of: one or more integrated circuits; one or more digital signal processors (DSPs); one or more field programmable gate arrays (FPGAs); a desktop computer; a laptop computer; a tablet computer; a phone; a television; a camera; a display device; a digital media player; a video game console; a video game device; a video streaming device; or a wireless communication device.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

for each of a plurality of bins of a value for a syntax element of a current transform coefficient, determining contexts using respective corresponding bins of values for the syntax element of a previously-decoded transform coefficient at least in part by:

using a template that identifies one or more neighboring transform coefficients to be used for context adaptive binary arithmetic coding (CABAC) decoding of the current transform coefficient to identify, from bin values of a previously-decoded transform unit, a corresponding $i^{th}$ bin of a value for a syntax element of a previously-decoded transform coefficient included in the previously-decoded transform unit;

determining a context for an $i^{th}$ bin of the value for the syntax element of the current transform coefficient using the corresponding $i^{th}$ bin of the value for the syntax element of the previously-decoded transform coefficient identified using the template, wherein i comprises a non-negative integer, and wherein using the corresponding $i^{th}$ bin of the value for the syntax element of the previously-decoded transform coefficient comprises using only the $i^{th}$ bin of the value for the syntax element of the previously-decoded transform coefficient and no other bins of the value for the syntax element of the previously-decoded transform coefficient, wherein determining the context for the $i^{th}$ bin of the value for the syntax element of the current transform coefficient comprises determining a context index for the $i^{th}$ bin of the value for the syntax element of the current transform coefficient using a function of the previously-decoded transform coefficient, wherein the function comprises a summation function, wherein the corresponding $i^{th}$ bin of the value for the syntax element of the previously-decoded transform coefficient is included in a plurality of corresponding $i^{th}$ bins of values for syntax elements of a plurality of previously-decoded transform coefficients, and wherein determining the context index for the $i^{th}$ bin of the value for the syntax element of the current transform coefficient using the summation function comprises defining the context index for the $i^{th}$ bin of the value for the syntax element of the current transform coefficient as a sum of all of the plurality of the corresponding $i^{th}$ bins of values for the syntax elements of the plurality of the previously-decoded transform coefficients; and CABAC decoding the $i^{th}$ bin of the value for the syntax element of the current transform coefficient using the determined context.

2. The method of claim 1, further comprising determining at least one of a size or a shape of the template based on at least one of a size of a current transform unit that includes the current transform coefficient, a coding mode associated with a coding unit that includes the current transform unit, a position of the current transform coefficient in the current transform unit that includes the current transform coefficient, or a position of the current transform coefficient in a coefficient group that includes the current transform coefficient.

3. The method of claim 1,
wherein the current transform coefficient is included in a current transform unit, wherein some or all bins of the current transform unit are CABAC encoded according to a regular mode, and
wherein CABAC decoding the $i^{th}$ bin of the value for the syntax element of the current transform coefficient comprises decoding the $i^{th}$ bin of the value for the syntax element of the current transform coefficient during an $i^{th}$ coding pass during which all corresponding $i^{th}$ bins of all transform coefficients of the current transform unit are CABAC decoded.

4. The method of claim 1, wherein the previously-decoded transform coefficient is positioned in the template.

5. The method of claim 1, wherein using the function of the previously-decoded transform coefficient comprises using the function of a first 'M' previously-decoded transform coefficients that include the previously-decoded transform coefficient, and wherein 'M' represents a non-negative value.

6. The method of claim 1, further comprising clipping a result of the summation function to form a clipped sum that is within a pre-defined range.

7. The method of claim 1, wherein determining the context for the $i^{th}$ bin of the value for the syntax element of the current transform coefficient comprises:
determining a context index for the $i^{th}$ bin of the value for the syntax element of the current transform coefficient; and
adding an offset to the determined context index.

8. The method of claim 7, further comprising determining the offset based on a size of a current transform unit that includes the current transform coefficient.

9. The method of claim 8, further comprising:
determining that the current transform unit is within a threshold size; and
based on the determination that the current transform unit is within the threshold size, determining that the current transform unit is associated with a set of context models that is common to all transform units that are within the threshold size.

10. The method of claim 9, wherein the threshold size is associated with a 16×16 dimensionality.

11. The method of claim 1, wherein the current transform coefficient is included in a current transform unit that is encoded according to a bypass mode.

12. A method of encoding video data, the method comprising:
for each of a plurality of bins of a value for a syntax element of a current transform coefficient, determining contexts using respective corresponding bins of values for the syntax element of a one or more previously-encoded transform coefficient at least in part by:
using a template that identifies one or more neighboring transform coefficients to be used for context adaptive binary arithmetic coding (CABAC) decoding of the current transform coefficient to identify, from bin values of a previously-encoded transform unit, a corresponding $i^{th}$ bin of a value for a syntax element of a previously-encoded transform coefficient included in the previously-encoded transform unit;
determining a context for an ith bin of the value for the syntax element of the current transform coefficient using the corresponding $i^{th}$ bin of the value for the syntax element of the previously-encoded transform coefficient identified using the template, wherein i comprises a non-negative integer, and wherein using the corresponding $i^{th}$ bin of the value for the syntax element of the previously-encoded transform coefficient comprises using only the $i^{th}$ bin of the value for the syntax element of the previously-encoded transform coefficient and no other bins of the value for the syntax element of the previously-encoded transform coefficient, wherein determining the context for the $i^{th}$ bin of the value for the syntax element of the current transform coefficient comprises determining a context index for the $i^{th}$ bin of the value for the syntax element of the current transform coefficient using a function of the previously-encoded transform coefficient, wherein the function comprises a summation function, wherein the corresponding $i^{th}$ bin of the value for the syntax element of the previously-encoded transform coefficient is included in a plurality of corresponding $i^{th}$ bins of values for syntax elements of a plurality of previously-encoded transform coefficients, and wherein determining the context index for the $i^{th}$ bin of the value for the syntax element of the current transform coefficient using the summation function comprises defining the context index for the $i^{th}$ bin of the value for the syntax element of the current transform coefficient as a sum of all of the plurality of the corresponding $i^{th}$ bins of values for the syntax elements of the plurality of the previously-encoded transform coefficients; and
CABAC encoding the $i^{th}$ bin of the value for the syntax element of the current transform coefficient using the determined context.

13. The method of claim 12, further comprising determining at least one of a size or a shape of the template based on at least one of a size of a current transform unit that includes the current transform coefficient, a coding mode associated with a coding unit that includes the current transform unit, a position of the current transform coefficient in the current transform unit that includes the current transform coefficient, or a position of the current transform coefficient in a coefficient group that includes the current transform coefficient.

14. The method of claim 12,
wherein the current transform coefficient is included in a current transform unit,
wherein all bins of the current transform unit are CABAC encoded according to a regular mode, and
wherein CABAC encoding the $i^{th}$ bin of the value for the syntax element of the current transform coefficient comprises encoding the $i^{th}$ bin of the value for the syntax element of the current transform coefficient during an $i^{th}$ coding pass during which all corresponding $i^{th}$ bins of all transform coefficients of the current transform unit are CABAC encoded.

15. The method of claim 12, wherein the previously-encoded transform coefficient is positioned in the template.

16. The method of claim 12, wherein using the function of the previously-encoded transform coefficient comprises using the function of a first 'M' previously-encoded transform coefficients that include the previously-encoded transform coefficient, and wherein 'M' represents a non-negative value.

17. The method of claim 12, wherein determining the context for the $i^{th}$ bin of the value for the syntax element of the current transform coefficient comprises:

determining a context index for the $i^{th}$ bin of the value for the syntax element of the current transform coefficient; and adding an offset to the determined context index.

18. The method of claim 17, further comprising determining the offset based on a size of a current transform unit that includes the current transform coefficient.

19. The method of claim 18, further comprising:
determining that the current transform unit is within a threshold size; and
based on the determination that the current transform unit is within the threshold size, determining that the current transform unit is associated with a set of context models that is common to all transform units that are within the threshold size.

20. The method of claim 19, wherein the threshold size is associated with a 16×16 dimensionality.

21. A video coding device comprising:
a memory configured to store video data; and
one or more processors in communication with the memory, the one or more processors being configured to:
determine, for each of a plurality of bins of a value for a syntax element of a current transform coefficient, contexts using respective corresponding bins of values for the syntax element of a previously-coded transform coefficient,
wherein to determine the contexts, the one or more processors are configured to:
use a template that identifies one or more neighboring transform coefficients to be used for context adaptive binary arithmetic coding (CABAC) decoding of the current transform coefficient to identify, from bin values of a previously-coded transform unit, a corresponding $i^{th}$ bin of a value for a syntax element of a previously-coded transform coefficient included in the previously-coded transform unit;
determine a context for an $i^{th}$ bin of the value for the syntax element of the current transform coefficient using the corresponding $i^{th}$ bin of the value for the syntax element of the previously-coded transform coefficient identified using the template, wherein i comprises a non-negative integer, and wherein to use the corresponding $i^{th}$ bin of the value for the syntax element of the previously-coded transform coefficient, the one or more processors are configured to use only the $i^{th}$ bin of the value for the syntax element of the previously-coded transform coefficient and no other bins of the value for the syntax element of the previously-coded transform coefficient, wherein to determine the context for the $i^{th}$ bin of the value for the syntax element of the current transform coefficient, the one or more processors are configured to determine a context index for the $i^{th}$ bin of the value for the syntax element of the current transform coefficient using a function of the previously-coded transform coefficient, wherein the function comprises a summation function, wherein the corresponding $i^{th}$ bin of the value for the syntax element of the previously-coded transform coefficient is included in a plurality of corresponding $i^{th}$ bins of values for syntax elements of a plurality of previously-coded transform coefficients, and wherein to determine the context index for the $i^{th}$ bin of the value for the syntax element of the current transform coefficient using the summation function, the one or more processors are configured to define the context index for the $i^{th}$ bin of the value for the syntax element of the current transform coefficient as a sum of all of the plurality of the corresponding $i^{th}$ bins of values for the syntax elements of the plurality of the previously-coded transform coefficients; and CABAC code the $i^{th}$ bin of the value for the syntax element of the current transform coefficient using the determined context.

22. The video coding device of claim 21, wherein the one or more processors are further configured to determine at least one of a size or a shape of the template based on at least one of a size of a current transform unit that includes the current transform coefficient, a coding mode associated with a coding unit that includes the current transform unit, a position of the current transform coefficient in the current transform unit that includes the current transform coefficient, or a position of the current transform coefficient in a coefficient group that includes the current transform coefficient.

23. The video coding device of claim 21, wherein the one or more processors are further configured to determine at least one of a size or a shape of the template based on color component information, the color component information including one or both of luma component information or chroma component information.

24. The video coding device of claim 21,
wherein the current transform coefficient is included in a current transform unit,
wherein some or all bins of the current transform unit are CABAC encoded according to a regular mode, and
wherein to CABAC code the $i^{th}$ bin of the value for the syntax element of the current transform coefficient, the one or more processors are configured to code the $i^{th}$ bin of the value for the syntax element of the current transform coefficient during an $i^{th}$ coding pass during which all corresponding $i^{th}$ bins of all transform coefficients of the current transform unit are CABAC coded.

25. The video coding device of claim 21, wherein to use the function of the previously-coded transform coefficient, the one or more processors are configured to use the function of a first 'M' previously-coded transform coefficients that include the previously-coded transform coefficient, and wherein 'M' represents a non-negative value.

26. The video coding device of claim 21, wherein the one or more processors are further configured to clip a result of the summation function to form a clipped sum that is within a pre-defined range.

27. The video coding device of claim 21, wherein to determine the context for the $i^{th}$ bin of the value for the syntax element of the current transform coefficient, the one or more processors are configured to:
determine a context index for the $i^{th}$ bin of the value for the syntax element of the current transform coefficient; and
add an offset to the determined context index.

28. The video coding device of claim 27, wherein the one or more processors are further configured to determine the offset based on a size of a current transform unit that includes the current transform coefficient.

29. The video coding device of claim 28, the one or more processors being further configured to:
determine that the current transform unit is within a threshold size; and based on the current transform unit being within the threshold size, determine that the current transform unit is associated with a set of context models that is common to all transform units that are within the threshold size.

30. The video coding device of claim 29, wherein the threshold size is associated with a 16×16 dimensionality.

31. The video coding device of claim 21,
wherein the stored video data comprises encoded video data,
wherein the one or more processors are further configured to decode at least a portion of the encoded video data to form reconstructed video data, and
wherein the video coding device further comprises a display device configured to display at least a portion of the reconstructed video data.

32. The video coding device of claim 21,
further comprising a camera configured to capture at least a portion of the video data,
wherein the one or more processors are further configured to encode at least a portion of the stored video data, and
wherein the previously-coded transform coefficient comprises a previously-encoded transform coefficient.

33. The video coding device of claim 21, wherein the current transform coefficient is included in a current transform unit that is coded according to a bypass mode.

34. A video coding apparatus comprising:
means for determining, for each of a plurality of bins of a value for a syntax element of a current transform coefficient, contexts using respective corresponding bins of values for the syntax element of a previously-coded transform coefficient,
wherein the means for determining the contexts comprises:
means for using a template that identifies one or more neighboring transform coefficients to be used for context adaptive binary arithmetic coding (CABAC) decoding of the current transform coefficient to identify, from bin values of a previously-coded transform unit, a corresponding $i^{th}$ bin of a value for a syntax element of a previously-coded transform coefficient included in the previously-coded transform unit;
means for determining a context for an $i^{th}$ bin of the value for the syntax element of the current transform coefficient using the corresponding $i^{th}$ bin of the value for the syntax element of the previously-coded transform coefficient identified using the template, wherein i comprises a non-negative integer, and wherein the means for using the corresponding $i^{th}$ bin of the value for the syntax element of the previously-coded transform coefficient comprises means for using only the $i^{th}$ bin of the value for the syntax element of the previously-coded transform coefficient and no other bins of the value for the syntax element of the previously-coded transform coefficient, wherein the means for determining the context for the $i^{th}$ bin of the value for the syntax element of the current transform coefficient comprises means for determining a context index for the $i^{th}$ bin of the value for the syntax element of the current transform coefficient using a function of the previously-coded transform coefficient, wherein the function comprises a summation function, wherein the corresponding $i^{th}$ bin of the value for the syntax element of the previously-coded transform coefficient is included in a plurality of corresponding $i^{th}$ bins of values for syntax elements of a plurality of previously-coded transform coefficients, and wherein the means for determining the context index for the $i^{th}$ bin of the value for the syntax element of the current transform coefficient using the summation function comprises means for defining the context index for the $i^{th}$ bin of the value for the syntax element of the current transform coefficient as a sum of all of the plurality of the corresponding $i^{th}$ bins of values for the syntax elements of the plurality of the previously-coded transform coefficients; and
means for CABAC coding the $i^{th}$ bin of the value for the syntax element of the current transform coefficient using the determined context.

35. A non-transitory computer-readable storage medium encoded with instructions that, when executed, cause one or more processors of a video coding device to:
determine, for each of a plurality of bins of a value for a syntax element of a current transform coefficient, contexts using respective corresponding bins of values for the syntax element of a previously-coded transform coefficient,
wherein the instructions that cause the one or more processors to determine the contexts comprise instructions that, when executed, cause the one or more processors to:
use a template that identifies one or more neighboring transform coefficients to be used for context adaptive binary arithmetic coding (CABAC) decoding of the current transform coefficient to identify, from bin values of a previously-coded transform unit, a corresponding $i^{th}$ bin of a value for a syntax element of a previously-coded transform coefficient included in the previously-coded transform unit;
determine a context for an $i^{th}$ bin of the value for the syntax element of the current transform coefficient using the corresponding $i^{th}$ bin of the value for the syntax element of the previously-coded transform coefficient identified using the template, wherein i comprises a non-negative integer, and wherein to use the corresponding $i^{th}$ bin of the value for the syntax element of the previously-coded transform coefficient, the one or more processors are configured to use only the $i^{th}$ bin of the value for the syntax element of the previously-coded transform coefficient and no other bins of the value for the syntax element of the previously-coded transform coefficient, wherein the instructions that cause the processor to determine the context for the $i^{th}$ bin of the value for the syntax element of the current transform coefficient comprise instructions that cause the processor to determine a context index for the $i^{th}$ bin of the value for the syntax element of the current transform coefficient using a function of the previously-coded transform coefficient, wherein the function comprises a summation function, wherein the corresponding $i^{th}$ bin of the value for the syntax element of the previously-coded transform coefficient is included in a plurality of corresponding $i^{th}$ bins of values for syntax elements of a plurality of previously-coded transform coefficients, and wherein the instructions that cause the processor to determine the context index for the $i^{th}$ bin of the value for the syntax element of the current transform coefficient using the summation function comprise instructions that cause the processor to define the context index for the $i^{th}$ bin of the value for the syntax element of the current transform coefficient as a sum of all of the plurality of the corresponding $i^{th}$ bins of values for the syntax elements of the plurality of the previously-coded transform coefficients; and CABAC code the $i^{th}$ bin of the value for the syntax element of the current transform coefficient using the determined context.

* * * * *